United States Patent [19]

Takahashi et al.

[11] Patent Number: 6,027,200

[45] Date of Patent: *Feb. 22, 2000

[54] INFORMATION PROCESSING APPARATUS HAVING MEANS FOR ESTIMATING EXPENDABLES TO BE CONSUMED DURING RECORDING

[75] Inventors: Kazuyoshi Takahashi, Kawasaki; Takashi Watanabe, Yokohama; Toshiyuki Yanaka, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/778,257

[22] Filed: Jan. 8, 1997

Related U.S. Application Data

[63] Continuation of application No. 08/186,477, Jan. 26, 1994, abandoned.

[30] Foreign Application Priority Data

Jan. 29, 1993 [JP] Japan ................................. 5-013878
Jan. 29, 1993 [JP] Japan ................................. 5-013945
Jan. 29, 1993 [JP] Japan ................................. 5-013988

[51] Int. Cl.[7] ........................................................ B41J 2/01
[52] U.S. Cl. ................................ 347/19; 347/7; 347/106; 399/27
[58] Field of Search .................................. 347/5, 9, 3, 2, 347/106, 7, 6, 19; 399/27, 8, 9, 24

[56] References Cited

U.S. PATENT DOCUMENTS

| | | |
|---|---|---|
| 4,121,222 | 10/1978 | Diebold ........................................ 347/7 |
| 4,130,234 | 12/1978 | Schmidt . |
| 4,233,663 | 11/1980 | Sugawara . |
| 4,313,124 | 1/1982 | Hara . |
| 4,345,262 | 8/1982 | Shirato et al. . |
| 4,413,264 | 11/1983 | Cruz-Uribe ................................. 347/6 |
| 4,459,600 | 7/1984 | Sato et al. . |
| 4,463,359 | 7/1984 | Ayata et al. . |
| 4,558,333 | 12/1985 | Sugitani et al. . |
| 4,598,376 | 7/1986 | Burton et al. . |
| 4,608,577 | 8/1986 | Hori . |
| 4,639,746 | 1/1987 | Yamamoto . |
| 4,702,742 | 10/1987 | Iwata ................................... 347/106 X |
| 4,707,713 | 11/1987 | Ayata ..................................... 347/43 X |
| 4,723,129 | 2/1988 | Endo et al. . |
| 4,740,796 | 4/1988 | Endo et al. . |
| 4,786,288 | 11/1988 | Handa et al. ................................ 8/495 |
| 5,059,998 | 10/1991 | Sasaki et al. . |
| 5,068,806 | 11/1991 | Gatten ....................................... 347/7 X |
| 5,109,281 | 4/1992 | Kobori et al. . |
| 5,124,748 | 6/1992 | Tanabe et al. . |
| 5,163,006 | 11/1992 | Deziel . |
| 5,202,769 | 4/1993 | Suzuki ..................................... 358/300 |
| 5,204,699 | 4/1993 | Birnbaum ............................. 355/208 X |
| 5,250,121 | 10/1993 | Yamamoto ........................... 347/106 X |

FOREIGN PATENT DOCUMENTS

| | | | |
|---|---|---|---|
| 0082628 | 6/1983 | European Pat. Off. | ......... H04N 1/22 |
| 0212655 | 3/1987 | European Pat. Off. | .......... D06P 5/00 |

(List continued on next page.)

OTHER PUBLICATIONS

Patent Abstracts of Japan, JP3167303, Vo.l. 15, No. 409, Oct. 18, 1994.
Patent Abstracts of Japan, JP2277806, vol. 15, No. 43, Jan. 31, 1991.
Patent Abstracts of Japan, JP3090607, Vo.l. 15, No. 263, Jul. 4, 1991.

*Primary Examiner*—Joseph Hartary
*Attorney, Agent, or Firm*—Fitzpatrick, Cella, Harper & Scinto

[57] ABSTRACT

An information processing apparatus applied to an image forming system, which can repetitively record a basic image, includes a device for obtaining a number of dots forming the basic image on the basis of the image data representing the basic image, and a device for estimating a consumption amount of an expendable consumed by recording an image of a predetermined unit on the basis of the obtained number of dots.

29 Claims, 57 Drawing Sheets

FOREIGN PATENT DOCUMENTS

| | | | |
|---|---|---|---|
| 0371005 | 5/1990 | European Pat. Off. | |
| 0 513 372 | 11/1992 | European Pat. Off. | D06P 5/00 |
| 0561700 | 9/1993 | European Pat. Off. | |
| 0 574 372 | 12/1993 | European Pat. Off. | B41J 2/175 |
| 0 585 560 | 3/1994 | European Pat. Off. | B41J 2/195 |
| 0 593 282 | 4/1994 | European Pat. Off. | B41J 2/175 |
| 2466795 | 4/1981 | France | G03D 3/06 |
| 54-56847 | 5/1979 | Japan . | |
| 59-123670 | 7/1984 | Japan . | |
| 59-138461 | 8/1984 | Japan . | |
| 60-71260 | 4/1985 | Japan . | |
| 62-53492 | 3/1987 | Japan . | |
| 362092850 | 4/1987 | Japan | B41J 3/04 |
| 0158049 | 7/1987 | Japan | B41J 3/04 |
| 2277806 | 11/1990 | Japan . | |
| 346589 | 2/1991 | Japan . | |
| 3090607 | 4/1991 | Japan | A41H 3/00 |
| 3167303 | 7/1991 | Japan | A41H 25/00 |
| 418358 | 1/1992 | Japan | B41J 2/01 |
| 479858 | 3/1992 | Japan . | |
| 4-135777 | 5/1992 | Japan | B41J 29/20 |
| 4201349 | 7/1992 | Japan . | |
| 404316856 | 11/1992 | Japan | B41J 2/175 |
| 2062849 | 5/1981 | United Kingdom | G01B 11/28 |
| WO 92/18335 | 10/1992 | WIPO | B41J 2/175 |

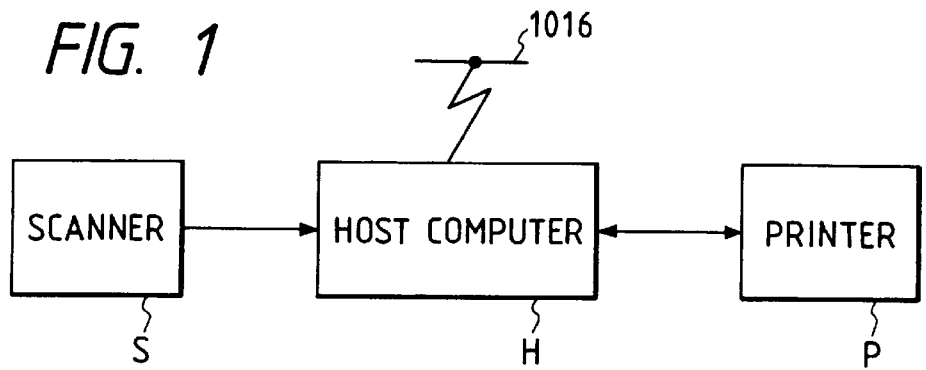
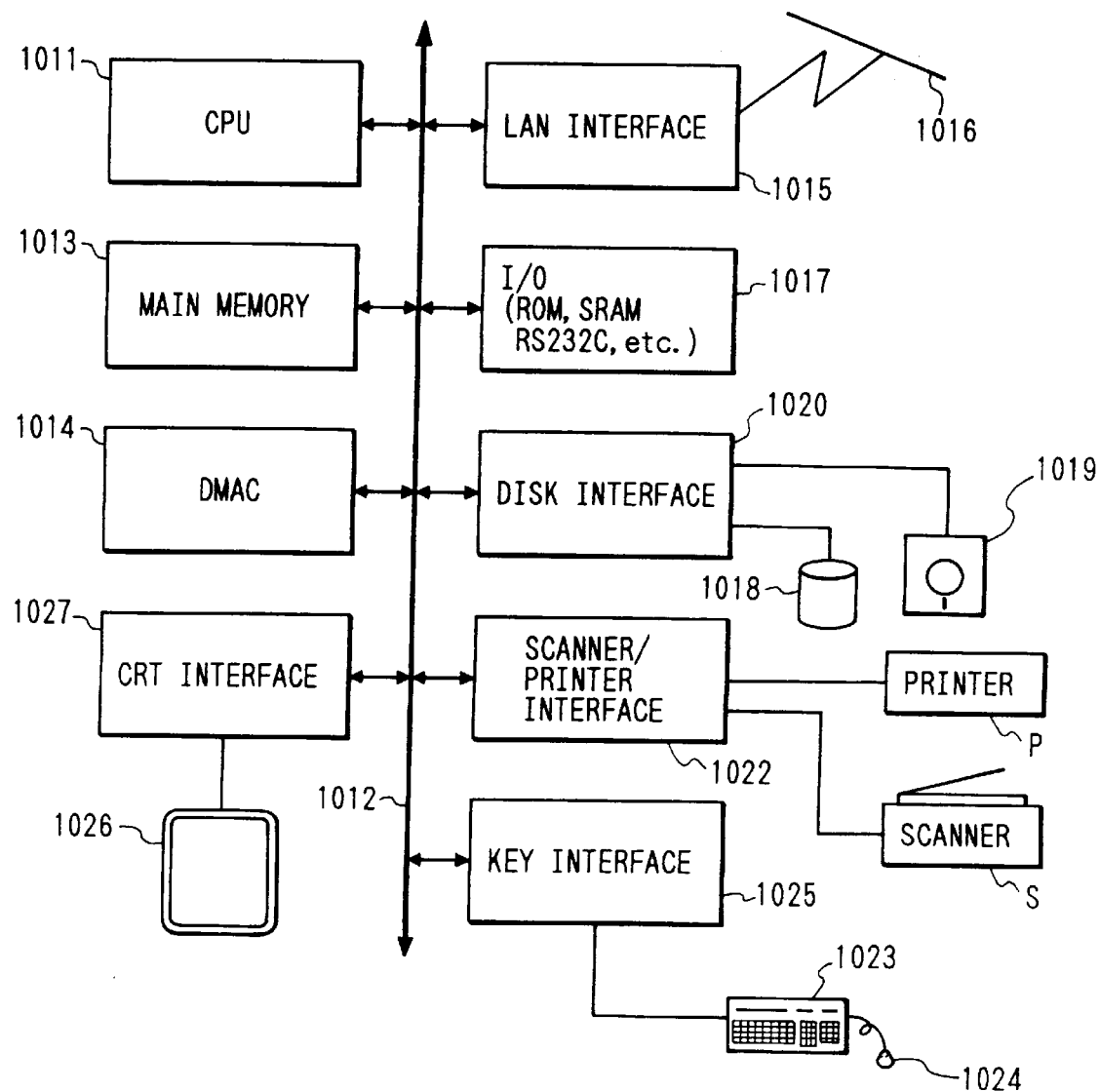

FIG. 5

IN C, M, Y ONLY

| PALLET DATA | CYAN (C) | MAGENTA (M) | YELLOW (Y) | BLACK (BK) | S1 | S2 | S3 | S4 |
|---|---|---|---|---|---|---|---|---|
| 0 | 0 | 0 | 0 | 0 | 0 | 0 | 0 | 0 |
| 1 | 255 | 0 | 0 | 0 | 0 | 0 | 0 | 0 |
| 2 | 0 | 255 | 0 | 0 | 0 | 0 | 0 | 0 |
| ------- | ------- | ------- | ------- | ------- | ------- | ------- | ------- | ------- |
| 255 | 0 | 255 | 255 | 0 | 0 | 0 | 0 | 0 |

| PALLET DATA | CYAN | YELLOW | MAGENTA | BLACK | S1 | S2 | S3 | S4 |
|---|---|---|---|---|---|---|---|---|
| 0 | 0 | 0 | 0 | 0 | 0 | 0 | 0 | 0 |
| 1 | 0 | 0 | 0 | 255 | 0 | 0 | 0 | 0 |
| ------ | ------ | ------ | ------ | ------ | ------ | ------ | ------ | ------ |
| 255 | 0 | 255 | 0 | 0 | 0 | 0 | 0 | 0 |

| PALLET DATA | CYAN | MAGENTA | YELLOW | BLACK | S1 | S2 | S3 | S4 |
|---|---|---|---|---|---|---|---|---|
| 0 | 0 | 0 | 0 | 0 | 255 | 0 | 0 | 0 |
| 1 | 0 | 0 | 0 | 0 | 0 | 255 | 0 | 0 |
| 2 | 0 | 0 | 0 | 0 | 0 | 0 | 0 | 0 |
| ------ | ------ | ------ | ------ | ------ | ------ | ------ | ------ | ------ |
| 255 | 0 | 0 | 255 | 0 | 0 | 255 | 0 | 0 |

| PALLET DATA | CYAN | MAGENTA | YELLOW | BLACK | S1 | S2 | S3 | S4 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 255 | 255 |
| 2 | 0 | 0 | 255 | 0 | 255 | 0 | 0 | 0 |
| ------ | ------ | ------ | ------ | ------ | ------ | ------ | ------ | ------ |
| 254 | 0 | 0 | 0 | 255 | 0 | 0 | 255 | 0 |
| 255 | 0 | 0 | 0 | 0 | 0 | 255 | 0 | 255 |

FIG. 19

| PALLET DATA | CYAN | MAGENTA | YELLOW | BLACK | S1 | ... | S4 |
|---|---|---|---|---|---|---|---|
| 0 | 0 | 0 | 0 | 0 | 0 | ... | 0 |
| 1 | 0 | 0 | 0 | 0 | 0 | ... | 0 |
| 2 | 0 | 0 | 0 | 0 | 0 | ... | 0 |
| 3 | 0 | 0 | 0 | 0 | 0 | ... | 0 |
| 4 | 0 | 0 | 0 | 0 | 0 | ... | 0 |
| 5 | 0 | 0 | 0 | 0 | 0 | ... | 0 |
| 6 | 0 | 0 | 0 | 0 | 0 | ... | 0 |
| ... | ... | ... | ... | ... | ... | ... | ... |
| 254 | 0 | 0 | 0 | 0 | 0 | ... | 0 |
| 255 | 0 | 0 | 0 | 0 | 0 | ... | 0 |

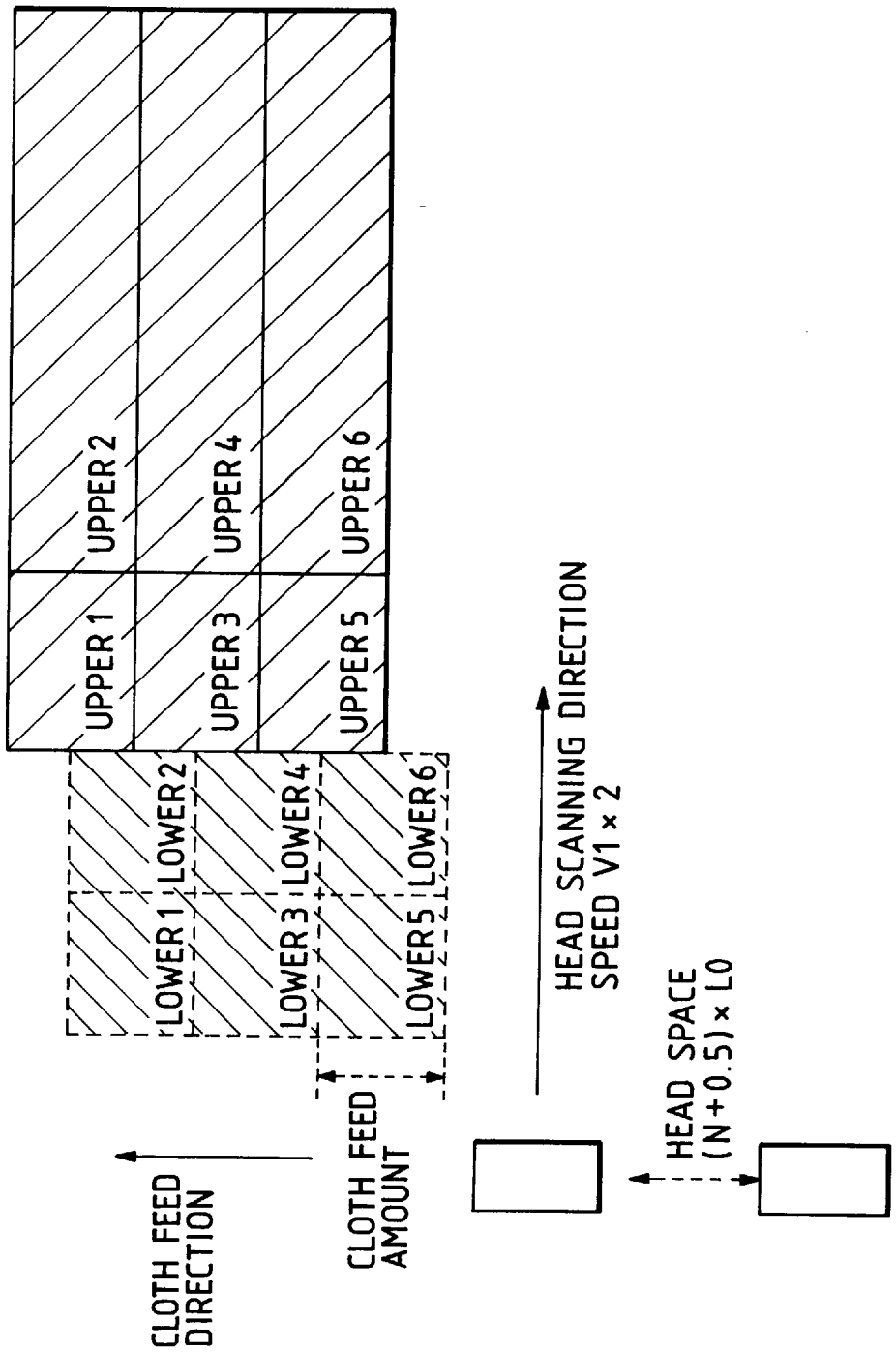

| 5 | 128 | 44 | | | 90 |
|---|---|---|---|---|---|
| 20 | 100 | 39 | | | 123 |
| 1 | 23 | 34 | | | 111 |
| 0 | 5 | 21 | | | 240 |
| 55 | 88 | 22 | | | 26 |
| 250 | 90 | 39 | | | 3 |
| 11 | 211 | 230 | | | 70 |
| | | | | | |
| 160 | 201 | 0 | | | 66 |

ORDERING TABLE

```
ORDERING DATA
   PURCHASER              : KANON
   DATE OF ORDER          : DECEMBER 20, 1992
   DESIRED DELIVERY DATE  : JANUARY 18, 1993
   OUTPUT                 : 2       [VOLUME]
   UNIT LENGTH L          : 20      [ m ]
   CLOTH WIDTH W          : 1.6     [ m ]
   CLOTH TYPE             : COTTON
RECORDING MODE
   ORDERING CODE          : 0 (NEW)
   RECORDING SPEED        : NORMAL
   RECORDING TIME         : 1
   INK NUMBER             : 4 TYPES
   INK TYPE               : C1、M1、Y2、K1
   PRINT ARRANGEMENT      : TYPE 1
   MAGNIFICATION          : 100%
   PRESENCE/ABSENCE OF LOGO : PRESENT
LOGO
   ORDERING CODE          : 0 (NEW)
   NAME                   : KANON
   POSITION               : 512、256
   SIZE                   : 512、8
   COLOR                  : RED (R)
   LOGO DATA              : (FILE NAME)
PALLET
   ORDERING CODE          : 0 (NEW)
   NAME                   : FLOWER PATTERN 1
   TYPE                   : OF
   PALLET DATA            : (FILE NAME)
IMAGE
   ORDERING CODE          : 0 (NEW)
   NAME                   : FLOWER PATTERN
   IMAGE SIZE X           : 1024 PIXELS
   IMAGE SIZE Y           : 1024 PIXELS
   IMAGE DATA             : (FILE NAME)
```

CONVERSION

TO FIG. 54B

INFORMATION PROCESSING APPARATUS HAVING MEANS FOR ESTIMATING EXPENDABLES TO BE CONSUMED DURING RECORDING This application is a continuation of application Ser. No. 08/186,477 filed Jan. 26, 1994, now abandoned.

BACKGROUND OF THE INVENTION

1. Field of the Invention

The present invention relates to an image supply system for supplying image data associated with recording, an image output apparatus for outputting a color image on a recording medium upon reception of the supplied image, and an image forming system having these apparatuses and, more particularly, to a printing system for printing an image on a piece or roll of cloth used as a recording medium.

The present invention relates to an information processing apparatus which is used in an image forming apparatus for repetitively forming a basic image on a recording medium, for example, a printing apparatus for printing an image on a piece of cloth used as a recording medium, and calculates consumption amounts of expendables, and an image forming system using the same.

2. Related Background Art

It is often desired to record another image data overlapping original image data (first image data) on a recording medium. For example, in the field of dressmaking, in order to cut a piece of cloth into a shape to be used in sewing, the same dress pattern as a cutting pattern is placed on a piece of cloth, and the curve of the cutting pattern is formed along the outer shape of the dress pattern on the cloth using a writing tool such as a tailor's chalk. Also, the dress pattern is placed on a piece of cloth via transfer paper such as chalk paper, and a stitch pattern drawn on the inner surface of the dress pattern is traced, thereby transferring a stitch pattern of, e.g., a pocket on the cloth.

Furthermore, information required upon sewing such as portions to be sewed up, kinds of sewing methods, and the like is often formed on a piece of cloth on the basis of information described on a dress pattern or in a manual.

Conventionally, formation of a cutting pattern, a stitch pattern, and other information on a piece of cloth is a work required in dressmaking as a process after printing. However, since this work utilizes a dress pattern or a manual, the manufacture and use of the dress pattern or the manual require much time and cost. More specifically, in the case of a manufacturer, a process of designing a dress pattern by a calculation from a human body by a skilled person or computer simulation, and then manufacturing a dress pattern or a manual which finally becomes unnecessary, is required.

On the other hand, in the case of a user, troublesome work for drawing a cutting pattern, a stitch pattern, and other information on a piece of cloth by utilizing a dress pattern is required. The stitch pattern and other information cannot be drawn without using transfer paper, and the transfer paper must also be prepared. In particular, when a normal user performs dressmaking, the user must purchase a dress pattern, and then do such troublesome tasks at home, thus requiring much cost and time until actual sewing work is started. Furthermore, it is timeconsuming to continue dressmaking with reference to dressmaking information described in, e.g., a manual, and a user may often refer to a wrong portion of the manual.

In order to solve these problems, an attempt has been made to record, e.g., a cutting pattern, on a piece of cloth on which an image has been recorded. However, two processes for recording images on a piece of cloth are required in correspondence with an original image, and a cutting image and the like, and a recording liquid for recording a cutting image must be devised. For example, a recording liquid which suffers less blurring must be used so as not to influence an original image, or a recording liquid which can be completely removed in postprocessing must be used, thus posing problems associated with cost.

Conventionally, an image output apparatus such as a color printer normally forms a color image received from an image supply apparatus such as a host computer on a recording medium such as a paper sheet. Most of image output apparatuses such as color printers do not accept supply of other image data during an image output operation. However, some printers, which can accept supply of other image data during an image output operation, temporarily store only image data in a separate recording apparatus, and execute the image output operations in the order of reception of image data. A printer may inform the end of recording to a host computer. A printer may receive image output requests generated from a plurality of host computers by a plurality of users.

When the recording time of an image output apparatus is long, the next image data cannot be accepted. In particular, in a printing system for forming an image on a roll of cloth, the length of cloth as a recording medium is often as large as several tens of meters, and hence, a recording time of several hours is inevitably required. As a result, the above-mentioned problem becomes more conspicuous. Also, a host computer cannot detect the image output end time. Furthermore, a user who requested output of an image cannot be specified.

In the dyeing work industries, strong demand has arisen for small-quantity/multi-item production, a short delivery term, a quick response to a change in specifications, and the like due to the nature of fashion designs, and the like. Since dyeing processes require skills, a problem associated with lack of talent is also posed. Furthermore, strong demand has arisen for an environmental countermeasure against disposal of waste dyes. Thus, as a technique for solving these problems, a plateless print technique for directly printing image data from, e.g., a computer on a piece of cloth has been developed in place of screen printing and roller printing, which use plates. In particular, application of an ink-jet print technique, a thermal transfer print technique, and the like to printing is considered as a means effective for the plateless print technique.

In the field of printing, upon cost calculation of print cloth, some items such as design cost, cloth cost, dyeing work cost, and the like are added. In the case of plateless print, ink cost and consumption cost of devices of a recording unit account for a large portion of the entire cost.

Note that the consumption cost of devices of the recording unit corresponds to a so-called ink-jet head in the ink-jet technique, and particularly corresponds to a heater unit in the thermal transfer technique. In an ink-Jet system, which is expected to be a future mainstream system of the plateless printing technique, the current level of the service life of discharge openings and heating means inside these openings, which constitute a head, is about $10^8$ to $10^9$. In high-density print, since the frequency of use of the head increases, the head is used up earlier, and hence, its consumption amount becomes large. A printing ink requires a dye concentration about 10 times that of an ink of a printer for normal office equipment, which results in high cost.

In this manner, in a plateless printing apparatus which can meet demand for small-quantity/multi-item production, and the like, head cost and ink cost account for a relatively large portion of the entire cost upon execution of a cost calculation of print cloth which is performed to estimate cost or to improve productivity. For this reason, it is strongly demanded to attain easy calculations of the consumption amounts and cost of these expendables with highest precision possible.

SUMMARY OF THE INVENTION

The present invention has been made in consideration of these problems, and has as its object to exclude the necessity of formation of a dress pattern, and the like, which finally become unnecessary, and to allow easy and reliable works in postprocessing.

It is another object of the present invention to decrease the number of processes and to reduce cost in an arrangement which records information required in postprocessing on a recording medium in advance.

In order to achieve these objects, according to the present invention, an image supply apparatus for supplying image data to an image output apparatus for recording an image on a recording medium comprises designation means for performing designation associated with second image data, which is different from first image data to be originally recorded, and is utilized in a process after an image output operation, so as to form the second image data on a recording medium on which the first image data is recorded.

The designation means can designate at least one of a pattern, size, recording position, and recording color of the second image data. The second image data can be used as data for processing the recording medium, which records the first image data.

Furthermore, the first and second image data can be synthesized in advance prior to supply of data. Also, according to the present invention, a control apparatus for an image output apparatus comprises first control means for controlling a recording head of the image output apparatus to perform image recording in accordance with the first image data supplied from the image supply apparatus, and second control means for accepting the designation associated with the second image data, and controlling the recording head to form the second image data on the recording medium, which records the first image data, on the basis of the accepted designation.

The second control means blanks the first image data with a designated color or in accordance with the second image data, thereby forming the second image data.

The image output apparatus according to the present invention comprises the control apparatus, and a recording head for performing recording on a recording medium.

A plurality of recording heads may be arranged in correspondence with recording agents with different color tones.

The recording head may comprise an ink-jet recording head which uses an ink as the recording agent, and discharges the ink, and may have elements for generating thermal energy for causing film boiling in the ink as energy utilized for discharging the ink.

Furthermore, according to the present invention, an image forming system comprises the image supply apparatus and the image output apparatus.

The system may be applied to a printing system for printing an image on a piece or roll of cloth, and the second image data may be a cutting pattern or the like for dressmaking.

According to the present invention, the image supply apparatus comprises the designation means for designating a pattern, size, recording position, color, and the like associated with the second image data such as a cutting pattern for dressmaking, and the control apparatus for the image output apparatus comprises the second control means for accepting the designation, and executing the recording control associated with the second image data in addition to the first control means for executing recording control associated with the first image data. For these reasons, the second image data can be formed as required, and formation of, e.g., a dress pattern upon dressmaking can be omitted.

The present invention has as its object to solve the above-mentioned problems. To achieve this object, according to the present invention, an image supply apparatus for supplying image data to an image output apparatus, which can form an image, comprises means for supplying management data to be used in production management or ordering management to be executed on the image output apparatus side in association with the image data.

Also, according to the present invention, an image output apparatus comprises image forming means and management means for causing the image forming means to execute image formation on the basis of the management data supplied from the image supply apparatus.

The image output apparatus comprises a plurality of image output means, and the management means comprises production management means for managing a schedule including the output order and required output times of the plurality of image output means in accordance with the management data to be used in the production management, and ordering management means for managing data including delivery dates of products and customer information in accordance with the management data to be used in the ordering management.

Some or all of the management data are formed together with an image corresponding to the image data received from the image supply apparatus.

Furthermore, according to the present invention, an image forming system comprises the image supply apparatus and the image output apparatus.

In addition, a data management method according to the present invention is applied to the system so as to perform transmission, reception, storage, and formation onto a recording medium of the image data and the management data in association with each other.

According to the present invention, in the image forming system, since the image supply apparatus supplies image data and management data in association with each other, and the image output apparatus manages and stores image data and management data in association with each other, formation of a production plan and the ordering management in the image output apparatus can be attained. Even during an image formation operation of the image output apparatus, image data can be received.

For these reasons, according to the present invention, an information processing apparatus, which is applied to an image forming system capable of repetitively recording a basic image in a predetermined pattern, comprises first means for obtaining the number of dots which form the basic image, and second means for calculating a consumption amount of expendables consumed by recording on the basis of the number of dots.

The information processing apparatus further comprises third means for performing a cost calculation of image recording on the basis of the consumption amount.

An image forming system according to the present invention comprises the information processing apparatus, an image output apparatus which has a recording head, and records an image on a recording medium using a recording agent, and an image supply apparatus for supplying image data to the image output apparatus.

The information processing apparatus may be integrated to the image output apparatus or the image supply apparatus.

Therefore, in the image forming system for repetitively printing a basic image, since the number of dots which form the basic image is obtained, and the consumption amounts of expendables including a recording agent such as an ink, a recording head, and the like are calculated based on the number of dots, the calculated consumption amounts can be used in a production plan, a calculation of production cost, and the like.

BRIEF DESCRIPTION OF THE DRAWINGS

FIG. 1 is a block diagram showing the overall arrangement of a printing system according to the first embodiment of the present invention;

FIG. 3 is a block diagram of a system mainly illustrating the arrangement of a host computer according to the first embodiment of the present invention;

FIGS. 5 to 8 are explanatory views showing examples of a pallet conversion table generated in the sequence shown in FIG. 4;

FIG. 19 is an explanatory view for explaining data which are set to prevent abnormal outputs before conversion parameters are input to memories shown in FIG. 17;

FIGS. 37 to 40 are explanatory views for explaining examples of a print method;

DETAILED DESCRIPTION OF THE PREFERRED EMBODIMENTS

[First Embodiment]

The first embodiment of the present invention will be described in detail hereinafter with reference to the accompanying drawings.

A printing system as the first preferred embodiment of the present invention will be described hereinafter in the following order.

(1) Overall System (FIGS. 1 and 2)
(2) Host Computer (FIGS. 3 to 11)
   (2.1) Arrangement
   (2.2) Operation
(3) Printer (FIGS. 12 to 27)
   (3.1) Print Mechanism
   (3.2) Apparatus Arrangement
   (3.3) Print Pattern of Basic Image
   (3.4) Download of Conversion Data and Parameters (1) Overall System FIG. 1 shows the overall arrangement of a printer system according to the first embodiment of the present invention. A host computer H serves as a data supply apparatus for supplying original image data, control commands, and the like for printing to a printer P for performing recording (to be also referred to as printing hereinafter) on a recording medium such as a piece or roll of cloth. An original image, which is created by a designer, and is read using a scanner S, can be desirably modified using the host computer H, and desired parameters can be set in the printer P to perform printing. The host computer H is coupled to a LAN (local area network) 1016 such as an Ethernet (proposed by XEROX Corp.), and allows communications with other systems. The printer P informs the host computer H of the printers state. The details of the host computer H will be described later with reference to FIG. 3, and the details of the printer P will be described later with reference to FIG. 12 and the like.

Figure 2:
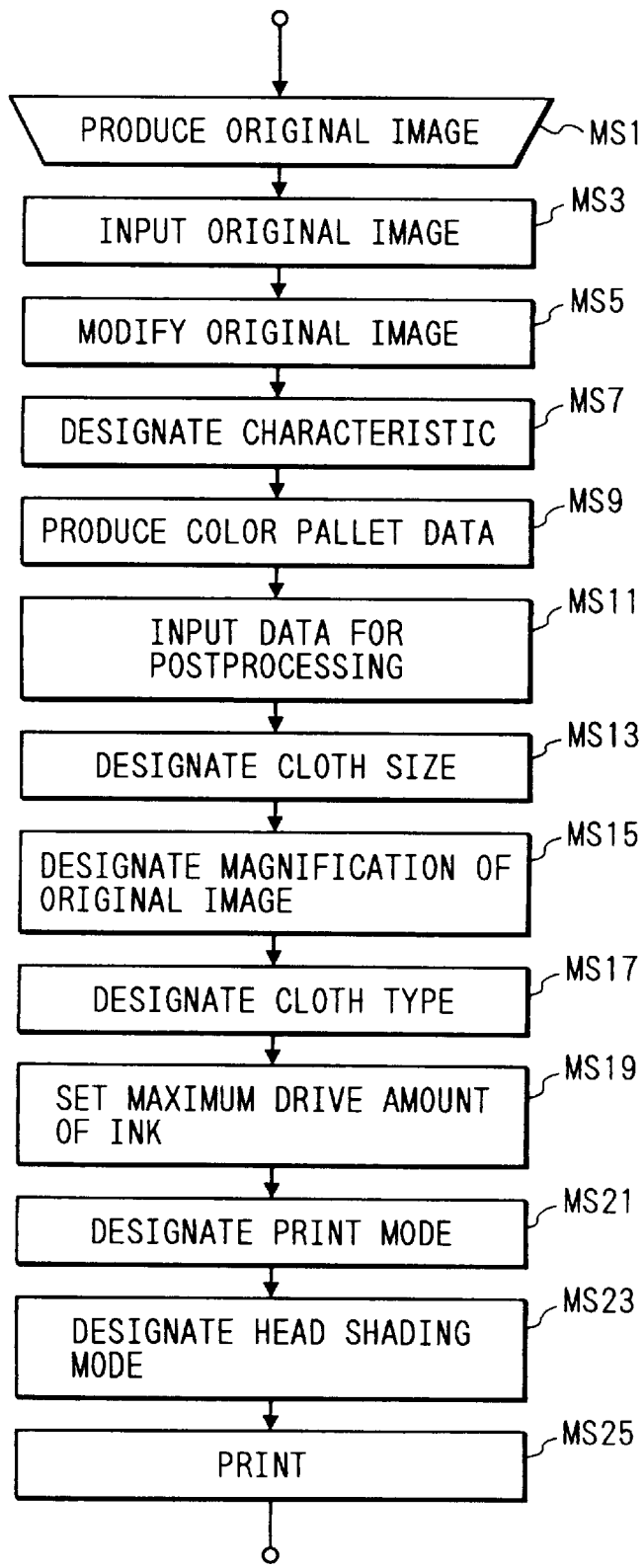
FIG. 2 is a schematic flow chart showing a printing processing sequence of the system.

FIG. 2 shows an example of a printing processing sequence which can be executed using the system of this embodiment. The processing contents executed in the respective steps are, for example, as follows.

Original Image Production Step MS1

In this step, a designer produces an original image, i.e., a basic image serving as a basic unit of a repetitive image on a piece of cloth as a recording medium using proper means. Upon production, the required units (e.g., input means, display means, and the like; to be described in detail later with reference to FIG. 3) of the host computer H may be used.

Original Image Input Step MS3

In this step, an original image produced in original image production step MS1 is read into the host computer H using the scanner S, original image data stored in an external storage of the host computer H is read, or original image is received from the LAN 1016.

Original Image Modification Step MS5

As will be described later with reference to FIG. 24, the printing system of this embodiment can select various repetitive patterns with respect to a basic image. In this case, unexpected image position shift or discontinuity of color tones may occur at a boundary portion depending on a selected repetitive pattern. In this step, selection of a repetitive pattern is accepted, and discontinuity at a boundary portion of the repetitive pattern is modified in accordance with the selection. The modification may be performed by a designer or an operator using input means such as a mouse and the like with reference to the screen of a display of the host computer H, or may be automatically performed by image processing of the host computer H itself.

Characteristic Designation Step MS7

The printer P according to this embodiment basically performs a print operation using yellow (Y), magenta (M), and cyan (C) inks, or a black (BK) ink in addition to the Y, M, and C inks. In printing, it is often desired to use colors other than the above-mentioned colors, for example, metallic colors such as gold, silver, and the like; clear red (R), green (G), and blue (B); and the like. Thus, in the printer P of this embodiment, a print operation using inks of these special colors (to be referred to as characteristics hereinafter) is allowed, and in this step, a characteristic is designated.

Color Pallet Data Production Step MS9

In design, a designer produces an original image while selecting colors from a standard color patch. Reproducibility of colors upon print with respect to the selected colors largely influences productivity of the printing system. Thus, in this step, data for determining a mix ratio of Y, M, and C or a characteristic is produced so as to satisfactorily reproduce selected standard colors.

Postprocessing Data Input Step MS11

A cutting pattern or the like used in works (sewing, and the like) in postprocessing is input to the produced, modified original image. In this step, the color, size, position, and the like of such a pattern are designated.

Cloth Size Designation Step MS13

The width, length, and the like of a piece of cloth as a print object are designated. With this step, the scanning amounts in the main scanning direction and the subscanning direction of a recording head in the printer P, the repetition number of an original image pattern, and the like are determined.

Original Image Magnification Designation Step MS15

A magnification factor (e.g., 100%, 200%, 400%, or the like) upon print with respect to an original image is set.

Cloth Type Designation Step MS17

Various types of cloth including, e.g., natural fibers such as cotton, silk, wool, and the like, and synthetic fibers such as nylon, polyester, acrylic fiber, and the like, are available, and have different characteristics associated with printing. When the feed amount upon print remains the same, a stripe appears in different ways depending on the types of cloth at a boundary portion of each main scan although such a phenomenon may depend on the stretchability of cloth. In this step, the type of cloth associated with print is input, and is used for setting a proper feed amount in the printer P.

Maximum Ink Drive Amount Setting Step MS19

Even when the amount of ink to be driven onto cloth remains the same, the image density reproduced on the cloth varies depending on the types of cloth. Also, the amount of ink to be able to be driven varies depending on, e.g., the arrangement of a fixing system in the printer P. Thus, in this step, the maximum drive amount of ink is designated in accordance with the type of cloth, the arrangement of the fixing system of the printer P, and the like.

Print Mode Designation Step MS21

Whether high-speed or normal print is performed in the printer P, whether one or a plurality of ink drive operations are performed for each dot, and so on, are designated. Furthermore, whether control is made to obtain a continuous pattern before and after the interruption or to start print independently of continuity of a pattern when print is interrupted may be designated.

Head Shading Mode Designation Step MS23

When a recording head having a plurality of discharge openings is used in the printer P, the ink discharge amount or discharge direction may vary or deviate in units of discharge openings of a head depending on a variation in the manufacture, the using state of the printer, and the like. Thus, in order to correct such a variation, processing (head shading) for correcting drive signals in units of discharge openings to obtain constant discharge amounts is often performed. In this step, the timing, and the like of head shading can be designated.

Print Step MS25

Printing is executed by the printer P on the basis of the above-mentioned designations.

If the above-mentioned designations and the like include unnecessary ones, the corresponding steps may be omitted or skipped. Also, other designation steps and the like may be added as needed.

(2) Host Computer (2.1) Arrangement

FIG. 3 is a block diagram of the overall system mainly illustrating the arrangement of the host computer according to the first embodiment of the present invention.

Referring to FIG. 3, a CPU 1011 controls the entire information processing system. A main memory 1013 stores a program to be executed by the CPU 1011, and is used as a work area upon execution of the program. A DMA controller (Direct Memory Access Controller; to be abbreviated as DMAC hereinafter) 1014 transfers data between the main memory 1013 and various devices constituting this system without going through the CPU 1011. A LAN interface 1015 interfaces between the LAN 1016 and this system. An input/output device (to be referred to as an I/O hereinafter) 1017 has a ROM, an SRAM, an RS232C type interface, and the like. The I/O 1017 can be connected to various external devices. A hard disk device 1018 and a floppy disk device 1019 respectively serve as external storage devices. A disk interface 1020 attains signal connections between the hard disk device 1018 or the floppy disk device 1019, and this system. A printer/scanner interface 1022 attains signal connections between the printer P/scanner S, and the host computer H, and complies with the GPIB specifications. A keyboard 1023 is used for inputting various kinds of character information, control information, and the like. A mouse 1024 serves as a pointing device. A key interface 1025 attains signal connections between the keyboard 1023/mouse 1024 and this system. A display operation of a display device 1026 such as a CRT is controlled by an interface 1027. A system bus 1012 includes a data bus, a control bus, and an address bus for attaining signal connections among the above-mentioned devices.

(2.2) Operation

In the system constituted by connecting the above-mentioned devices, a designer or an operator performs an operation in response to various kinds of information displayed on the display screen of the CRT 1026. More specifically, character information, image information, and the like supplied from the LAN 1016, external devices connected to the I/O 1017, the hard disk device 1018, the floppy disk device 1019, the scanner S, the keyboard 1023, and the mouse 1024, operation information stored in the main memory 1013 and associated with the system operation, and the like are displayed on the display screen of the CRT 1026, and a designer or an operator designates various kinds of information or performs various designations for the system while observing the displayed information.

Of various steps shown in FIG. 2, the details of some processing steps associated with main part of this embodiment, which are executed using the system shown in FIG. 3, will be described below.

Figure 4:
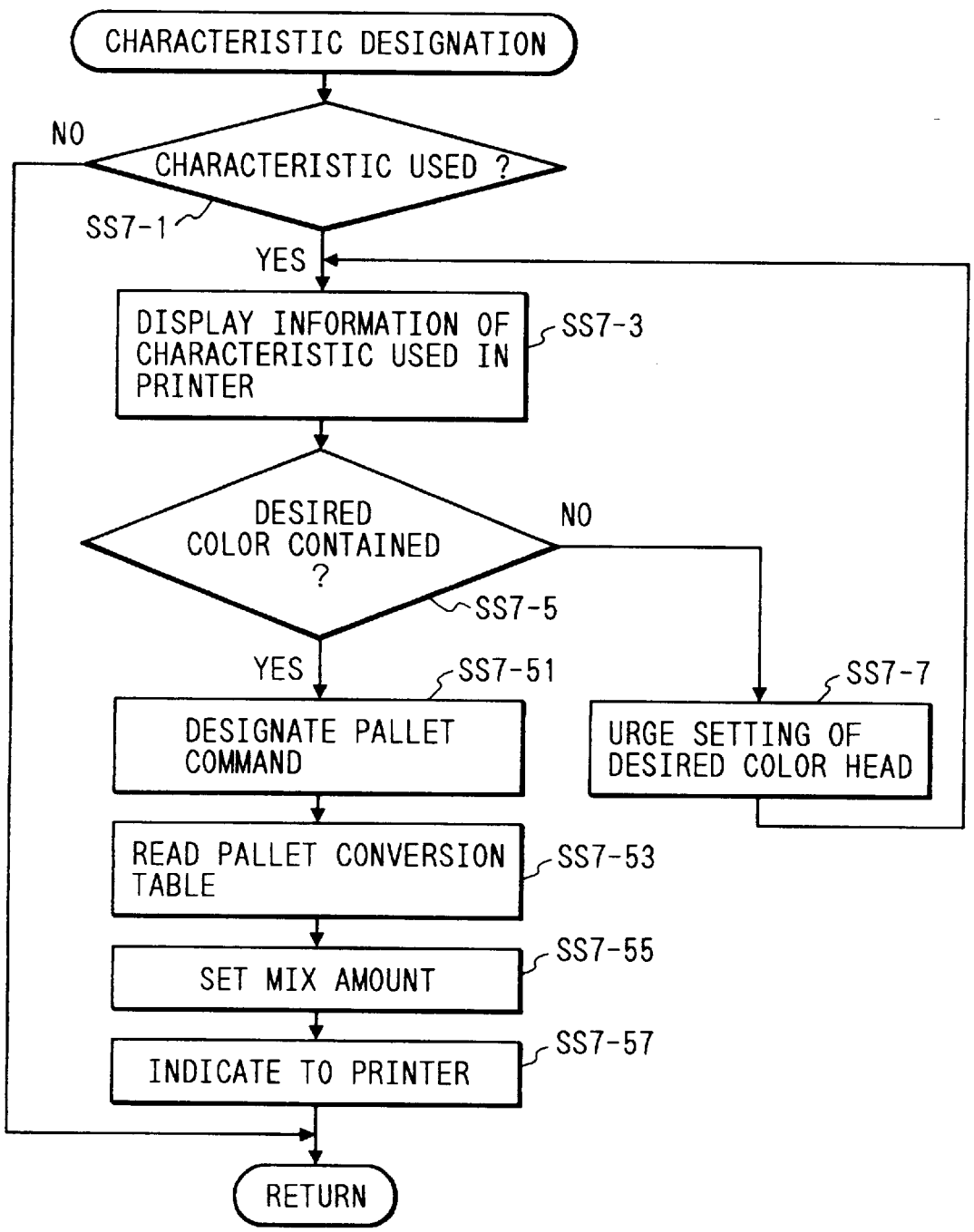
FIG. 4 is a flow chart showing an example of a characteristic designation processing sequence in FIG. 2.

FIG. 4 shows an example of the characteristic designation processing sequence in FIG. 2. In this sequence, a pallet conversion table produced by the host computer H is output as a pallet conversion table (a table indicating the mix ratio of Y, M, C, BK, and a characteristic) in the printer P, which table corresponds to pallet data supplied from the host computer H to the printer P. When this sequence is started, it is checked in step SS7-1 if the use of a characteristic is designated. If NO in step SS7-1, this sequence immediately ends. However, if YES in step SS7-1, the flow advances to step SS7-3, and information associated with the current characteristic in the printer P is displayed on the CRT 1026. In this processing, for example, the invention disclosed in Japanese Laid-Open Patent Application No. 2-187343 or the like proposed by the present applicant may be utilized. In this invention, a recording head of a printer has means (pattern cutting) for presenting its own information, and a printer main body can recognize the presented information. As the means for presenting the information, an EPROM, DIP switches, or the like may be used. When this invention is applied to this embodiment, ink colors used by the recording head may be used as the information to be presented. The printer P may read the information, and send the read information to the CPU loll of the host computer H. An operator can know the presence/absence of the current use of a recording head for a characteristic, and a currently used characteristic on the basis of the information displayed on the CRT 1026, and can perform a key operation, and the like indicating whether or not a desired characteristic is included (i.e., whether or not the current state is acceptable) in step SS7-5. If NO is selected in step SS7-5, the flow advances to step SS7-7 to display a message for urging an operator to set a recording head for a desired color, and when a head is set, the flow returns to step SS7-3.

If the operator determines in step SS7-5 that recording heads currently used in the printer P are acceptable, he or she designates a pallet command for defining a combination of colors in step SS7-51. In this case, the operator can designate, using numerical values "3", "4", "6", and "8", a case wherein three colors C, M, and Y are used in print, a case wherein BK is used in addition to these three colors, a case wherein characteristics S1 and S2 are used in addition to the three colors C, M, and Y, and a case wherein characteristics S3 and S4 are used in addition to these colors.

In response to this designation, in step SS7-53, a pallet conversion table prestored in a storage device (the main memory 1013, the external storage device 1018 or 1019, or the like) is read out. The operator properly modifies the readout table as needed to set mix amounts of the respective colors (step SS7-55). Then, the table data is sent to the printer P together with the pallet command (step SS7-57). As the pallet conversion table, for example, tables shown in FIGS. 5 to 8 may be used.

As a processing circuit on the printer P side for this sequence, a circuit which will be described later with reference to FIGS. 15 to 19 may be used.

Figure 9:
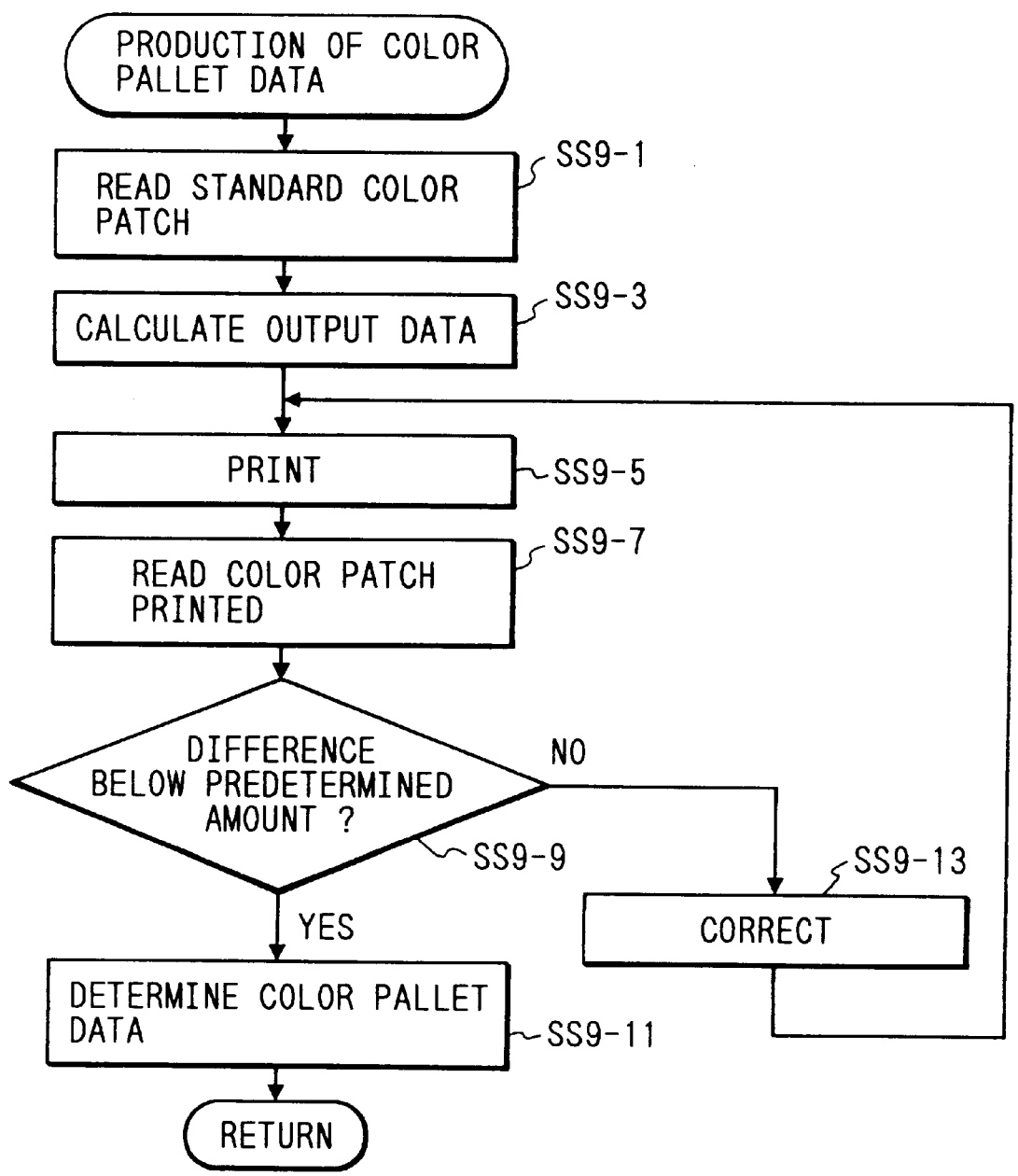
FIG. 9 is a flow chart showing an example of a color pallet data production sequence in FIG. 2.

FIG. 9 shows an example of the detailed processing sequence of color pallet data production step MS9 in FIG. 2.

In this sequence, in step SS9-1, a standard color patch of colors selected by a designer is read. For this purpose, the scanner S or reading means provided to the printer P (to be described later) may be used. In step SS9-3, pallet conversion data including a characteristic are calculated using a pallet conversion table, which is set in advance to match with the printer P, on the basis of codes corresponding to the standard color patch, and image formation is performed in accordance with the calculated data including the characteristic. In step SS9-5, the formed image is printed in the form of a color patch.

In step SS9-7, the color patch printed by the printer P is read, and the read color data is compared with color data obtained in step SS9-1. If the difference between these two data is smaller than a predetermined value, the color pallet conversion data at that time are adopted in step SS9-11, and are set in the printer P. On the other hand, if the difference is equal to or larger than the predetermined value, the pallet data are corrected based on the difference in step SS9-13, and the flow returns to step SS9-5. Then, the processing is repeated until YES is determined in step SS9-9. Note that the cases using the characteristics S1, S2, S3, and S4 in the characteristic processing sequence in FIG. 4 have been described. In these cases, pallet conversion tables produced by an operator in correspondence with these cases using the characteristics S1, S2, S3, and S4 may be modified based on data obtained in this sequence. According to this embodiment, a combination of a plurality of inks including a characteristic corresponding to codes of colors can be properly selected from a color patch, i.e., codes of colors selected by a designer.

Figure 10:
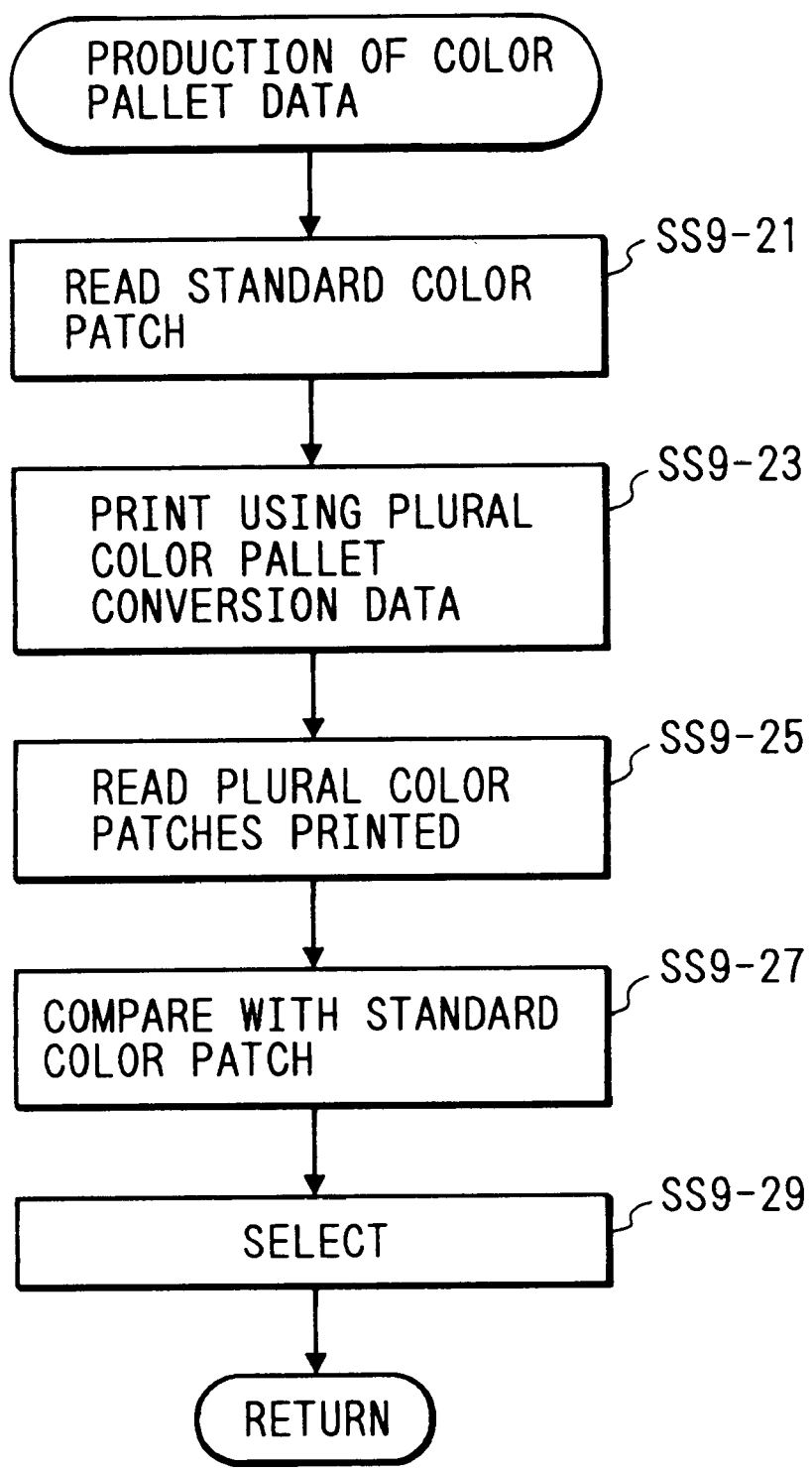
FIG. 10 is a flow chart showing another example of the color pallet data production sequence.

FIG. 10 shows another example of the detailed processing sequence of the color pallet data production step.

In this sequence, the standard color patch is read in step SS9-21 as in step SS9-1. In this sequence, a plurality of different color pallet conversion data are prepared in step SS9-23, and a plurality of color patches are printed in correspondence with these data. In step SS9-25, the plurality of color patches are read, and in step SS9-27, color data obtained from these patches are compared with color data obtained in step SS9-21. In step SS9-29, the color pallet conversion data closest to the color data obtained in step SS9-21, i.e., having the highest color reproducibility is selected, and is set in the printer P.

Note that the plurality of color pallet conversion data prepared in step SS9-23 may consist of data obtained by changing the ink mix amounts by a predetermined amount for all color recording heads, or may consist of data obtained by selecting a predetermined range centering around the data obtained in step SS9-21 or data set by an operator in the sequence in FIG. 4, and by changing the ink mix amounts little by little in the selected range. In this sequence, since the processing steps of performing correction and re-print can be omitted, color pallet conversion data production processing can be executed at higher speed than in the sequence shown in FIG. 9.

Figure 11:
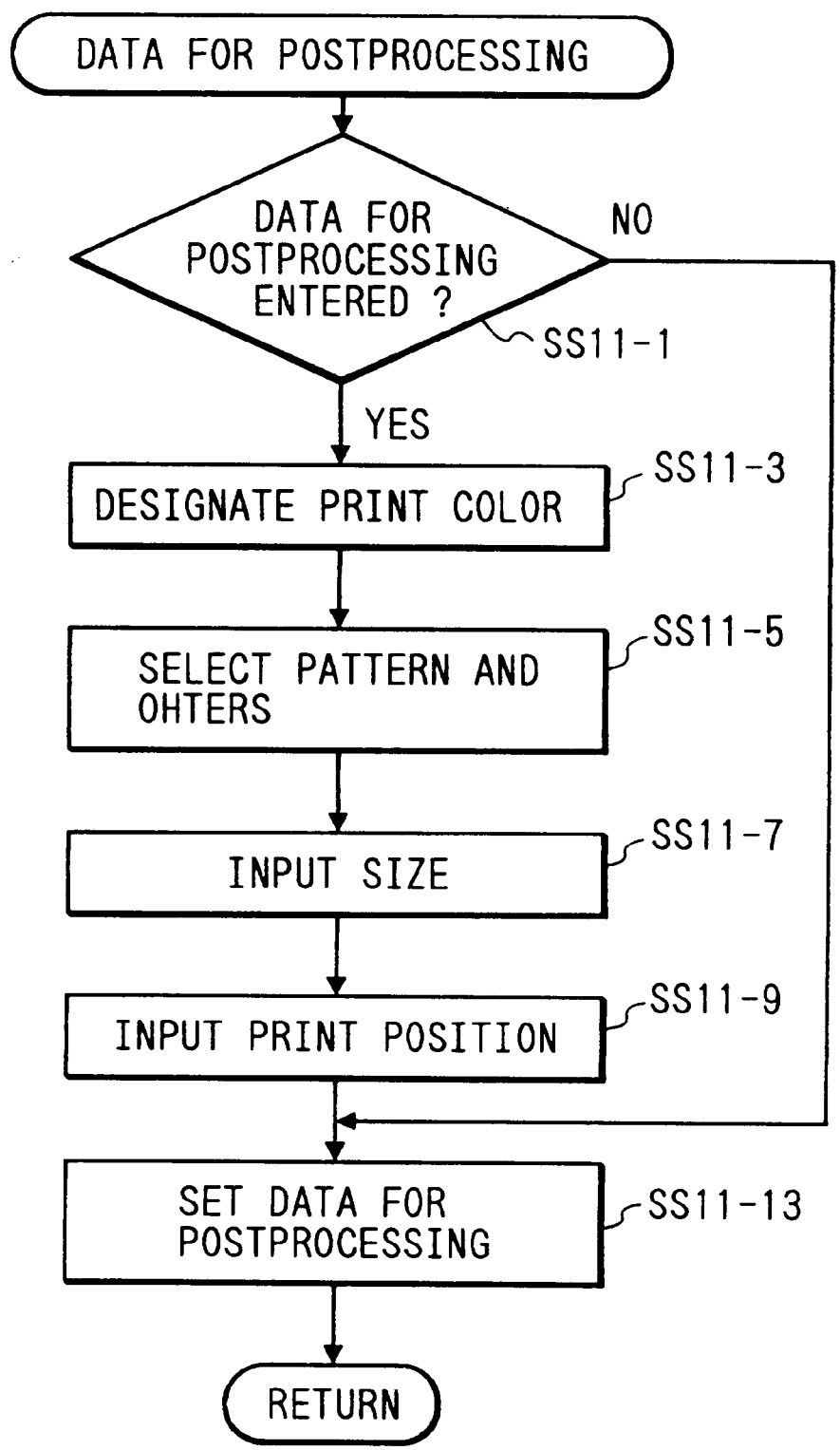
FIG. 11 is a flow chart showing an example of a post-processing data input processing sequence in FIG. 2.

FIG. 11 shows an example of the postprocessing data input processing sequence in FIG. 2.

In this sequence, it is asked to an operator in step SS11-1 if postprocessing data as information of a cutting pattern; a stitch pattern, and the like to be printed on a piece of cloth is to be entered. If YES in step SS11-1, a color of postprocessing data to be printed is designated in step SS11-3. In this case, the color to be designated can be selected from eight colors, i.e., C, M, Y, BK, and characteristics S1, S2, S3, and S4.

In step SS11-5, a cutting pattern, a stitch pattern, and the like are designated. This designation can include the type of line such as a solid line, a broken line, or the like, and the thickness of a line. Alternatively, an operator may select a line from a plurality of types of lines which are prepared in advance.

In step SS11-7, the sizes of postprocessing data to be printed in the main scanning direction (X direction) and the subscanning direction (Y direction) of a print are designated.

In step SS11-9, the print start position of the postprocessing data on a piece of cloth is designated.

In step SS11-13, the host computer H sets postprocessing data information in the printer P in correspondence with the above-mentioned designations. The arrangement on the printer P side corresponding to this setting operation will be described later with reference to FIGS. 21A to 21B.

(3) Printer (3.1) Print Mechanism

An operation of a serial type ink-Jet recording apparatus as the printer P which is applicable to the present invention will be described below with reference to FIG. 12.

Figure 12:
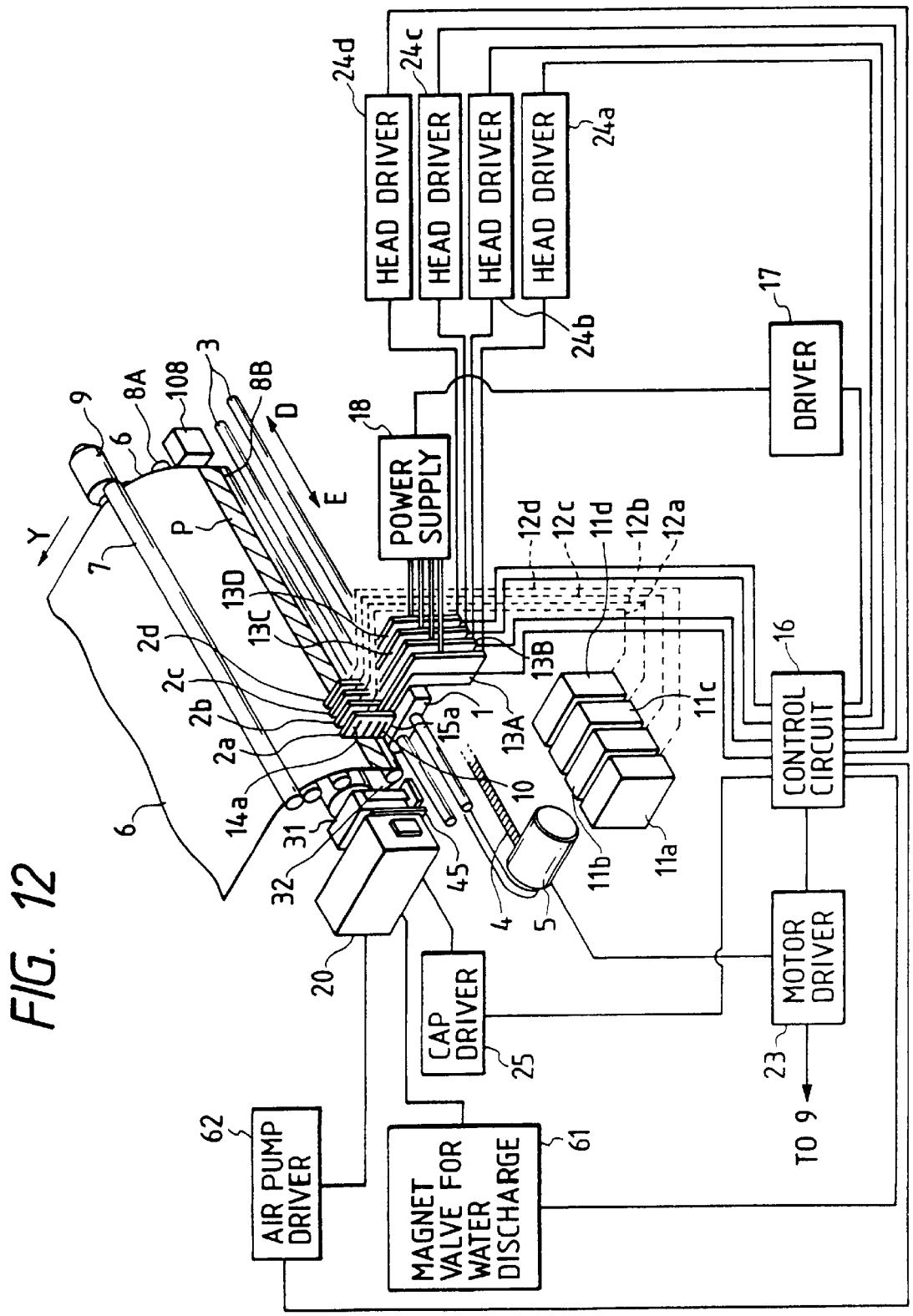
FIG. 12 is a schematic perspective view showing the mechanical arrangement of a printer applied to the first embodiment.

Referring to FIG. 12, a carriage 1 mounts color recording heads 2a, 2b, 2c, and 2d corresponding to four colors, i.e., cyan (C), magenta (M), yellow (Y), and black (BK), and is movably supported by a guide shaft 3. Although not shown for the sake of simplicity, in this embodiment, a maximum of four heads for characteristics can be mounted on the carriage 1, and a mechanism associated with these heads is arranged. The heads may be detachable from the carriage i in units of one or a plurality of heads.

A portion of a belt 4 as an endless belt is fixed and connected to the carriage 1, and is looped on a gear attached to the driving shaft of a carriage driving motor 5 using a pulse motor (driven by a motor driver 23). Therefore, when the carriage driving motor 5 is driven, the belt 4 looped on the driving shaft is fed, and as a result, the carriage 1 scans the recording surface of a recording medium along the guide shaft 3. Furthermore, the apparatus comprises feed rollers 7 for feeding a recording medium 6 (recording paper, cloth, or the like), guide rollers 8A and 8B for guiding the recording medium 6, and a recording medium feed motor 9.

Each of the recording heads 2a, 2b, 2c, and 2d, and the recording heads for characteristics has 256 discharge openings for discharging ink droplets toward the recording medium 6 at a density of 400 DPI (dots/inch). The recording heads 2a, 2b, 2c, and 2d (and the heads for characteristics) receive inks from corresponding ink tanks 11a, 11b, 11c, and 11d (and ink tanks for characteristics) via supply tubes 12a, 12b, 12c, and 12d (and supply tubes for characteristics). Head drivers 24a, 24b, 24c, and 24d (and drivers for characteristics) selectively supply ink discharge signals to energy generation means (not shown) provided to nozzles communicating with the discharge openings via flexible cables 13a, 13b, 13c, and 13d (and flexible cables for characteristics).

Furthermore, the recording heads 2a, 2b, 2c, 2d, and the like are respectively provided with head heaters 14a, 14b, 14c, 14d, and the like (14b, 14c, 14d, and the like are not shown), and temperature detection means 15a, 15b, 15c, 15d, and the like (15b, 15c, 15d, and the like are not shown). Detection signals from the temperature detection means 15a, 15*b*, 15*c*, 15*d*, and the like are input to a control circuit 16 having a CPU. The control circuit 16 controls the heating states of the head heaters 14*a*, 14*b*, 14*c*, 14*d*, and the like via a driver 17 and a power supply 18 on the basis of these input signals.

A capping means 20 contacts the discharge opening surfaces of the recording heads 2*a*, 2*b*, 2*c*, and 2*d* in a non-recording state, and suppresses drying of the heads and mixing of foreign matter or removes such foreign matter. More specifically, the recording heads 2*a*, 2*b*, 2*c*, and 2*d* are moved to a position opposing the capping means 20 in a non-recording state. The capping means 20 is moved forward by a cap driver 25, and performs capping by pressing an elastic member 44 against the discharge opening surfaces. Although not shown, a capping means for the heads for characteristics is also arranged, as a matter of course.

A clogging prevention means 31 receives discharged inks when the recording heads 2*a*, 2*b*, 2*c*, 2*d*, and the like perform idle discharge operations. The clogging prevention means 31 comprises an ink reception member 32 which opposes the recording heads 2*a*, 2*b*, 2*c*, 2*d*, and the like, and absorbs and receives the inks discharged in the idle discharge operations. As the material of the ink reception member 32 and an ink holding member 45, a sponge-like porous member, a plastic sintered body, or the like is effective.

A magnet valve 61 for water discharge and an air pump driver 62 are coupled to the capping means 20, and drive nozzles for discharging washing water and nozzles for injecting air, which nozzles are arranged in the capping means 20, under the control of the control circuit 16.

Figure 13:
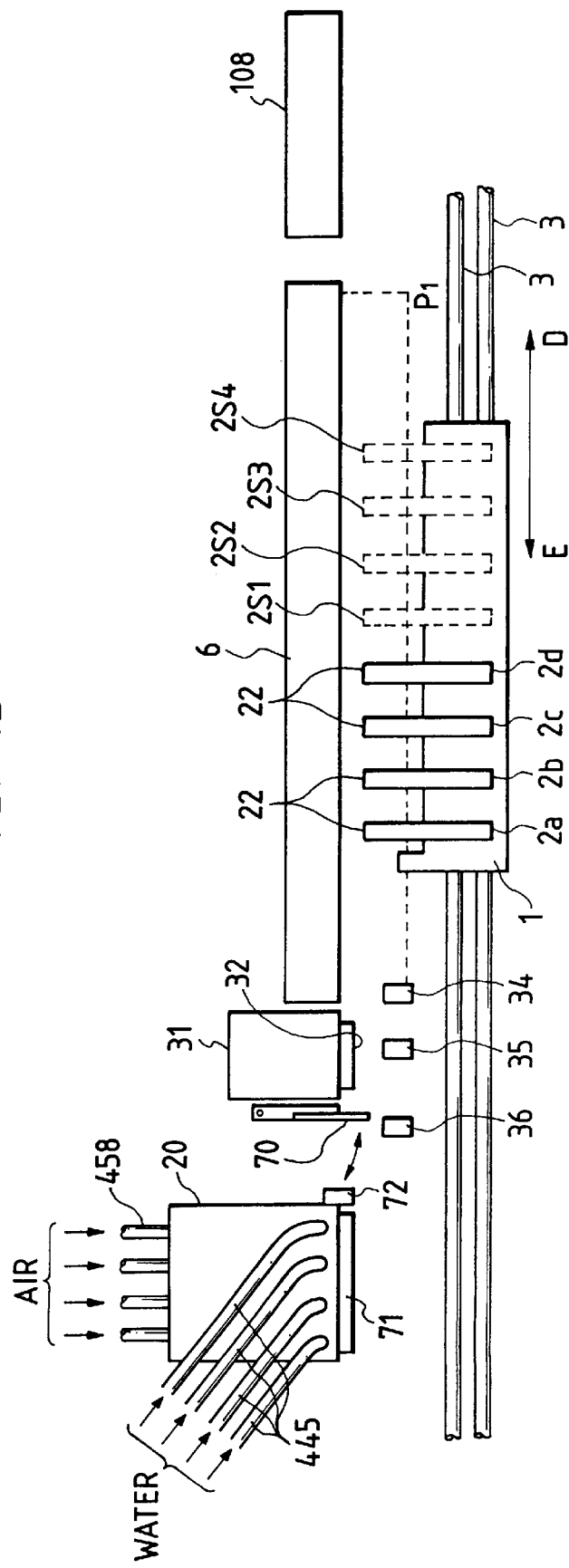
FIG. 13 is a plan view of the printer in FIG. 12.

FIG. 13 is a plan view for explaining an operation of the recording heads of this embodiment. The same reference numerals in FIG. 13 denote the same parts as in FIG. 12, and a detailed description thereof will be omitted. In FIG. 13 as well, an arrangement associated with heads 2S1 to 2S4 for characteristics are not shown.

Referring to FIG. 13, a recording start detection sensor 34 and a capping means detection sensor 36 are used for detecting the positions of the recording heads 2*a*, 2*b*, 2*c*, and 2*d*. An idle discharge position detection sensor 35 detects a reference position of an idle discharge operation, which is performed by the recording heads 2*a*, 2*b*, 2*c*, and 2*d* while being moved in the scanning direction.

A head characteristic measuring apparatus (or means) 108 can be used in head shading (step MS23 in FIG. 2), and production of color pallet data (step MS9). The apparatus 108 comprises a feed means for feeding a recording medium on which a test pattern for head shading or a color patch is printed by the heads, and a reading means for reading the printed information. As the head characteristic measuring means, one shown in, e.g., FIG. 31 of Japanese Laid-Open Patent Application No. 4-18358 proposed by the present applicant may be used.

The ink-jet recording operation will be described below.

In a standby state, the recording heads 2*a*, 2*b*, 2*c*, and 2*d* are subjected to capping by the capping means 20. When a print signal is input to the control circuit 16, the motor 5 is driven by the motor driver 23, and the carriage 1 begins to move. When the idle discharge position detection sensor 35 detects each recording head upon movement of the carriage 1, the detected recording head performs an idle discharge operation of an ink to the clogging prevention means 31 for a predetermined period of time. Thereafter, the carriage 1 is moved in a direction of an arrow D, and when this movement is detected by the recording start detection sensor 34, the discharge openings of the recording heads 2*a*, 2*b*, 2*c*, 2*d*, and the like are selectively driven. Thus, ink droplets are discharged, and image recording is performed in units of dot matrix patterns on a recording width portion p of the recording medium 6. When recording is continued in units of predetermined widths (determined by the vertical nozzle interval and the number of nozzles of the recording head), the carriage 1 is moved to the right end position in FIG. 13 (this position can be detected by counting the number of pulses supplied to the motor 5). After this position is detected, pulses for the total width of the recording heads are supplied to the motor 5, so that the recording head 2*a* at the trailing end of the carriage 1 crosses the recording medium. Thereafter, the carriage 1 is reversed, and is driven in a direction of an arrow E to return to the idle discharge position. The recording medium 6 is fed in a direction of an arrow F by an amount equal to or larger than the width of the recording width portion p, and the above-mentioned operations are repeated again.

(3.2) Apparatus Arrangement

Figure 14:
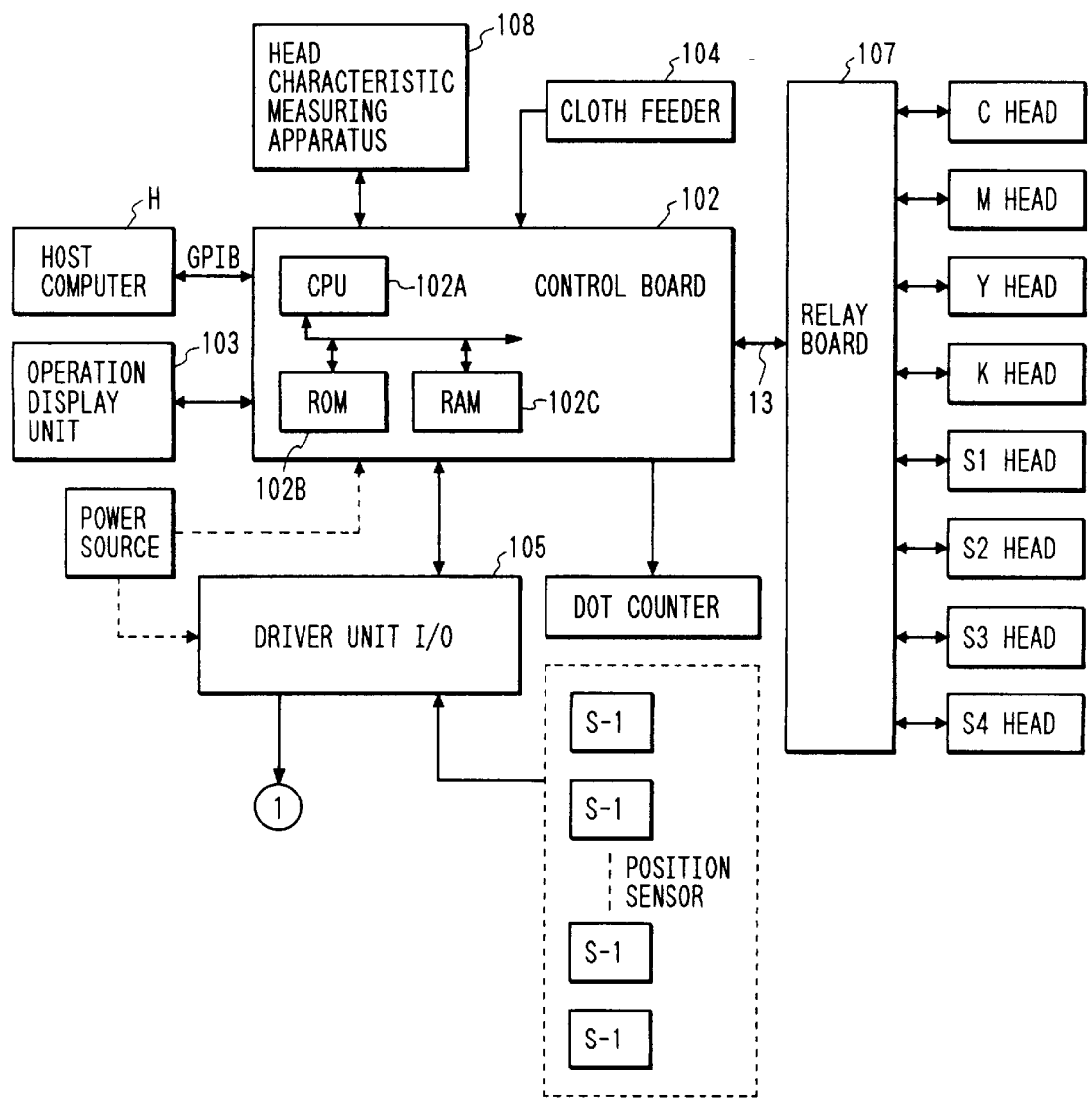
FIG. 14 is a schematic block diagram showing the electrical arrangement of the printer shown in FIG. 12.
Figure 15:
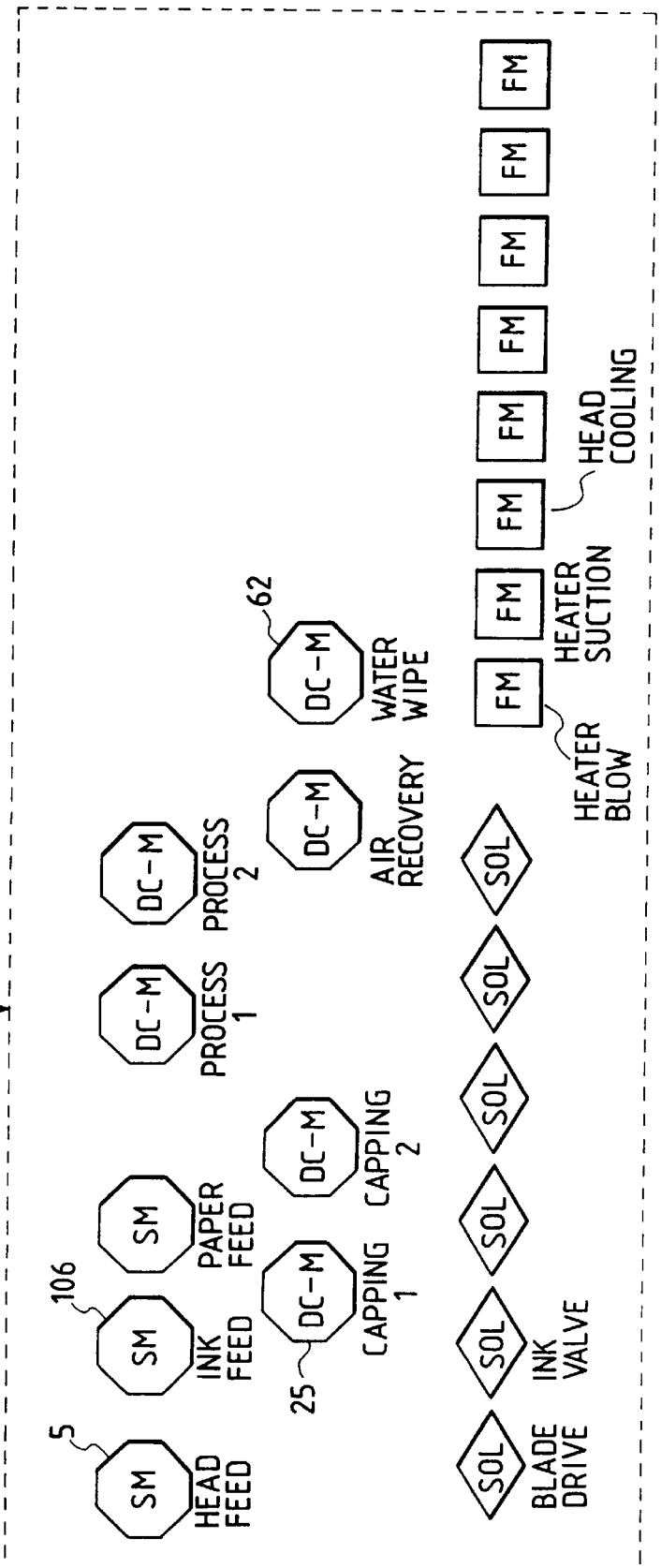
FIG. 15 is a block diagram of the printer.

The arrangement of the apparatus of this embodiment will be described below. FIGS. 14 and 15 show the arrangement of the ink-jet printer and its operation unit of this embodiment, and FIGS. 16 to 18 functionally illustrate the internal arrangement of a control board 102 in FIG. 14 along the data flow.

The host computer H supplies print image data to a control board 102 having the control circuit 16 and the like in FIG. 12 via an interface (in this case, GPIB). A device which supplies image data is not particularly limited, and image data may be transferred via a network or in an offline manner via, e.g., magnetic The control board 102 comprises a CPU 102A, a ROM 102B storing various programs, a RAM 102C having various register areas and work areas, and respective units shown in FIGS. 16 to 18, and the like, and controls the overall apparatus. An operation/display unit 103 has an operation unit used by an operator to input a desired instruction to the printer P, and a display for displaying, e.g., a message for an operator. A cloth feeder 104 comprises a motor and the like for feeding a recording medium such as cloth as a print object. A driver unit I/O 105 drives various motors (added with "MT" at the end of each symbol) and various solenoids (indicated by "SOL") shown in FIG. 15. A relay board 107 supplies drive signals to the heads. Also, the relay board 107 receives information associated with each head (e.g., information of the presence/absence of attachment, a color presented by the corresponding head, and the like), and supplies the received information to the control board 102. The information is transferred to the host computer H, as described above.

Upon reception of information of image data to be printed from the host computer H, the image data is stored in an image memory 505 (see FIG. 16) via a GPIB interface 501 and a frame memory (FM) controller 504. The image memory of this embodiment has a capacity of 124 Mbytes, and can store A1-size data in an 8-bit pallet data format. More specifically, 8 bits are assigned to one pixel. A DMA controller 503 is adopted to achieve high-speed memory transfer. Upon completion of data transfer from the host computer H, a print operation can be started after predetermined processing.

As described above, the host computer connected to the printer of this embodiment transfers image data as a raster image. Since a plurality of ink discharge nozzles are aligned in the vertical direction in each recording head, the alignment of image data must be converted to match with the recording head. This data conversion is performed by a raster @ BJ conversion controller 506. Data converted by the raster @ BJ conversion controller 506 is supplied to a pallet conversion controller 508 via an enlargement function of an enlargement controller 507 for executing variable magnification processing of image data. Data up to the enlargement controller 507 is equal to that supplied from the host computer, and is an 8-bit pallet signal in this embodiment. The pallet data (8 bits) is commonly supplied to and processed by processing units (to be described later) corresponding to the recording heads.

In the following description, assume that eight recording heads are arranged, i.e., heads for recording characteristics S1 to S4 are arranged in addition to those for yellow, magenta, cyan, and black.

The pallet conversion controllers 508 supply pallet data and conversion tables of the corresponding colors, which are input by the processing in FIG. 4, 9, 10, or the like, to conversion table memories 509. 8-bit pallet data can reproduce 256 different colors (0 to 255), and tables shown in, e.g., FIGS. 5 to 8 are developed on the table memories 509 in units of colors.

As the detailed circuit arrangement, each pallet conversion table memory 509 achieves its function by writing conversion data at an address position for pallet data. More specifically, when pallet data is actually supplied as an address, the memory is accessed in a read mode. Note that the pallet conversion controllers 508 manage the pallet conversion table memories 509, and serve as an interface between the control board 102 and the pallet conversion table memories 509. As for characteristics, circuits for setting characteristic mix amounts (circuits for multiplying outputs with a value ranging from 0 to 1) may be inserted between the memories 509 and an HS system consisting of HS controllers 510 and HS conversion table memories 511, and their setting amounts may be variable. In this case, after transmission of data shown in FIGS. 5 to 8, data for varying the setting amounts may be transmitted, and may be set in these circuits.

The HS conversion controllers 510 and the HS conversion table memories 511 correct a variation in print density or discharge direction corresponding to each of the discharge openings of the heads on the basis of data measured by the head characteristic measuring apparatus 108. For example, these controllers and memories execute processing for performing relatively dark data conversion for a discharge opening with a low density (small discharge amount), relatively lighter data conversion for a discharge opening with a high density (large discharge amount), and no conversion for a discharge opening with a middle density.

γ conversion controllers 512 and γ conversion table memories 513 execute table conversion for increasing or decreasing the total density in units of colors. For example, when no conversion is executed, these controllers and memories realize linear tables, that is:

output 0 for "0" input
output 100 for "100" input
output 210 for "210" input
output 255 for "255" input Binarizing controllers 514 have a pseudo gradation function, i.e., receive 8-bit gradation data, and output binarized 1-bit pseudo gradation data. Multi-value data may be converted into binary data by a dither matrix method, an error diffusion method, and the like. Assume that this embodiment adopts these methods, and gradation need only be expressed by the number of dots per unit area although a detailed description of these methods is omitted.

The binarized data are stored in connection memories 515, and are then used for driving the recording heads.

Figure 17:
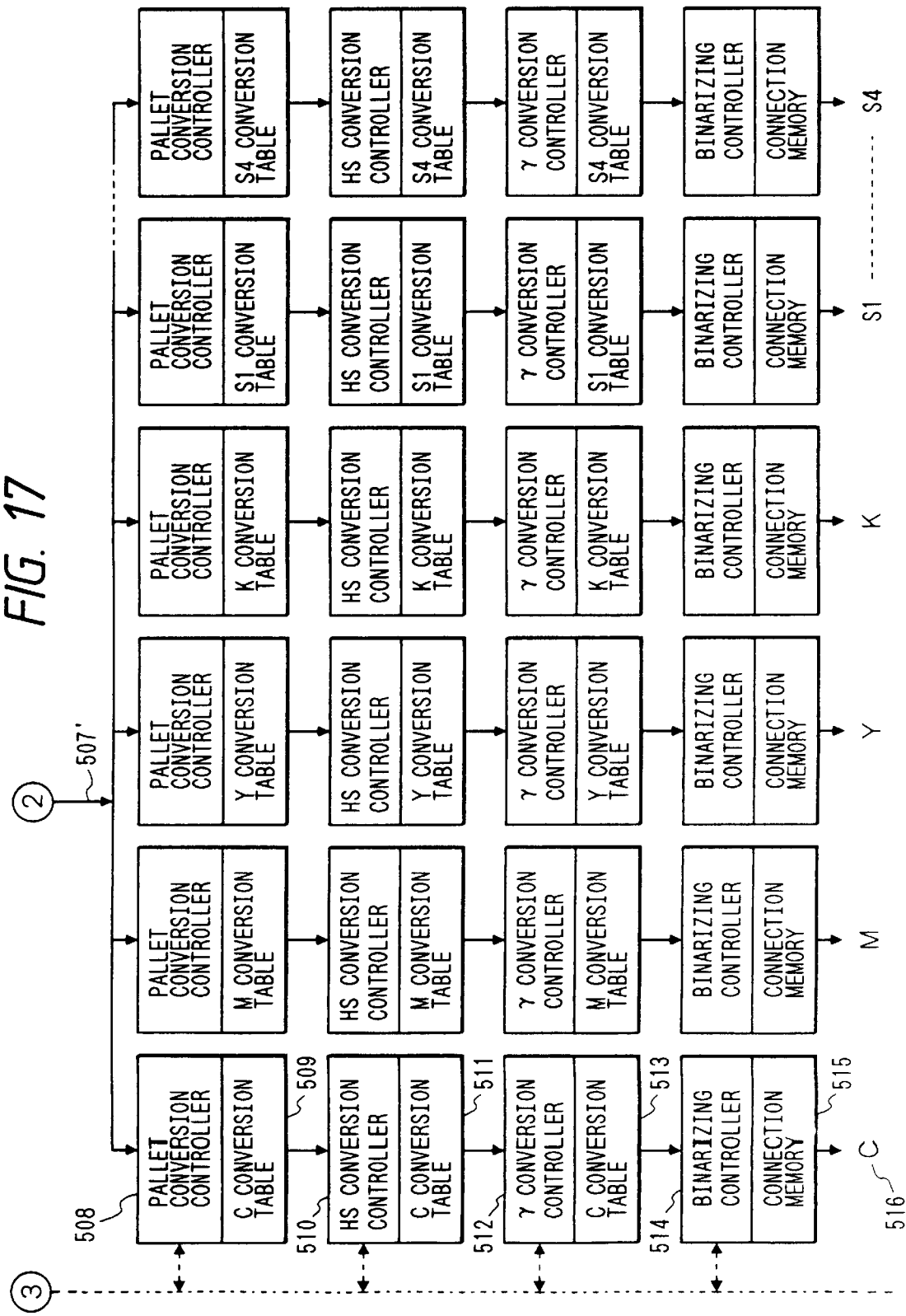
FIG. 17 is a partial block diagram of the control board.
Figure 18:
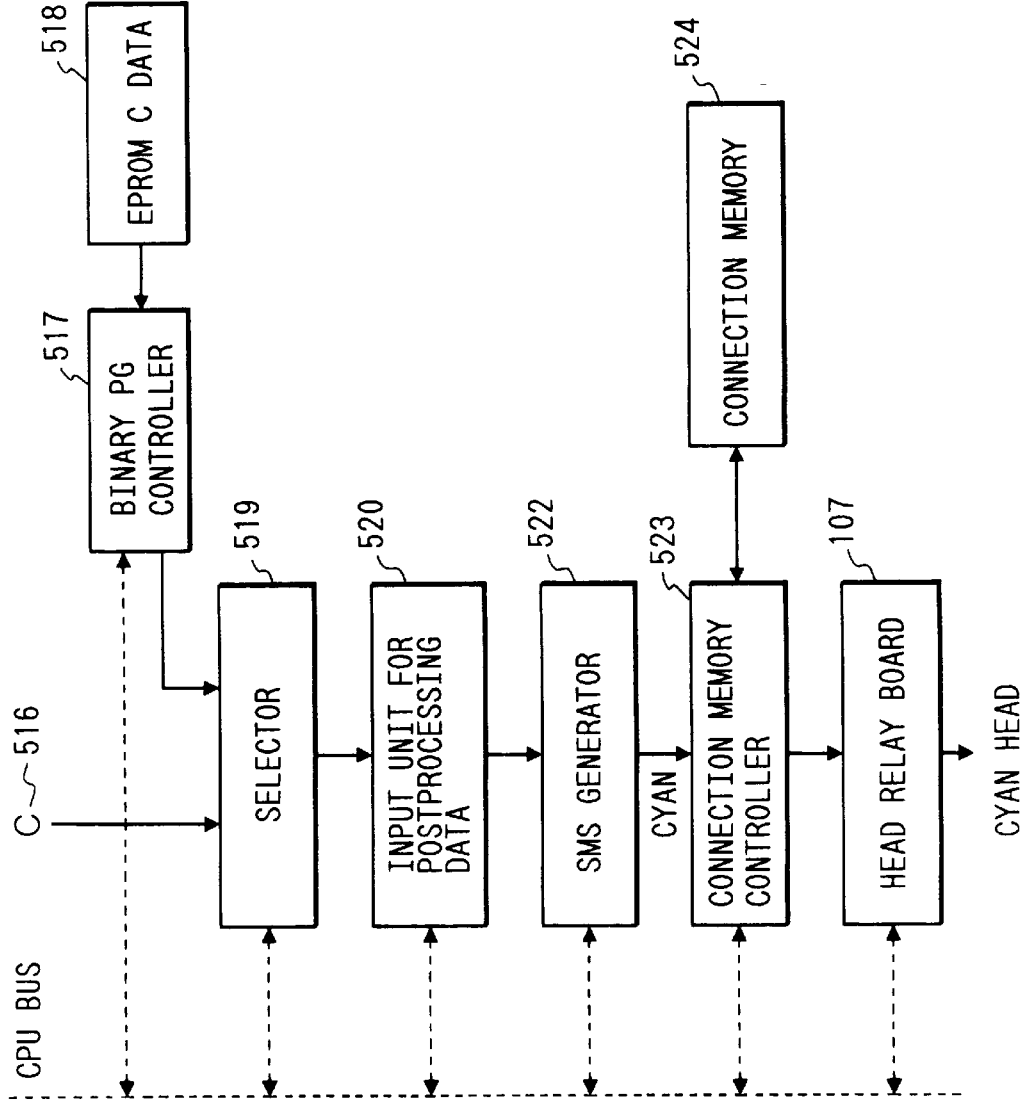
FIG. 18 is a partial block diagram of the control board.

Binary data output from the connection memories are output as data C, M, Y, BK, and S1 to S4. Since the binary signals of the respective colors are subjected to the same processing, the flow of only binary data C will be described below with reference to FIG. 18. Note that FIG. 18 shows an arrangement for a recording color "cyan", and the same arrangements are provided in units of colors. FIG. 18 is a block diagram showing a circuit arrangement after the connection memories 515 shown in FIG. 17.

A binarized signal C is normally output toward a sequential multiscan generator (to be referred to as an SMS generator) 522. In some cases, a pattern generator (a binary pattern generator (PG) controller 517 and an EPROM 518) may execute an exclusive test print operation of the apparatus. Thus, the data is supplied to a selector 519. Of course, this switching operation is controlled by the CPU of the control board 102, and when an operator performs a predetermined operation on the operation/display unit 103 (see FIG. 14), data from the binary PG controller 517 is selected to execute a test print operation. Therefore, data from the binarizing controller 514 (connection memory 515) is selected in a normal state.

Note that the SMS controller 522 is adopted to prevent a density unevenness of an image caused by a variation in discharge amount or discharge direction in units of nozzles. A multiscan mode is proposed in, e.g., Japanese Patent Application No. 4-79858. A connection memory 524 is a buffer memory for correcting a physical position defining a head interval. The memory 524 temporarily stores image data, and outputs the stored data at a timing according to the physical position of the head. Therefore, the capacity of the connection memory 524 varies in units of recording colors. Whether the multiscan mode is executed, i.e., ink discharge is performed for each pixel from a plurality of discharge openings to obtain high image quality, or the multiscan mode is disabled to attain high-speed processing can be selected in step MS21 in FIG. 2.

After execution of the above-mentioned data processing, data is supplied to the head via the head relay board 107.

Conventionally, data for pallet conversion, HS conversion, and γ conversion are permanently stored in a memory provided to an apparatus main body. For this reason, an image with sufficient quality cannot often be obtained unless the stored data match image data to be output. For this reason, in this embodiment, these conversion data can be input from an external device, and the input conversion data are stored in the corresponding conversion table memories. For example, pallet conversion data shown in FIGS. 5 to 8 are downloaded to the conversion table memories 509. More specifically, the conversion table memories 509, 511, and 513 of this embodiment all comprise RAMs. Data for pallet conversion and γ conversion are sent from the host computer H. Data for HS conversion are input from the external head characteristic measuring apparatus 108 (see FIG. 14), so that data matching the head state can always be obtained. In order to obtain head characteristics of the respective recording colors by the head characteristic measuring apparatus 108, a test print operation (recording of a uniform predetermined halftone density) is performed by each recording head. The head characteristic of each head is obtained by measuring the density distribution corresponding to the recording width of each head. The head state represents a variation in discharge state of a plurality of nozzles included in each head, or a difference between the density of an image printed by the head and a desired density.

In this embodiment, in order to prevent an abnormal output before conversion parameters are input, "0" is output for input data, as shown in FIG. 19, to disable a print operation. The same applies to γ conversion, and the like.

Figure 20:
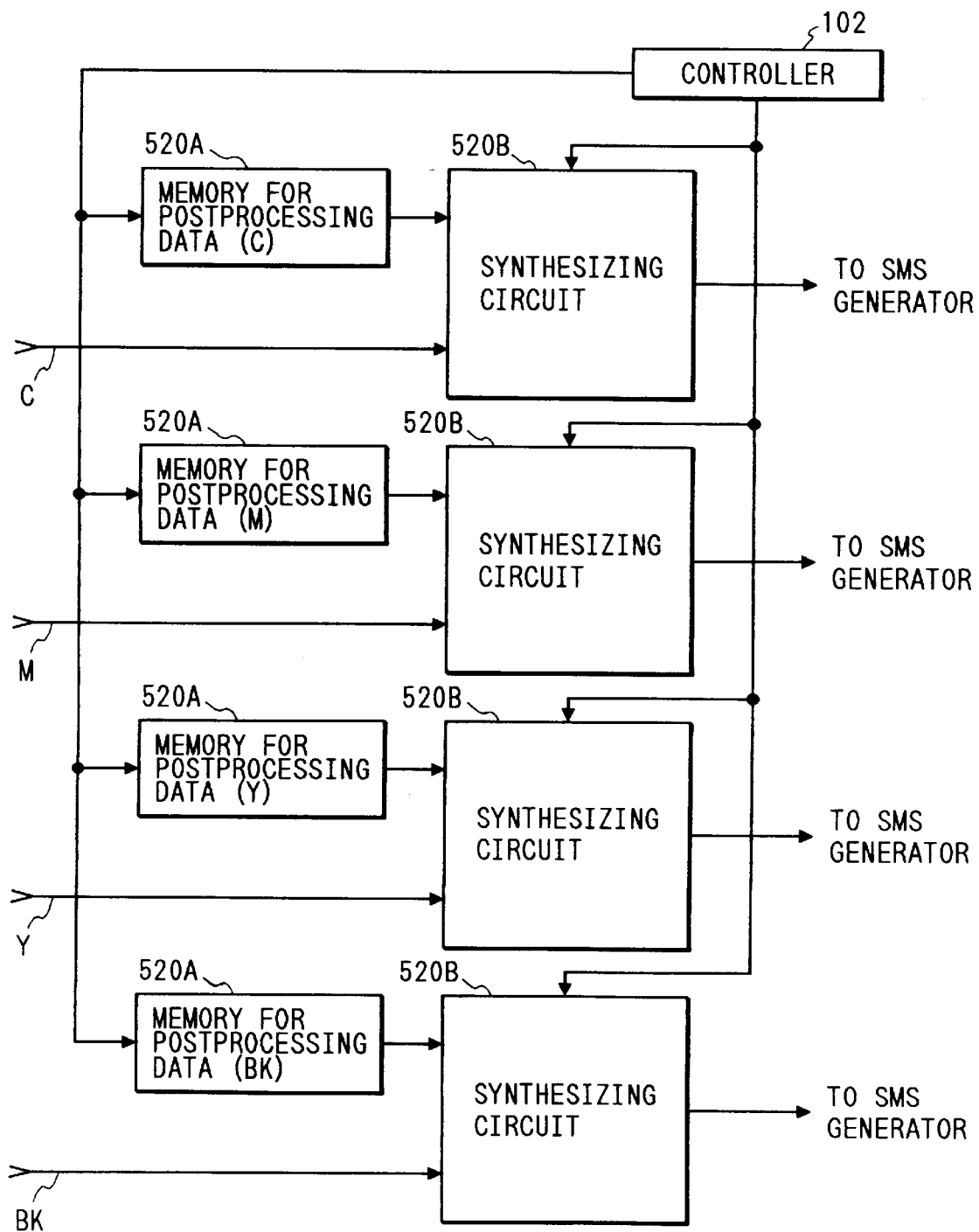
FIG. 20 is a block diagram showing the arrangement of an input unit for postprocessing data in FIG. 18.

FIG. 20 shows an arrangement of an input unit 520 for postprocessing data shown in FIG. 18. The input unit 520 is arranged in correspondence with the processing sequence shown in FIG. 11 executed by the host computer H.

Print image data are subjected to the above-mentioned processing such as pallet conversion, HS conversion, γ conversion, and the like, and are then converted into binary data by the corresponding binarizing controllers 514. On the other hand, postprocessing data are stored in corresponding memories 520A for postprocessing data via the CPU of the control board 102. The binary image data are compared with the postprocessing data by corresponding synthesizing circuits 520B, and are then supplied to the corresponding SMS generators 522. For example, the memory for BK postprocessing data stores data so that postprocessing data is printed in a BK ink. The binary image data is output from the corresponding synthesizing circuit 520B as data which also indicates printing of a postprocessing data portion, and the postprocessing data is printed in a BK color. At this time, colors (C, M, Y) other than BK are not compared with postprocessing data, and the binary image data are directly output and printed. Therefore, since a print image is drawn without any modifications, a print operation free from deterioration of image quality can be realized.

In the above description, postprocessing data is printed in BK. However, the same applies to a case wherein postprocessing data is printed in another color according to step SS11-3 in FIG. 11. Also, a color expressed by combining inks can be used.

Various postprocessing data can be printed in accordance with data stored in the postprocessing data memories 520A. For example, a dotted line can be adopted as a cutting pattern, and the thickness of the line can be changed. More specifically, postprocessing data may be drawn by the ink-jet heads in a color which does not become conspicuous after cutting, or may be printed in a color which does not influence an original image.

In general, printing is performed on a roll of cloth having a length of several tens of meters. According to the apparatus of this embodiment, the presence/absence of a print operation of postprocessing data can be freely selected. Since the contents of the memories for postprocessing data can be properly changed, cutting data for sewing can be rewritten in correspondence with user's data, and a large number of data can be printed on a piece or roll of cloth.

Furthermore, FIG. 20 illustrates the memories 520A for postprocessing data and the synthesizing circuits 520B for only Y, M, C, and BK. However, these memories and circuits can also be provided for other characteristics SI to S4, as a matter of course.

In addition, in this embodiment, a print image and postprocessing data are separately received from the host computer H, and are printed after they are stored and synthesized. Alternatively, a print image and postprocessing data may be synthesized in advance by the host computer, and the synthesized data may be received to perform a print operation. With this arrangement, since postprocessing data can be obtained from the host computer H simultaneously with image information, the printer need only print an image. Data for disabling a print operation on a postprocessing data portion may be transmitted/received between the host computer and the printer, and postprocessing data may be drawn as an outline image in a print operation.

(3.3) Print Pattern of Basic Image

When image data of a basic image is input, the host computer H transmits an input image size ($X_{in}$, $Y_{in}$) in the form of commands and parameters. The CPU 102A of the printer P assures an input area in the image memory 505, and stores the input image size in a predetermined parameter storage unit of the RAM 102C. When the host computer H sequentially transmits image data to the printer P, the printer P receives the image data, and stores the received data in the image memory 505 via the FM controller 504. On the other hand, the host computer H transmits the output format of the image data to the printer P. The printer P stores the image output format in the parameter storage unit of the RAM 102C. In this embodiment, output types shown in FIGS. 21A to 21E are used as the image output format.

FIGS. 21A to 21E show the image output formats in this embodiment.

Figure 21A:
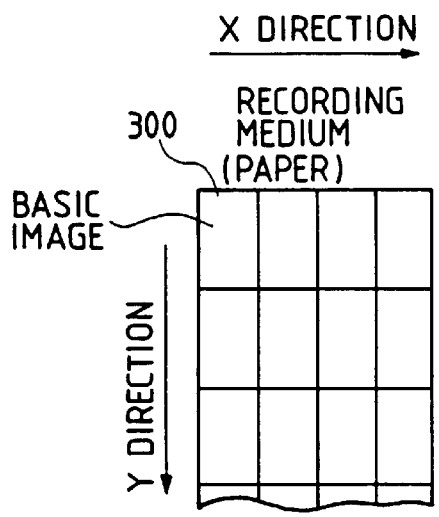
FIGS. 21A to 21E are explanatory views showing examples of the formation pattern of a basic image with respect to a recording medium.
Figure 21B:
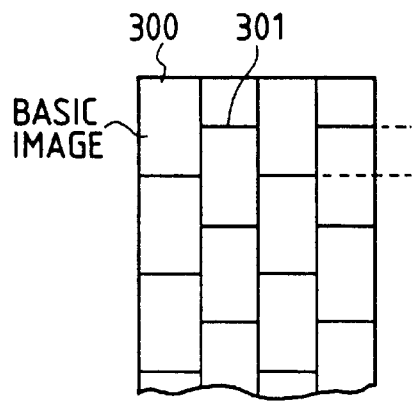
Figure 21C:
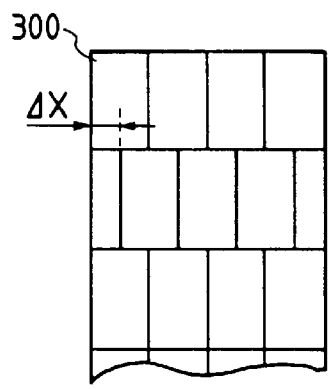
Figure 21D:
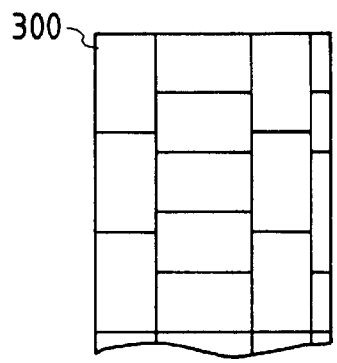
Figure 21E:
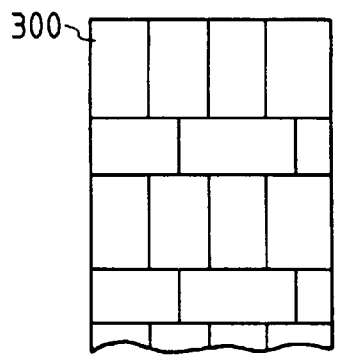

FIG. 21A shows a format (type 1) for periodically repetitively printing out a basic image 300 in the X direction (the feed direction of the carriage 1) and the Y direction (the feed direction of the recording medium 6). FIG. 21B shows a format (type 2) for printing out the basic image 300 while shifting the basic image 300 by a predetermined offset amount (shift amount) Δy in the Y direction in every other column in the X direction upon execution of repetitive print operations of the basic image 300. FIG. 21C shows a format (type 3) for printing the basic image 300 while shifting the basic image 300 by a predetermined offset amount Δx in the X direction in every other row in the Y direction in substantially the same manner as in type 2 (FIG. 21B) described above. FIG. 21D shows a format (type 4) for rotating the basic image 300 (through 90° in FIG. 21D), and printing out the rotated image while shifting the image by a predetermined offset amount (offset "0" in FIG. 21D) in the Y direction as in type 2 (FIG. 21B). Finally, FIG. 21E shows a format (type 5) for rotating the basic image 300 (through 90° in FIG. 21E), and printing out the rotated image while shifting the image by a predetermined offset amount (offset "0" in FIG. 21E) in the X direction as in type 3 (FIG. 21C).

As parameters for designating the output format to be output from the host computer H, output types (type 1 to type 5), a basic image size ($X_b$, $Y_b$), an all output image size ($X_{OUT}$, $Y_{OUT}$), an X direction offset amount Δx, a Y direction offset amount Δy, a rotation amount (in units of 90° in this embodiment), and the like are used in addition to the above-mentioned parameters. These parameters are set under the following conditions:

$X_{in} \times Y_{in} \leq$ capacity of memory 505, $X_b \leq X_{in}$, $Y_b \leq Y_{in}$, $X_{OUT} \geq X_b$, $Y_{OUT} \geq Y_b$, $\Delta x \leq X_b$, $\Delta y \leq Y_b$, and the like.

The host computer H transmits a print command of image data to the printer P in step MS25 in FIG. 2, and the printer P starts a print operation in response to this command.

More specifically, the CPU 102A controls the read timing of the memory 505 of an address control unit provided to the FM controller 504, the start timing of the motor driver 23, and the start timings of the head drivers 24a to 24d, thereby controlling the print timing on the cloth 6 as a recording medium. The address control unit sequentially reads out image data from the memory 505 in accordance with parameters set in the parameter storage unit, and outputs the readout data toward the head drivers 24a to 24d. The head drivers 24a to 24d form drive signals for the recording heads 2a to 2d, and for the heads for characteristics (if necessary) in accordance with the image data, and output the drive signals to the corresponding recording heads. The recording heads are driven by the drive signals, and discharge ink droplets onto the cloth 6, thus printing an image corresponding to the image data.

On the other hand, the motor driver 23 feeds the cloth 6 to a print position by driving the feed motor 9, and recording is performed while moving the carriage 1 in the direction of the arrow D by rotating the carriage motor 5 in a predetermined direction (see FIG. 13). When the print operation for one scan is completed, the carriage motor 5 is rotated in the reverse direction to move the carriage 1 in the direction of the arrow E to a home position. Then, the feed motor 9 is rotated to move the cloth 6 by a width, in the Y direction, of the recorded scan, or by an amount smaller than the width in the multiscan mode. The print timing in the above-mentioned operation is determined with reference to the print operation speed of the recording heads in one reciprocal movement of the carriage 1 as a basic cycle.

In this manner, after an image having a size designated by the all output image size ($X_{OUT}$, $Y_{OUT}$) is printed by repetitively executing the above-mentioned operation, the printer P stops the operations of the motor driver, the head driver, the FM controller 504, and the like to end a print mode, and waits for further inputs from the host computer H and the operation/display unit 103.

Figure 22:
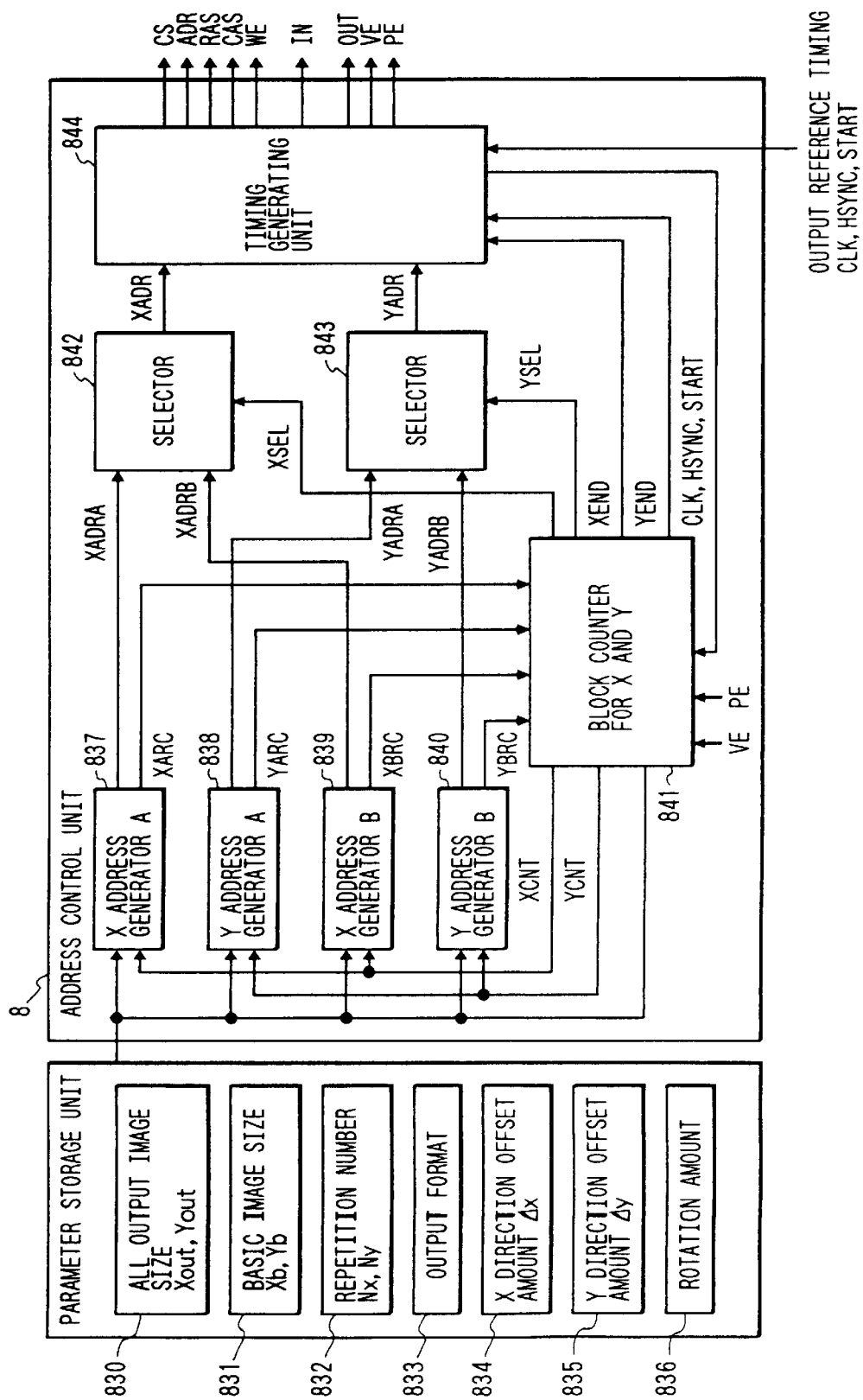
FIG. 22 is a block diagram showing an arrangement of a parameter storage unit and an address control unit.

FIG. 22 is a block diagram showing the internal arrangement of the parameter storage unit and the address control unit of this embodiment.

Referring to FIG. 22, the parameter storage unit includes storage sections (e.g., registers and the like) 830 to 836. The register 830 stores the all output image size ($X_{OUT}$, $Y_{OUT}$), the register 831 stores the basic image size ($X_b$, $Y_b$), the register 832 stores repetition numbers ($N_x$, $N_y$), in the X and Y directions, of the basic image, the register 833 stores the output type, the register 834 stores the X direction offset amount $\Delta x$, the register 835 stores the Y direction offset amount $\Delta y$, and the register 836 stores the rotation amount R.

Note that $N_x$=INT($X_{OUT}/X_b$), and $N_y$=INT($Y_{OUT}/Y_b$) where INT(a) is a function for, when a value a is a decimal number, rounding the first place below the decimal point of the value a to an integer by increasing the last retained digit by 1. For example, INT(1.2)=2.

These registers are connected to the respective sections of the address control unit in accordance with the output format of input image data (more specifically, the stored parameters are used as reference values in comparators to be described later).

Referring to FIG. 22, an X address generator A 837 counts an address (XADRA), in the X direction, of the basic image 300. A Y address generator A 838 counts an address (YADRA), in the Y direction, of the basic image 300. An X address generator B 839 and a Y address generator B 840 respectively count addresses (XADRB and YADRB), in the X and Y directions, which addresses are shifted in the X or Y direction, of the basic image 300 as in the above-mentioned image output types 2 and 3 (FIGS. 21B and 21C). Each of these address generators 837 to 840 mainly comprises a counter for actually outputting an address, and a comparator for comparing whether or not the output address exceeds the basic image size or the all image size.

A block counter 841 counts the repetition numbers, in the X and Y directions, of the basic image 300, and mainly comprises counters and comparators. A selector 842 selects one of an address (XADRA) in the X direction and an X address (XADRB) shifted in the X direction. A selector 843 similarly selects one of an address (YADRA) in the Y direction and a Y address (YADRB) shifted in the Y direction. A timing generating unit 844 outputs various read signals (CS, ADR, RAS, CAS, WE, and the like) and various timing signals (IN, OUT, VE, PE, and the like) on the basis of the addresses (XADR) and (YADR) from the selectors 842 and 843.

Figure 26:
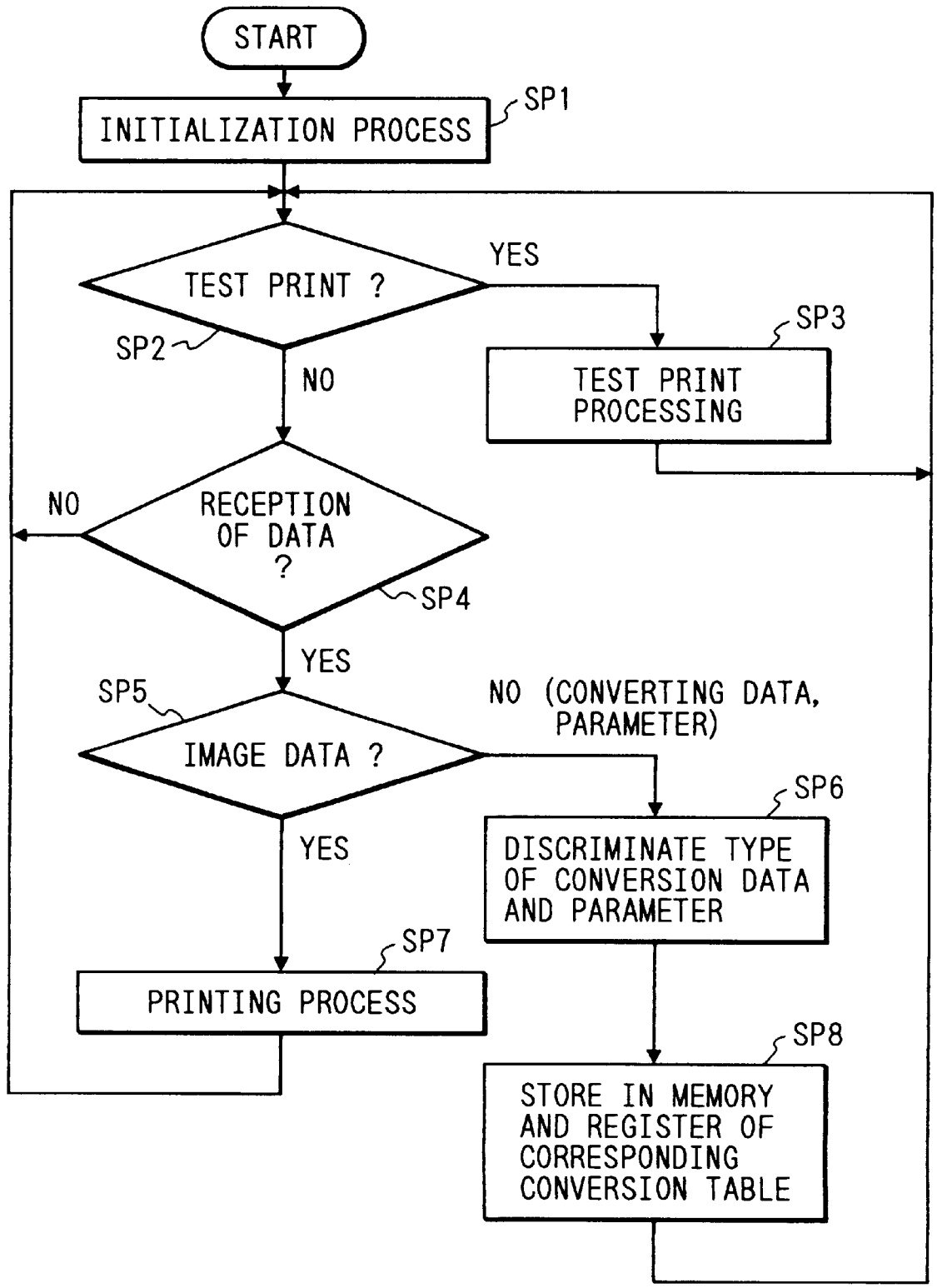
FIG. 26 is a flow chart showing an example of a processing sequence for setting conversion data and parameters in memories and registers shown in FIG. 17.

In this embodiment, the memory 505 is constituted by using at least one D-RAM (dynamic RAM) module. The read signals of the memory 505 include a chip select signal CS for selecting a module, a signal ADR in which row addresses (YADR) and column addresses (XADR) are temporally assigned, a row address strobe signal RAS, a column address strobe signal CAS, and a write enable signal WE. FIG. 26 shows the details of the timings of these signals.

Figure 23:
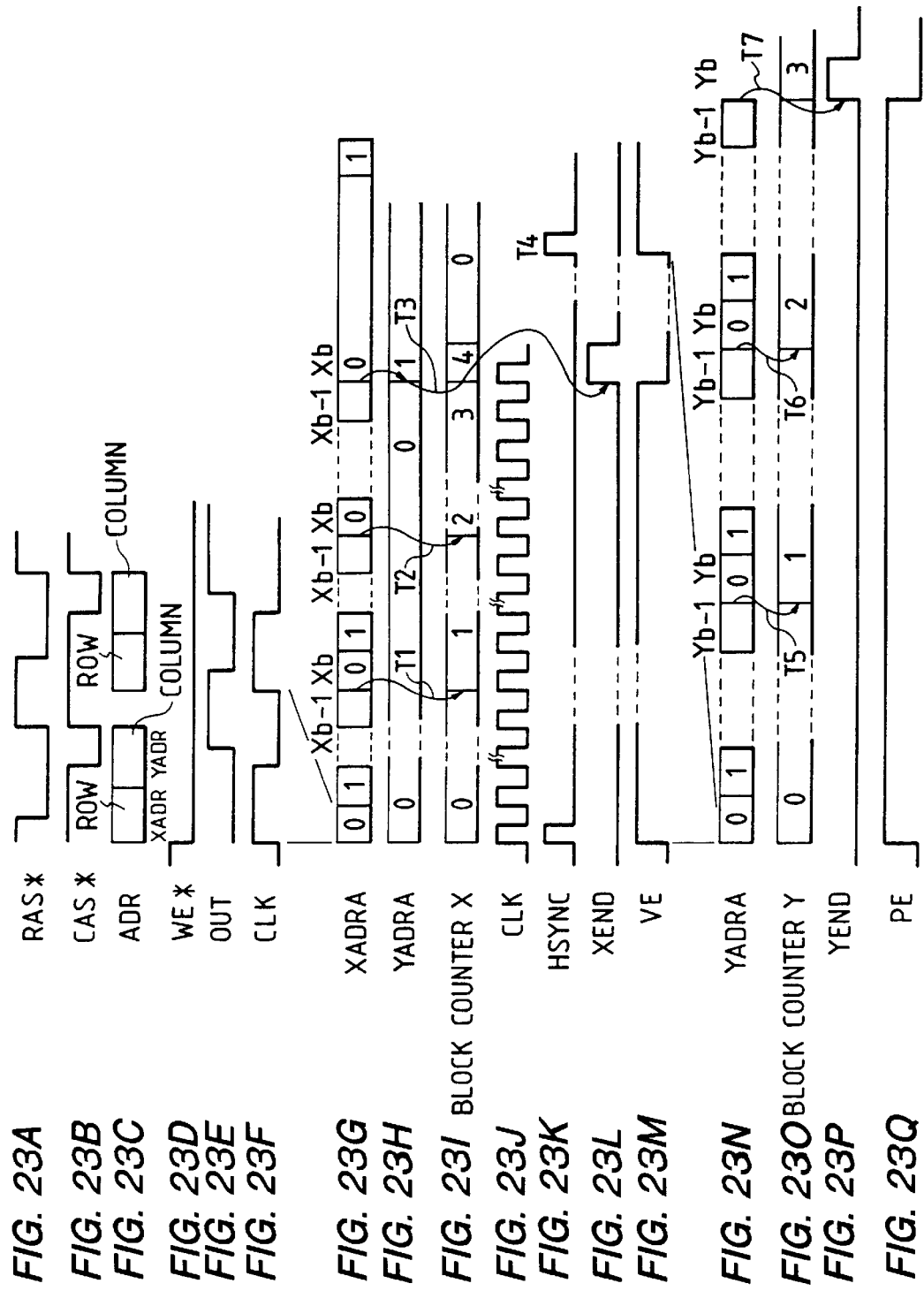
FIGS. 23A–23Q comprise a timing chart showing the output timings of signals in a memory control unit obtained when an image output (type 1) is to be output by the printer of the first embodiment.
Figure 24:
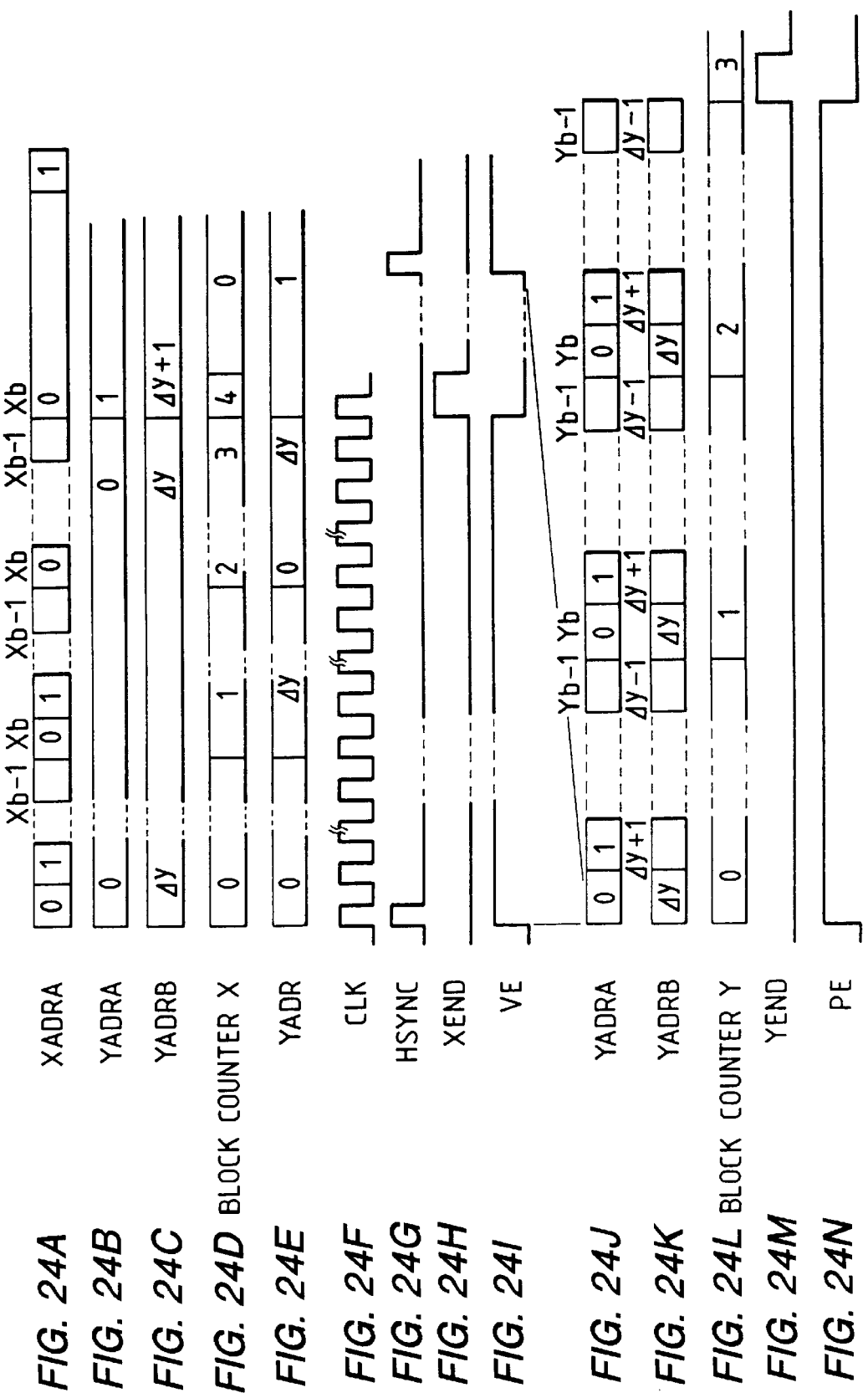
FIG. 24 is a timing chart showing the output timings of signals in the memory control unit obtained when an image output (type 2) is to be output by the printer of the first embodiment.

The above-mentioned various timing signals include a latch timing signal IN for a latch circuit for temporarily storing input image data, a latch timing signal OUT for a latch circuit for temporarily storing output image data, a video enable signal VE indicating effective image data for each raster, and a page enable signal PE indicating an effective raster in one page (see FIGS. 23 and 24).

The operations of the respective sections of the address control unit in the case of an image output of type 1 shown in FIG. 21A will be described below with reference to FIG. 23. Note that * in FIG. 23 indicates a signal expressed by negative logic.

When a print start instruction is issued from the host computer H or the operation/display unit 103, the CPU 102A outputs a START signal to the address control unit to clear both the X and Y address generators A 837 and 838 (clear both (XADRA) and (YADRA) to "0"), so that these address generators 837 and 838 can operate, and to enable the timing generating unit 844 and the block counter 841.

Of output reference timing signals 500 (including an image output clock CLK, a raster synchronization signal HSYNC, a start signal START, and the like), when the start signal goes to high level (enable), and the horizontal synchronization signal HSYNC goes to high level, the timing generating unit 844 sets both the signals VE and PE at high level (enable), as shown in FIG. 23. While the signals VE and HSYNC are at high level, the signals RAS, CAS, ADR, WE, and OUT are output to the memory 505 in synchronism with the clock CLK, and image data is read out from the memory 505, as shown in FIG. 23. When the read address of the memory 505 is controlled while both the signals VE and PE are at high level, the read and output positions of image data are determined.

Address control in the address control unit will be described below.

The output from the X address generator A 837 is cleared to "0" when the horizontal synchronization signal HSYNC goes to high level. The generator 837 counts up its output (XADRA) by 1 in synchronism with the leading edge of CLK. When the count value reaches "$X_b$" (the length, in the X direction, of the basic image size), the generator 837 outputs a ripple carry signal (XARC) to the block counter 841, and clears its output address (XADRA) to "0" (timings T1 to T3 in FIG. 23). More specifically, this carry signal (XARC) is output as a comparison result between "$X_b$" of the basic image size stored in the basic image size register 831 and the output value from a counter for counting the clocks CLK by a comparator (not shown).

During this operation, the block counter 841 outputs high-level selection signals XSEL and YSEL, so that the selector 842 selects an address signal (XADRA) from the X address generator A 837, and the selector 843 selects an address signal (YADRA) from the Y address generator A 838. Upon reception of the carry signal (XARC) from the X address generator 837, the block counter 841 increments a block count X in the X direction by 1. When the block count X becomes equal to the repetition number $N_x$ in the X direction (timing T3), the block counter 841 outputs a signal YCNT for counting up the Y address generator A 838 by 1, and sets a signal XEND for indicating the end of output of image data for one raster in the X direction to be "1" (enable).

During this interval, the timing generating unit 844 produces an address signal ADR and a chip select signal CS for the memory 505 on the basis of an address signal (XADR) from the selector 842 and an address signal (YADR) from the selector 843, and outputs signals such as RAS, CAS, WE, ADR, CS, OUT, and the like to the memory 505 in synchronism with the output reference timing signals 500, thereby reading out image data. When the signal XEND input from the block counter 841 becomes "1", the timing generating unit 844 sets the signal VE at low level (disable) (timing T3), and stops output of the respective signals so as to temporarily stop the read operation of image data from the memory 505. When the signal VE goes to low level, the count operations of the X and Y address generators 837 and 838 are also stopped.

When the horizontal synchronization signal HSYNC goes to high level at the beginning of the next raster, the above-mentioned operation is repeated, and the content of the Y address generator A 838 is sequentially counted up. In this manner, the print processing of each raster is performed, and when the Y address value (YADRA) output from the Y address generator A 838 coincides with the length "$Y_b$", in the Y direction, of the basic image size (timings T5 to T7), the Y address generator A 838 outputs a carry signal (YARC) to the block counter 841, and clears the signal (YADRA) to "0".

Upon reception of the carry signal (YARC) from the Y address generator 838, the block counter 841 increments a block count Y in the Y direction by 1, and checks if this value equals the repetition number $N_y$. If the block count Y becomes equal to the repetition number $N_y$, the block counter 841 sets a signal YEND indicating the end of the read operation in the Y direction at high level (enable) (timing T7). When the signal YEND goes to "1", the timing generating unit 844 sets both the signals VE and PE at low level (disable), and stops output of the respective signals, thus completing an image read operation for one cloth unit. When the signal PE goes to the low level, the count operations of the X and Y address generators A 837 and 838, and the block counter 841 are also stopped.

The repetition number $N_y$ may be supplied from the host computer H together with commands, may be calculated in accordance with step MS13 (FIG. 2), or may be set by the operation/display unit 103.

The operation of the address control unit in the case of an image output of type 2 shown in FIG. 21B will be described below with reference to the timing chart in FIG. 24.

The basic operation of this timing chart is substantially the same as that in the case of the image output of type 1 shown in FIG. 23, except that the operation of the Y address generator B 840 is enabled, and the selector 843 executes different selection processing.

More specifically, the block counter 841 switches between a signal (YADRA) from the Y address generator A 838 and a signal (YADRB) from the Y address generator B 840 by switching the selection signal YSEL of the selector 843 between high and low levels in synchronism with the block count, in the X direction, of the block counter 841, thereby switching the Y address YADR in units of blocks.

The Y address generator B 840 is not cleared to "0" in synchronism with the leading edge of the horizontal synchronization signal HSYNC, but loads the Y direction offset amount Δy at this timing. The Y address generator B 840 is cleared to "0" when the length "$Y_b$", in the Y direction, of the basic image size is compared with the output (YADRB) from the Y address generator B 840, and (YADRB) becomes equal to "$Y_b$". At this time, the address generator 840 does not output any carry signal YBRC, and the block counter 841 increments the block count Y in response to the carry signal (YARC) from the X address generator A 837.

This timing is shown in detail in FIG. 24. For example, when a basic image 300 portion shown in FIG. 21B is printed in the first scan, the Y address (YADR) input to the timing generating unit 844 is set to be "0" since the output (YADRA) from the Y address generator A 838 is selected. When a right neighboring image region (offset portion) is printed in the first scan, the output (YADRB) from the Y address generator B 840 is selected, and the Y address (YADR) is set to be "Δy". Similarly, in the third image region (without any offset), the Y address (YADR) is reset to "0", and in the next offset region, the Y address (YADR) is set to be "Δy" again.

In the second scan for printing these image regions, the Y address (YADR) is set to be "1" in non-offset image regions since the output (YADRA) from the address generator A 838 is selected. In offset regions, the output (YADRB) from the Y address generator B 840 is selected, and the Y address (YADR) is set to be "Δy+1".

After a line 301 in FIG. 21B is output, the output (YADRB) from the Y address generator B 840 is cleared to "0" since it becomes equal to the basic image size "$Y_b$".

The case of type 3 shown in FIG. 21C is substantially the same as the case of type 2, except that the X direction offset in the case of type 3 replaces the Y direction offset in the case of type 2. Therefore, in the case of type 2 described above, the selector 843 selects one of the outputs from the Y address generator A 838 and the Y address generator B 840 to generate the Y address (YADR). However, the case of type 3 requires control for causing the selector 842 to select one of the outputs from the X address generator A 837 and the X address generator B 839 so as to output the selected output as the X address (XADR).

More specifically, the block counter 841 switches between an address (XADRA) output from the X address generator A 837 and an address (XADRB) output from the X address generator B 839 by switching the selection signal XSEL of the selector 842 between high and low levels in synchronism with the Y count value of the block counter 841, and the selected address is output to the timing generating unit 844 as an address (XADR). The X address generator B 839 is not cleared to "0" in synchronism with the leading edge of the signal HSYNC, but loads the X direction offset amount "Δx" at this timing. The X address generator B 839 compares the width "$X_b$", in the X direction, of the basic image size with its output (XADRB), and when (XADRB) exceeds "$X_b$", the generator 839 clears its output to "0" without outputting any ripple carry (XBRC). The block counter 841 increments the block count value X in response to the carry (XARC) from the X address generator A 837.

Patterns of types 4 and 5 are effective since they have a good geometrical appearance when the ratio between the width "$X_b$". and the length "$Y_b$" of the basic image size is an integer. In particular, when Xb=Yb (a basic image is a square), basic images can be neatly arranged in a matrix pattern, the arrangement is relatively easy, and replacement between XADR and YADR and the count directions (down/up count) of the address generators 837 to 840 can be realized in accordance with the rotation amount R.

A basic image can be rotated not only by address control but also by inserting a rotation processing unit in a pipeline manner. Before image data is actually output, rotated images obtained by rotating basic images through, e.g., 90° by address control may be produced and stored in the image memory in correspondence with the basic images. Thus, image data including these rotated images can be more easily output at higher speed.

The block counter 841 counts basic image blocks, and outputs the all output image size ($X_{OUT}$, $Y_{OUT}$). However, the present invention is not limited to this. In particular, when $X_{OUT}$ and $Y_{OUT}$ are not respectively integer multiples of $X_b$ and $Y_b$, $X_{OUT}$ and $Y_{OUT}$ cannot be defined by only the block count. Thus, a remaining pixel count $X_r = XOUT - Nx \times X_b$ for $N_x = INT(X_{OUT}/X_b) - 1$ is adopted, and whether or not $X_{OUT}$ is reached can be determined by comparing the comparison result of $N_x$ with the remaining pixel count $X_r$. The same applies to the Y direction.

When the print speed of each recording head is low, and the image output clock is slow, the above-mentioned address generation may be realized by software processing of, e.g., a CPU. In particular, by assigning a portion of a memory to a software counter, some components of the arrangement in FIG. 22 can be replaced by software components.

Figure 16:
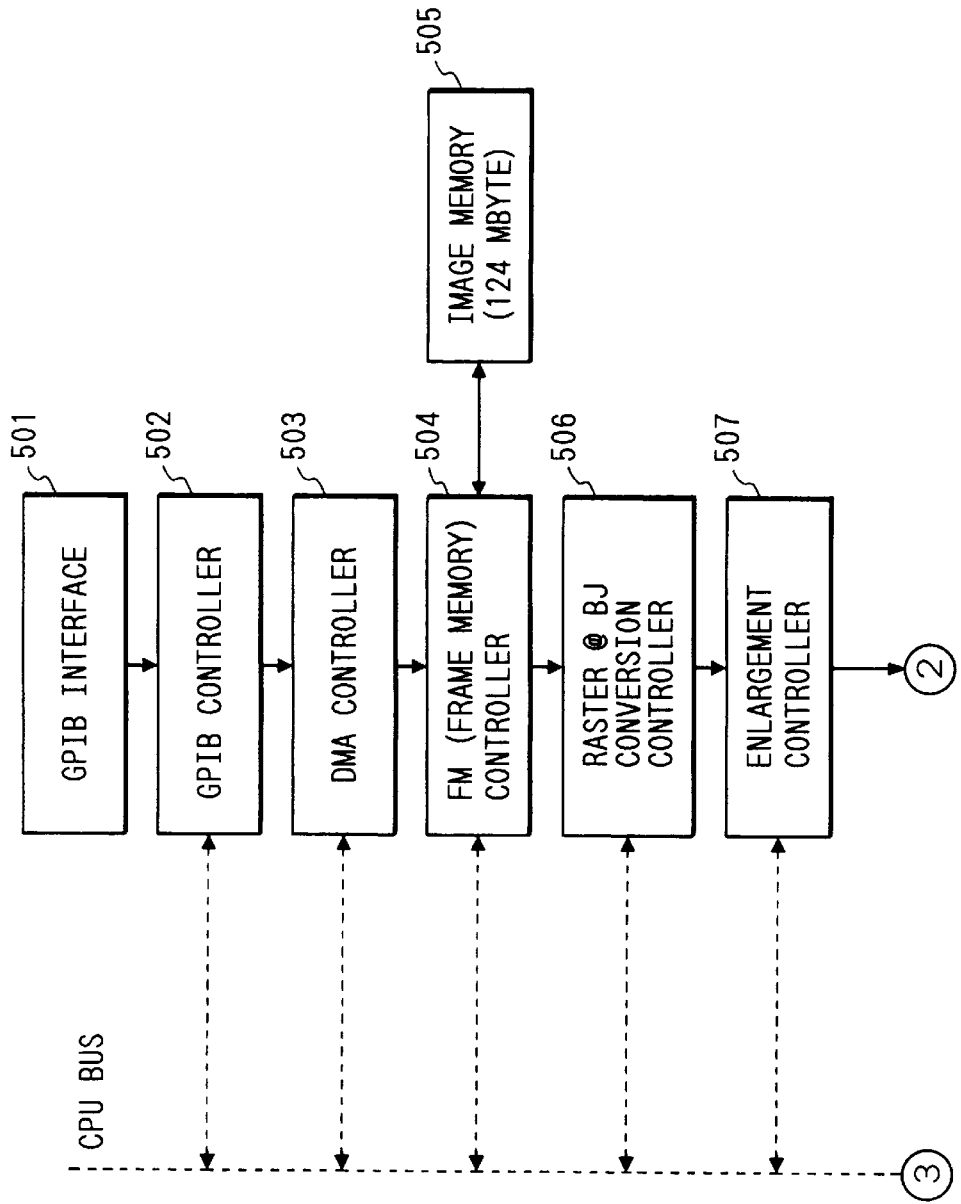
FIG. 16 is a partial block diagram showing the internal arrangement of a control board in FIG. 14 in accordance with the data flow.

In this embodiment, the alignment of image data to be output to the recording heads has a raster format, and the alignment of image data depending on the recording heads is changed by the raster @ BJ conversion controller 506 (FIG. 16). However, the present invention is not limited to this. For example, the alignment of image data stored in the memory 505 may be the same as that of image data to be output to the recording heads. When these alignments are different from each other, the alignment of image data may be changed in correspondence with the head alignment when image data are output to the head driver.

Figure 25:
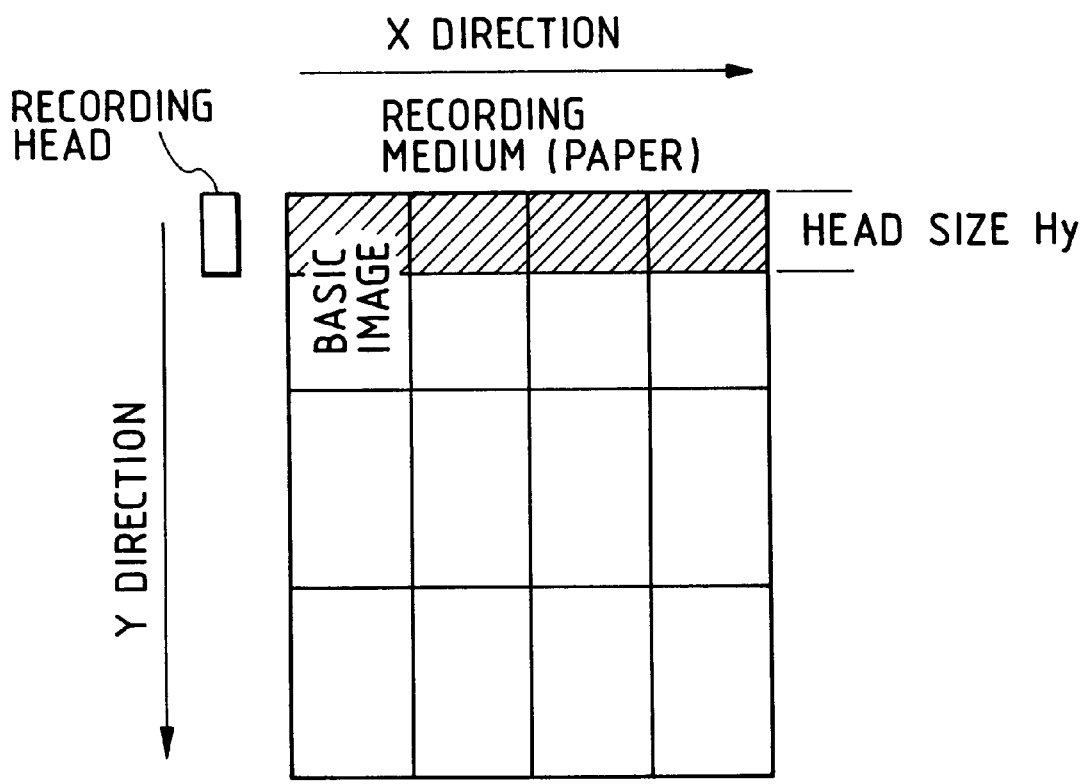
FIG. 25 is an explanatory view showing an actual image output example by the printer of the first embodiment.

In the mechanical arrangement of the printer P according to this embodiment, in practice, an image output is realized by scanning, in the X direction, a recording head having a recording range with a width $H_y$ in the Y direction, as shown in FIG. 25.

In this case, the Y address generator A 838 and the Y address generator B 840 for the Y direction in the address control unit of the FM controller 504 may be realized by a two-stage arrangement including a counter (and a comparator) for counting only $H_y$, and a counter (and a comparator) for counting a ripple carry from the counter.

Also, an image can be printed by reading out image data in a unit having the width $H_y$ in the Y direction and the length $X_{OUT}$ in the X direction (to be referred to as a band unit hereinafter). At this time, the Y address generator A 838 and the Y address generator B 840 for the Y direction can be constituted by only lower-order counters ($H_y$ counters) without requiring higher-order counters. More specifically, every time an image is output in a band unit, the CPU 102A may load a prescribed address (Y address of image data at the beginning of the next band unit to be printed) in the $H_y$ counters, and these counters may start a count-up operation from the loaded value.

(3.4) Download of Conversion Data and Parameters

In order to download conversion data to the corresponding conversion tables via the conversion controllers, or to store various parameters set by the host computer H or the operation/display unit 103 in the predetermined registers, the apparatus of this embodiment executes processing according to the flow chart in FIG. 26. The operation will be described below. A program for executing this processing is stored in the ROM 102B arranged in the control board 102, and is executed by the CPU 102A.

When the power supply of this system is turned on, the printer P is initialized in step SP1. This initialization processing includes that for the conversion tables 509, 511, and 513 corresponding to the respective recording colors.

In step SP2, it is checked if a test print instruction is received from the host computer H or the operation/display unit 103. If YES in step SP2, test print processing is executed in step SP3. In this case, print processing is executed by outputting an instruction signal, so that the selectors 519 in units of recording colors select data from the binary GP controller.

If no instruction is received from the host computer H or the operation/display unit 103, the flow advances to step SP4 to check if data is accepted via the GPIB interface 501. If NO in step SP4, the control waits for reception of data. If YES in step SP4, the flow advances to step SP5 to check if the accepted data is image data, or conversion table data or a parameter. In this case, whether or not the accepted data is image data is determined by analyzing a control command located at the head of the accepted data. In particular, when the accepted data is conversion table data or a parameter, identification data indicating the type and recording color of a conversion table to which the following data is input or control in which the parameter is to be used is added.

If it is determined that the accepted data is image data, the flow advances to step SP6, and print processing based on image quality of the image data is executed.

If it is determined that the accepted data is conversion table data or a parameter, the flow advances to step SP7, and a control command is analyzed to discriminate the type and recording color of a conversion table or the type of parameter. In step SP8, the accepted data is stored in the corresponding conversion table, register, memory for postprocessing data, or the like via the corresponding conversion controller or the CPU on the basis of the discrimination result.

Figure 27:
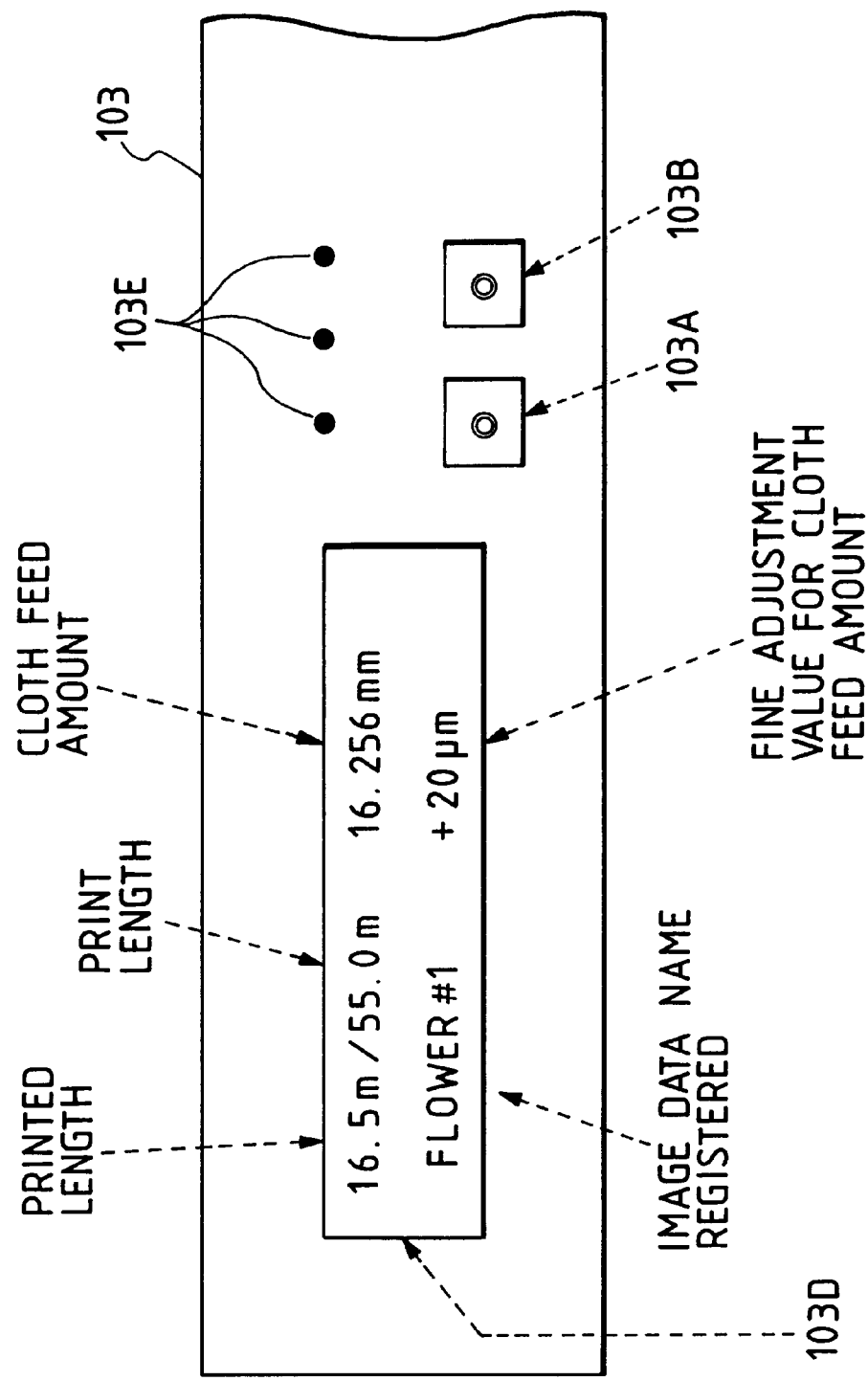
FIG. 27 is a plan view showing the arrangement of main part of an operation/display unit of the printer.

Note that information and the like set by the host computer H or the operation/display unit 103 can be displayed on the display of the operation/display unit 103. FIG. 27 shows a display example of the display. A display 103D in FIG. 27 displays the printed length of the cloth 6, the total cloth length, the cloth feed amount, and the like. Also, various parameters, modes, and the like set using the host computer H or operation buttons of the operation/display unit can be displayed, as a matter of course. Referring to FIG. 27, the operation/display unit 103 includes various air lamps 103E. A stop button 103A and an emergency stop button 103B can be used for selecting a stop mode with a protection function of continuity of a print output, or another stop mode without a protection function of continuity.

As described above, according to the present invention, since image data and data used in postprocessing are simultaneously formed, that is, since an image and data for postprocessing (e.g., sewing) are written on a piece of cloth obtained by the apparatus of the present invention, troublesome works such as manufacture of a dress pattern, a work for transferring dressmaking information on a piece of cloth from the dress pattern, and the like can be omitted, thus reducing cost. Also, a process for printing postprocessing data on already printed cloth can be simplified.

[Second Embodiment]

The second embodiment of the present invention will be described in detail hereinafter with reference to the accompanying drawings.

A printing system which adopts an ink-jet method as the second preferred embodiment of the present invention will be described hereinafter in the following order.

(1) Overall System (2) Host Computer (2.1) Arrangement
(2.2) Operation
(3) Printer (FIGS. 28 to 50)
   (3.1) Print Mechanism
   (3.2) Apparatus Arrangement
   (3.3) Print Method
   (3.4) Head Shading
(4) Embodiment of Cost Calculation (FIGS. 51 and 52)
(1) Overall System Most of the entire system is common to the first embodiment (FIGS. 1 and 2), and only differences will be described below.

In the second embodiment, step MS11 in FIG. 2 is not a postprocessing data input step but a logo input step.

Logo Input Step MS11

A logo mark of a designer, a brand of a manufacturer, and the like is often printed on the end portion of a roll of cloth. In this step, such a logo mark, its color, size, position, and the like are designated.

Of course, the logo input step may be executed in addition to the postprocessing data input step.

In the second embodiment, two print units are arranged, as will be described later, and designation in print mode designation step MS21 is changed as follows in correspondence with these print units.

Print Mode Designation Step MS21

Whether a high-speed print mode without an overlaying recording operation in a multiscan mode (see FIG. 39) and a mode with the overlaying recording operation in the multiscan mode (see FIGS. 37 and 38, and the like) is executed in the printer P, whether one or a plurality of ink drive operations are performed for each dot, and so on, are designated. Furthermore, whether control is made to obtain a continuous pattern before and after the interruption or to start print independently of continuity of a pattern when print is interrupted may be designated.

The first embodiment can adopt a printer mechanism of the second embodiment, or the second embodiment can adopt a printer mechanism of the first embodiment.

(2) Host Computer
   (2.1) Arrangement
   (2.2) Operation

The arrangement and operation of the host computer are the same as those of the above-mentioned first embodiment (FIG. 3), and a detailed description thereof will be omitted.

(3) Printer
   (3.1) Mechanical Arrangement

Figure 28:
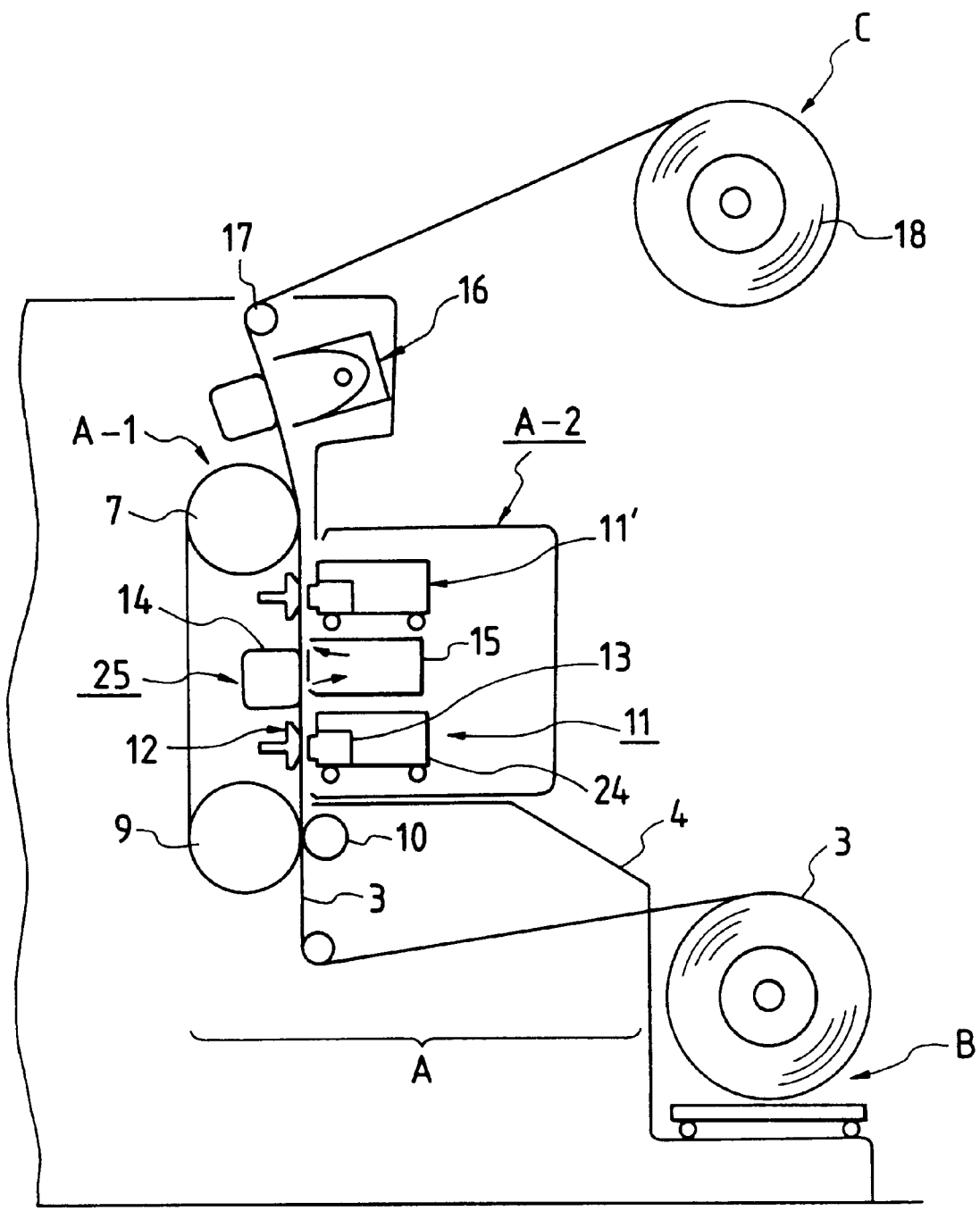
FIG. 28 is a schematic side sectional view showing the mechanical arrangement of a printer applied to the second embodiment.
Figure 29:
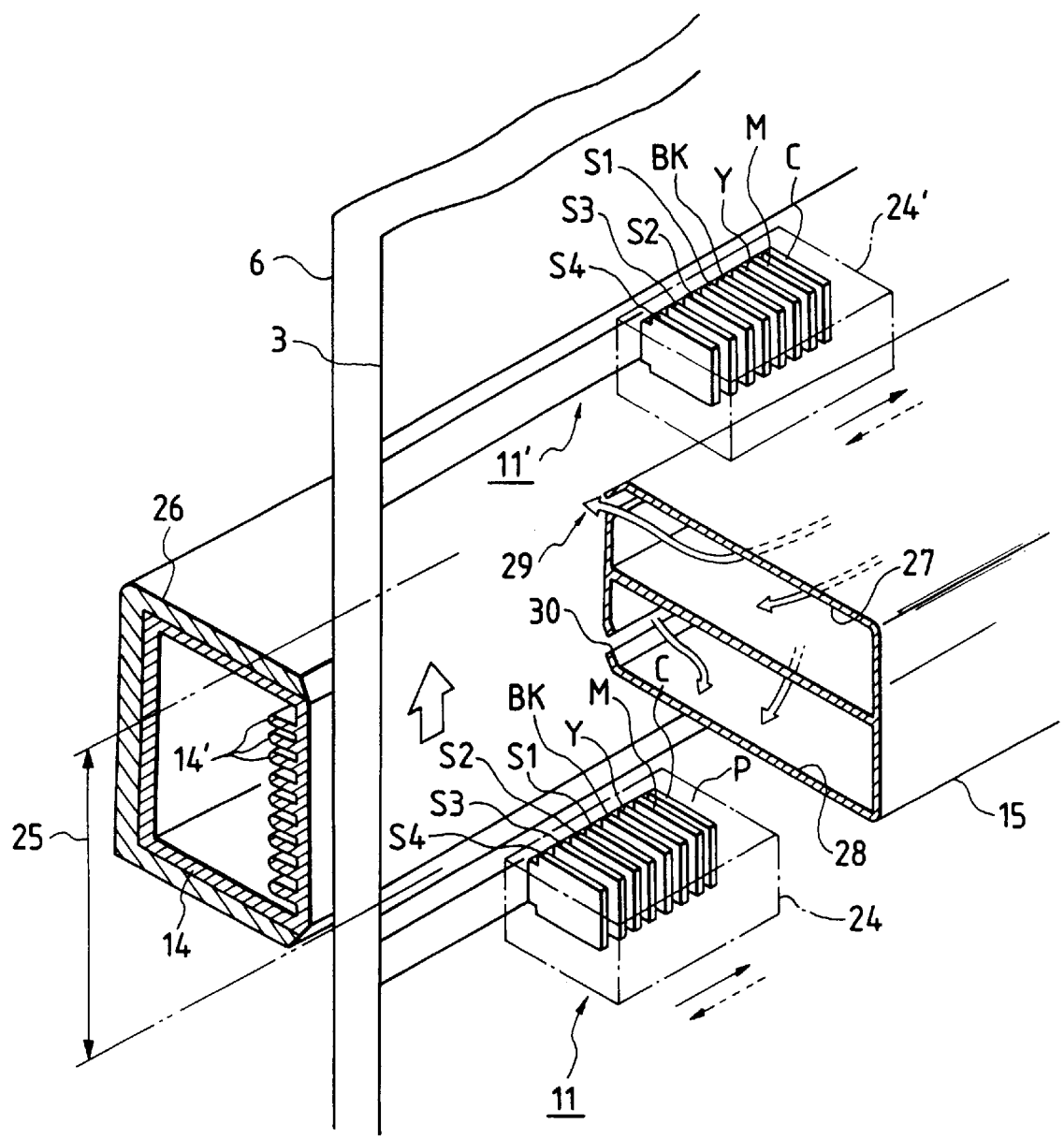
FIG. 29 is a perspective view showing the arrangement around a recording head of the printer.

FIG. 28 shows the arrangement of an ink-jet printer as a printing apparatus of this embodiment, and FIG. 29 is an enlarged perspective view of main part of the printer shown in FIG. 28. The printing apparatus (printer) of this embodiment mainly comprises a cloth feed unit B for feeding a roll of cloth which is subjected to preprocessing for printing, a main body unit for performing a print operation while line-feeding the fed cloth portion with high precision, and a take-up unit C for drying and taking up the printed cloth portion. The main body unit A further comprises a precision cloth feed unit A-1 including a platen, and a print unit A-2.

A roll of preprocessed cloth 3 is fed toward the cloth feed unit, and is then fed to the main body unit A. In the main body unit, a thin endless metal belt 6, which is precisely step-driven, is looped between a driving roller 7 and a winding roller 9. The driving roller 7 is directly step-driven by a high-resolution stepping motor (not shown), and step-feeds the metal belt by the driven step amount. An adhesive mass is coated on the entire outer surface of the metal belt, and the fed cloth portion is pressed against the belt surface, backed up by the winding roller 9, by a pressing roller 10 and is adhered to the adhesive surface.

The cloth portion 3, step-fed by the belt, is aligned by a platen 12 on the back surface of the belt, and is subjected to a print operation from its front surface side by an ink-jet head 13 in a first print unit 11. Every time a 1-line print operation is completed, the cloth portion is step-fed by a predetermined amount, and is dried by heating of a heating plate 14 on the back surface of the belt, and hot air from the front surface side, which air is supplied/exhausted from a hot air duct 15. The dried cloth portion is then subjected to an overlaying print operation by a second print unit 11' by the same method as in the first print unit.

The printed cloth portion is peeled from the adhesive surface, and is dried again by a post-drying unit 16 comprising a heating plate and a heater (or hot air). The dried cloth portion is guided by a guide roller 17, and is taken up by the take-up roller 18. The roll of taken-up cloth is detached from the apparatus of this embodiment, and is subjected to batch processing including color development, washing, and drying processes, thus obtaining a product.

Referring to FIG. 29, a cloth portion 3 as a recording medium is adhered to the metal belt 6, and is step-fed in the upper direction in FIG. 29. The first print unit 11 at a lower position in FIG. 29 includes a first carriage 24, which mounts Y, M, C, BK ink-jet heads, and ink-jet heads for characteristics S1 to S4. Each ink-jet head (recording head) used in this embodiment has elements for generating heat energy for causing film boiling in an ink as energy utilized for discharging an ink, and has 128 discharge openings aligned at a density of 400 DPI (dots/inch).

On the downstream side of the first print unit, a drying unit 25 comprising the heating plate 14 for heating a cloth portion from the back surface side of the belt, and the hot air duct 15 for drying the cloth portion from the front surface side is arranged. The heat conduction surface of the heating plate 14 is pressed against the endless belt 6 with a high tension, and the heating plate 14 strongly heats the belt 6 from its back surface side by high-temperature, high-pressure steam which flows through a hollow inner portion of the plate 14. The belt 6 consists of thin (100 to 150 $\mu$m) stainless steel, and directly and effectively heats a cloth portion 3 adhered thereto by a thin adhesive layer by heat conduction. Fins 14' as heat collectors are formed on the inner surface of the heating plate so as to efficiently concentrate heat on the belt back surface. A portion, which does not contact the belt, of the heating plate 14 is covered by a heat-shielding member 26, thereby preventing a loss due to heat dissipation.

On the front surface side, air having a lower humidity is blown to a cloth portion, which is being dried, by blowing drying hot air from a supply duct 27 on the downstream side, thereby improving a drying effect. Air, which flows in a direction opposite to the feed direction of the cloth, and contains a sufficient amount of water components, is sucked in a considerably larger volume than the blowing volume via a suction duct 28 on the upstream side, thereby preventing condensation in peripheral mechanical devices due to leakage of evaporated water components. A hot air supply source is located at the upper right side in FIG. 29, and suction is performed from the lower left side in FIG. 29, so that a pressure difference between an outlet port 29 and a suction port 30 becomes uniform over the entire region in the longitudinal direction. The air blowing/suction unit is offset toward the downstream side with respect to the center of the heating plate on the back surface of the belt, so that air can be blown to a sufficiently heated portion. With these units, the first print unit 11 dries a large volume of water components in an ink received by a cloth portion and containing a thinner.

The second print unit 11' is arranged at the downstream side (above) the first print unit 11, and is constituted by a second carriage 24' having the same arrangement as that of the first carriage.

Figure 30:
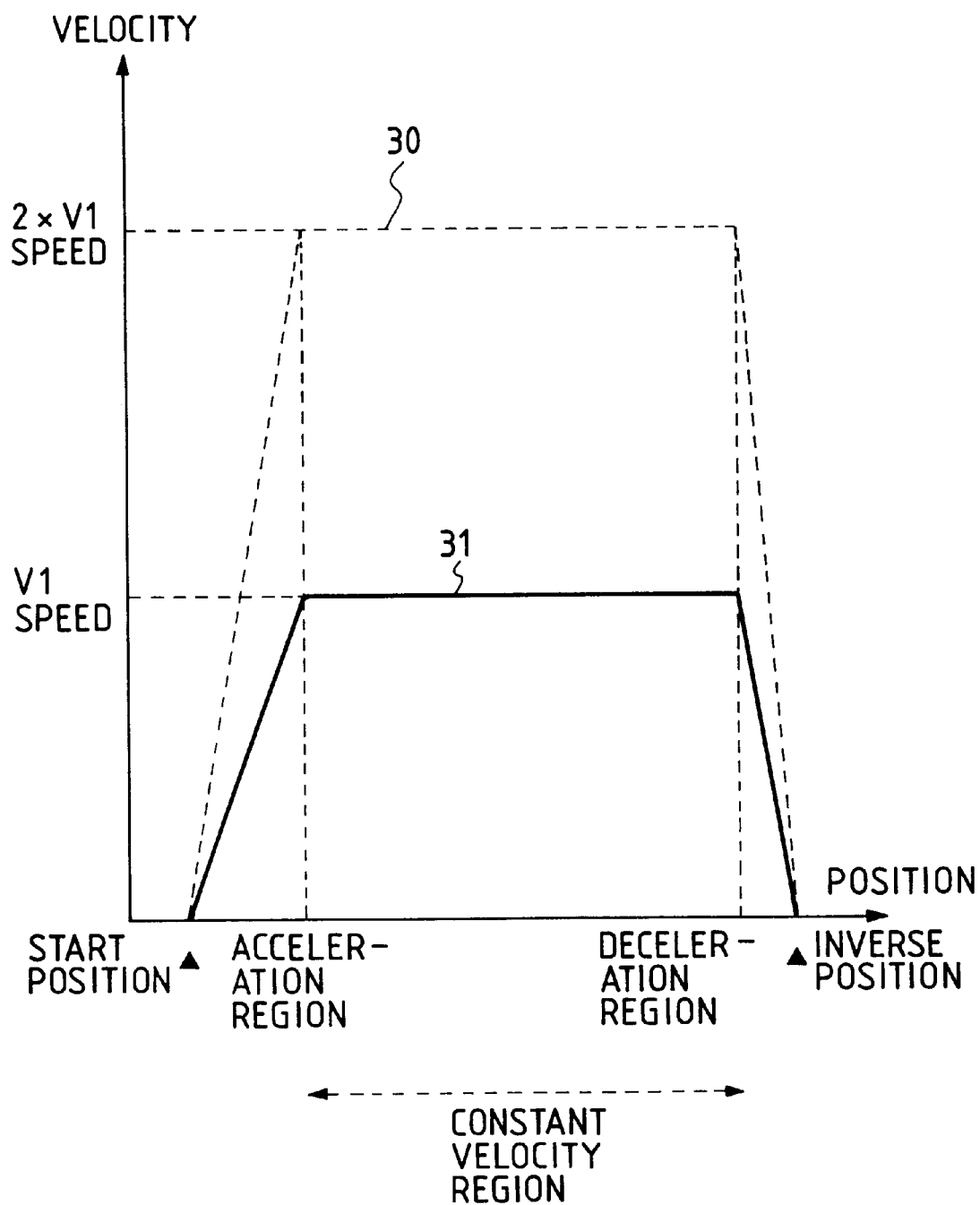
FIG. 30 is an explanatory view of the speed of a carriage which is scanned while mounting the recording head.

FIG. 30 explains the scanning speed of the carriages of the first and second print units 11 and 11' in FIG. 28 on the cloth surface.

Each carriage moves as follows. That is, the carriage starts to move from a start position, is gradually accelerated, moves at a constant velocity in a print region (a constant velocity region), is decelerated in a deceleration region after the print region, and is stopped at an inverse position.

Thereafter, a return movement to the start position is started. In this case, a non-print inverse movement is generally performed quicker than a normal movement including a print operation, thereby improving productivity of the machines. A curve 30 represents the movement obtained when a thinning print operation is performed, and a curve 31 represents the movement in a mode for increasing the density.

Figure 31:
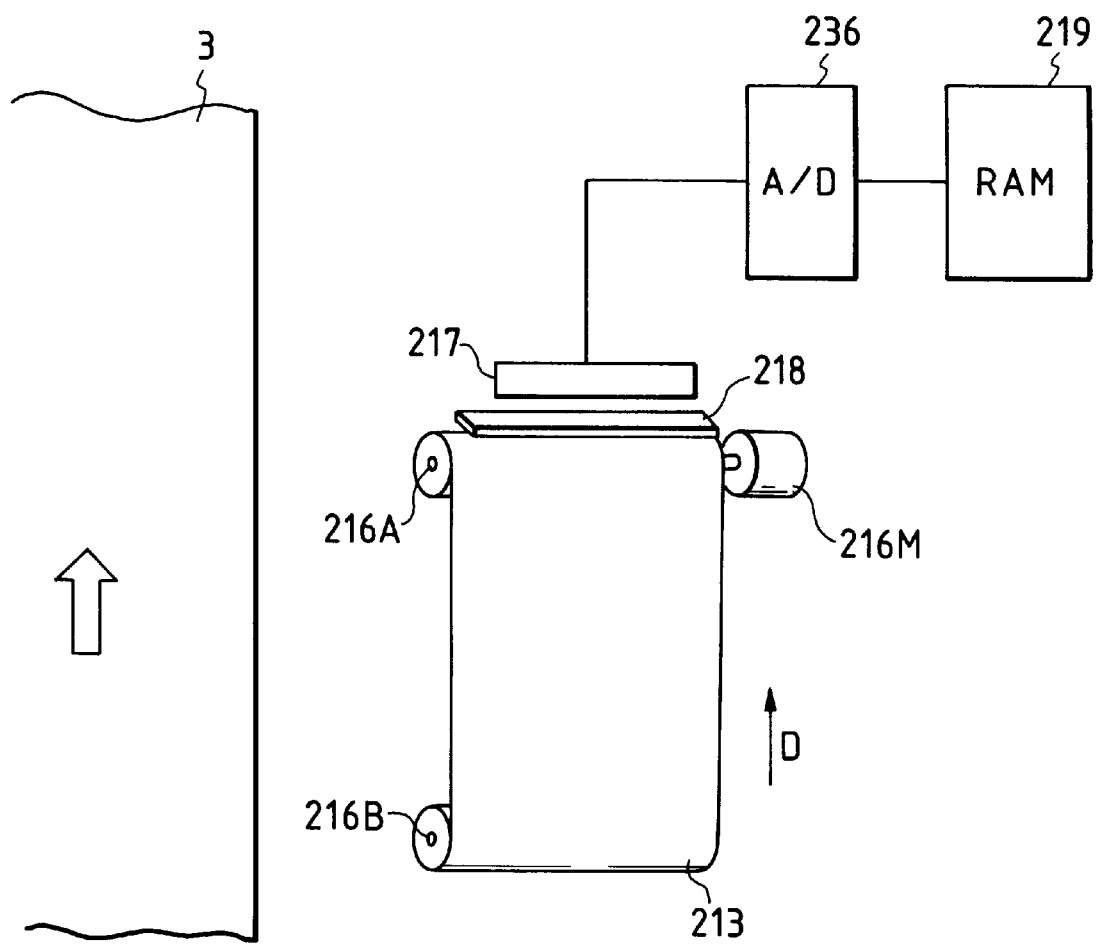
FIG. 31 is a schematic perspective view showing the arrangement of a density unevenness reading unit which can be applied to the printer of the second embodiment.

FIG. 31 shows a density unevenness correction unit 237 (provided in, e.g., the head characteristic measuring apparatus 108 shown in FIG. 14) comprising an HS test pattern recording section and a test pattern reading section, which are arranged in an apparatus side portion at the side opposite to FIG. 29. A recording medium 213 for a test pattern, which can be recorded by the ink-jet heads of the first and second print units 11 and 11' and is arranged at the scanning positions of the upper and lower carriages, is looped between rollers 216A and 216B, and is fed in a direction of an arrow D in FIG. 31 by a motor 216M. Then, as described above, the recording medium 213 on which a test pattern is recorded is illuminated with light emitted from a light source 218 so as to read the recording density of the test pattern recorded on the recording medium 213 by the ink-jet heads using a line sensor 217. The read signal of the test pattern recorded by the recording heads, which signal is read by the reading sensor 217, is converted into digital R, G, and B signals by an A/D converter 236, and the digital reading signals are temporarily stored in a RAM 219.

(3.2) Arrangement of Control System of Apparatus

Since most of the arrangement of the control system of the apparatus of this embodiment is common to the first embodiment, only differences will be described below.

Figure 32:
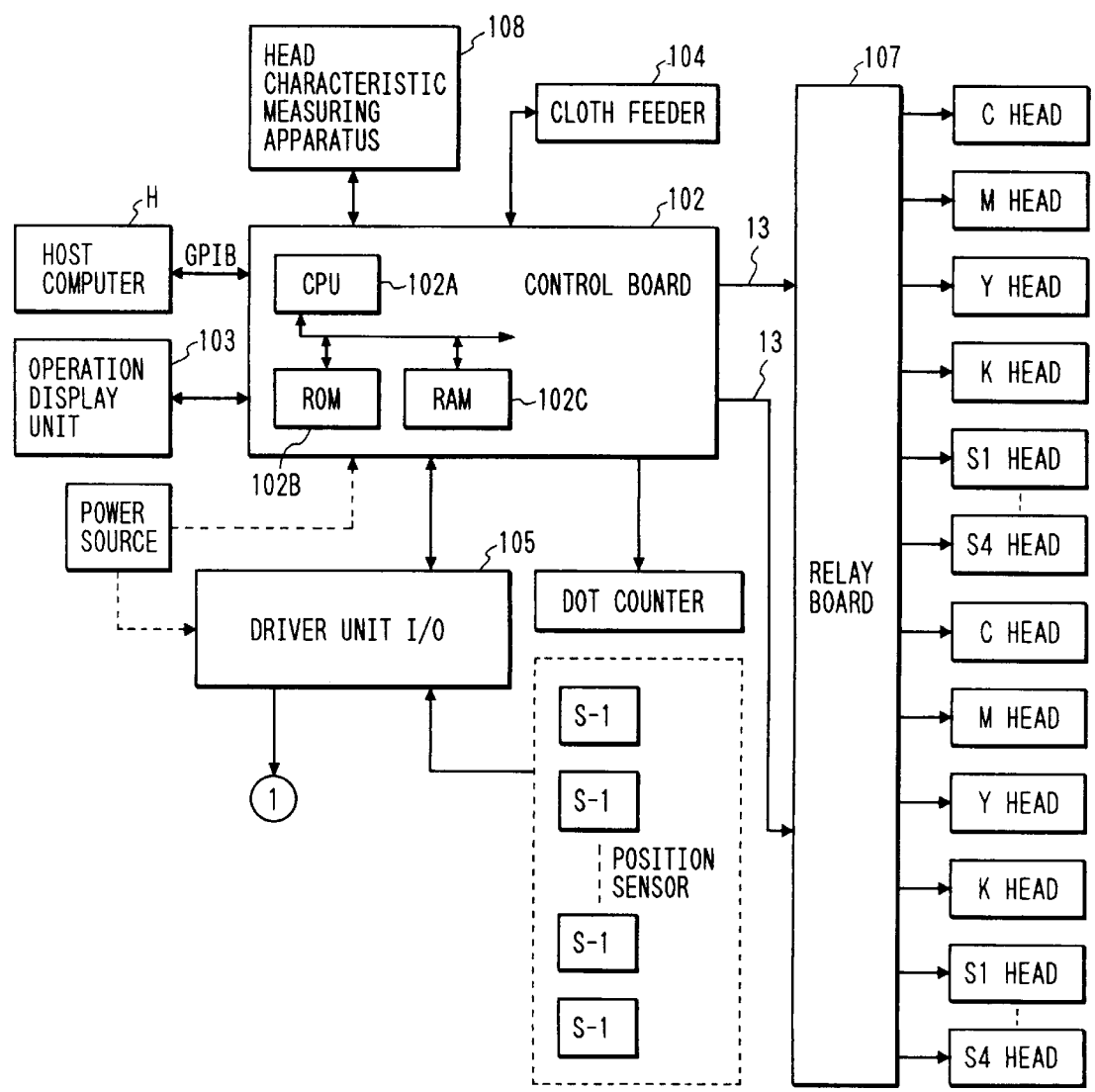
FIG. 32 is a schematic block diagram showing the electrical arrangement of the printer shown in FIG. 28.
Figure 33:
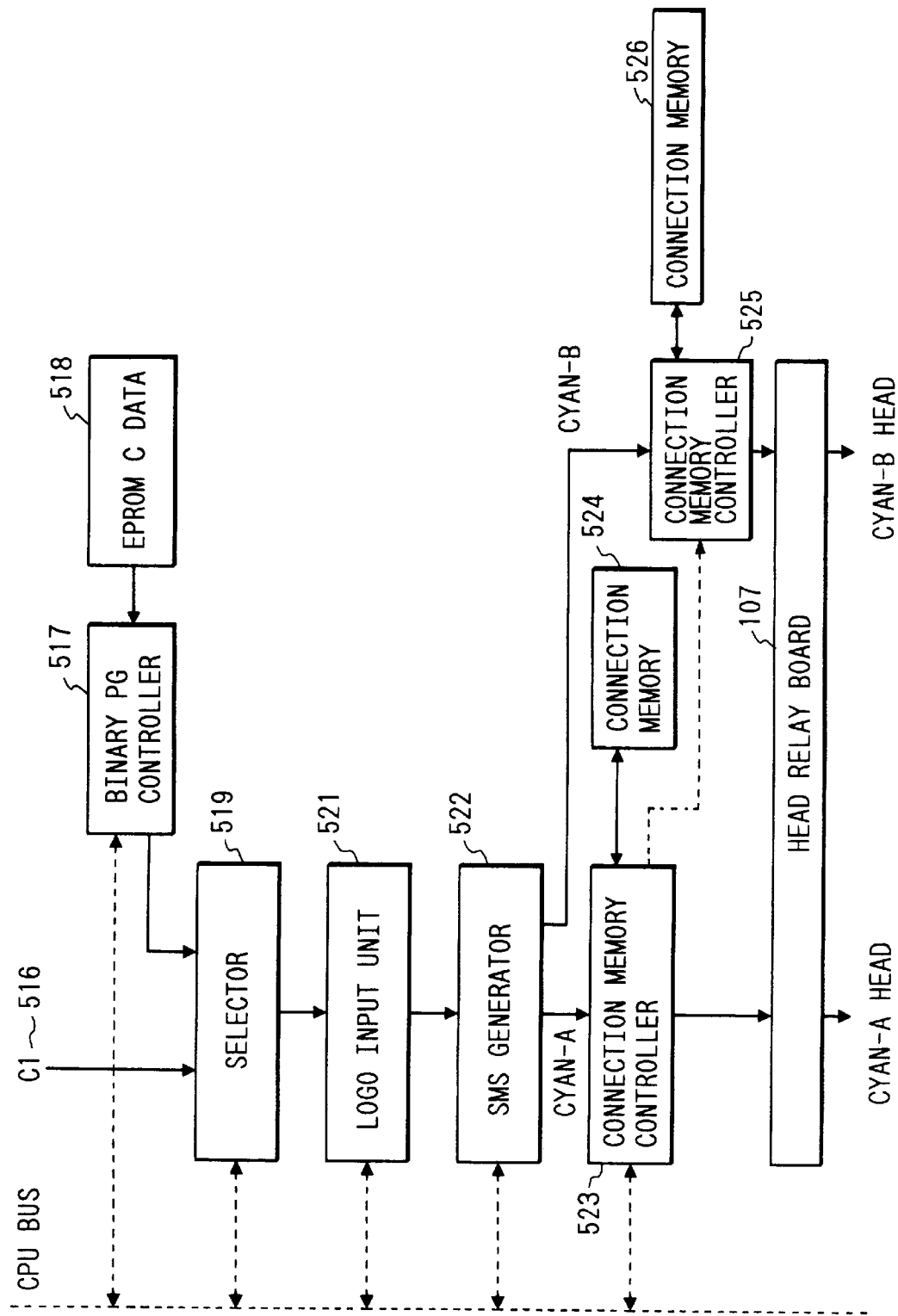
FIG. 33 is a partial block diagram showing the internal arrangement of a control board shown in FIG. 32 in accordance with the data flow.

A difference between the arrangements of the ink-jet printer of this embodiment shown in FIG. 32 and that shown in FIG. 14 is that two color head groups corresponding to the two print units 11 and 11' are connected to the relay board 107 in the embodiment shown in FIG. 32. The operation unit shown in FIG. 15, and the internal arrangement of the control board 102 shown in FIGS. 16 and 17 are the same as those in the first embodiment. An arrangement corresponding to FIG. 18 in the first embodiment is modified, as shown in FIG. 33, in the second embodiment. Differences between the arrangements shown in FIGS. 33 and 18 are that, in the arrangement shown in FIG. 33, a logo input unit 521 is inserted between the selector 519 and the SMS generator 522 in place of the postprocessing data input unit 520, and that a connection memory controller 525 and a connection memory 526 are arranged in addition to the connection memory controller 523 and the connection memory 524.

In the case of printing, a logo mark of a manufacturer, a designer's brand, or the like is often printed on the end portion of a roll of cloth. The logo input unit 521 performs this operation. The logo input unit 521 may comprise, e.g., a memory for storing logo data, a controller for managing a print position, and the like, and required designations and the like can be made in step MS11 in FIG. 2.

Print methods controlled by the SMS generator 522 include some differences from the first embodiment, and they will be described later.

In the second embodiment, the postprocessing data input unit 520 may be arranged. Also, in the first embodiment, the connection memory 526 and the memory controller 525 may be arranged to provide two print units. Furthermore, the connection memory 526 and the memory controller 525 may be omitted to use a single print unit, as has been described above.

Note that the logo input unit 521 in FIG. 33 can be constituted by a proper memory for storing logo data, and a synthesizing circuit for synthesizing logo data with image data. When logo data is managed independently of basic image data in this manner, desired logo data can be inserted at a repetitive period requested by an operator independently of the types of repetition patterns shown in FIGS. 21A to 21E. If a designated range is blanked immediately before basic image data is supplied to the heads, i.e., after the image data is binarized, a logo mark can be desirably (e.g., clearly) printed without being influenced by various conversions.

Note that the connection memory 524 is used for correcting the head positions between the upper and lower print units in FIG. 29.

(3.3) Print Method

Figure 34:
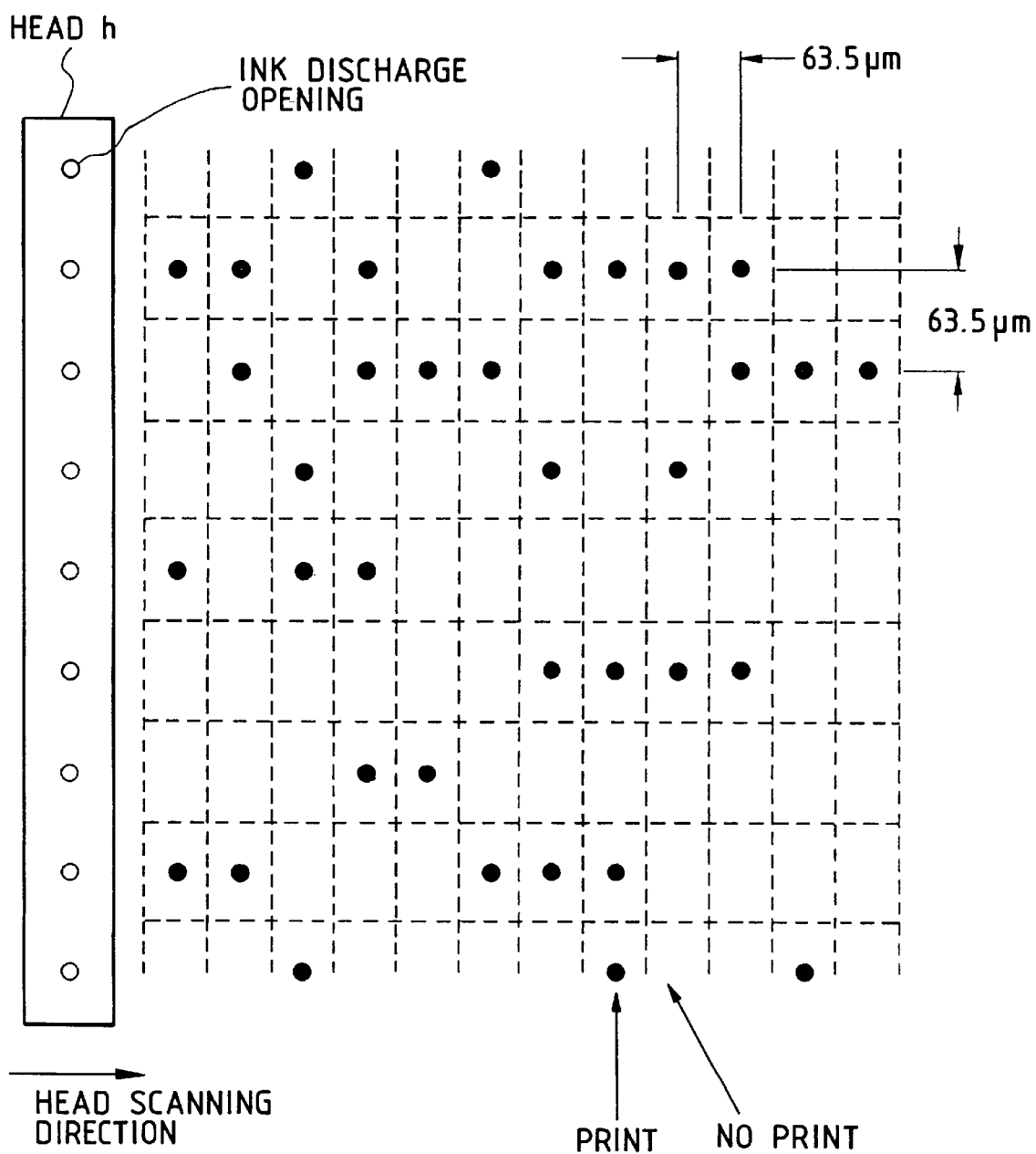
FIG. 34 is an explanatory view showing an example of data developed on a pallet conversion table memory.
Figure 35:
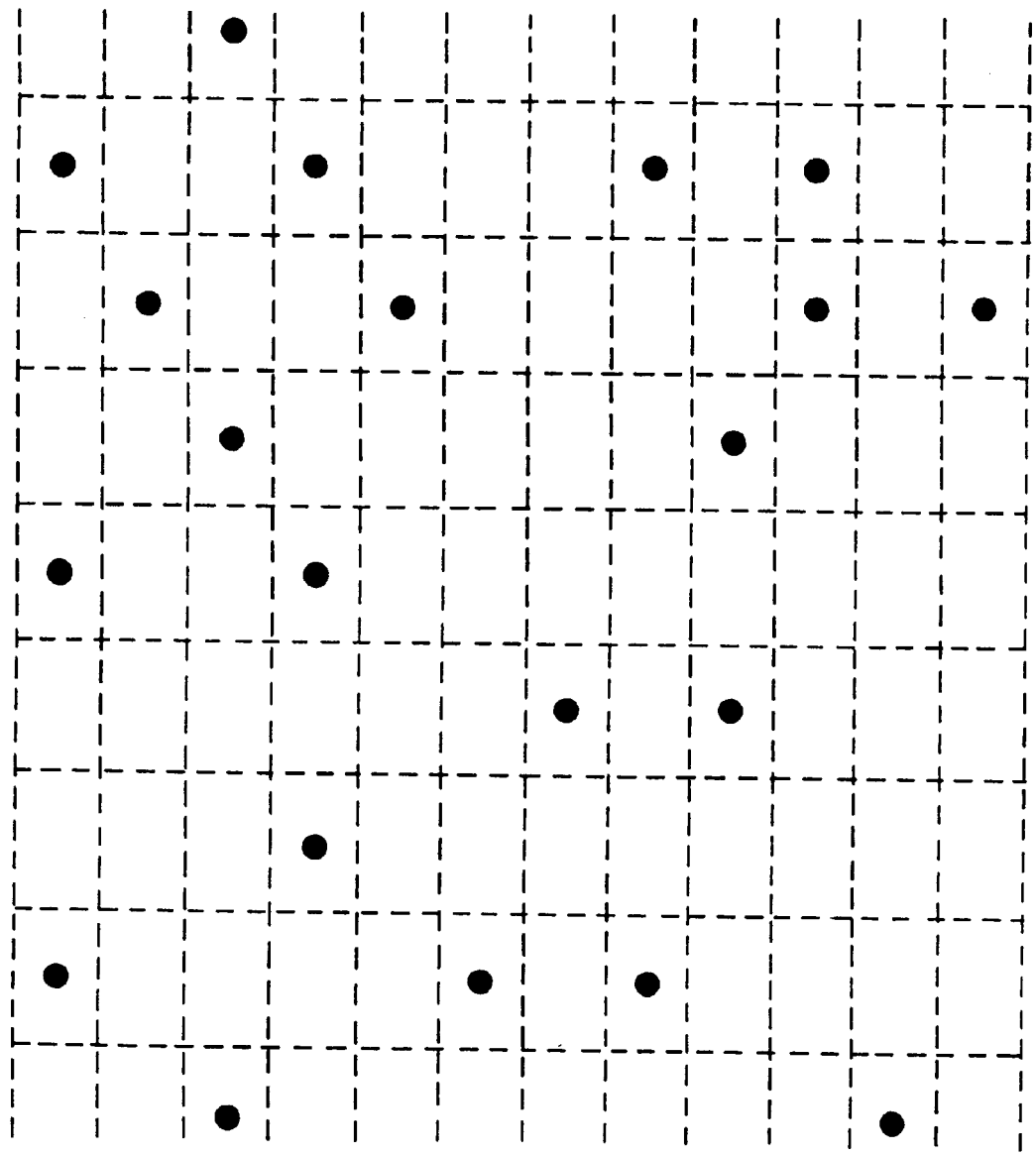
FIG. 35 is an explanatory view for explaining pixel formation with respect to a print image.
Figure 36:
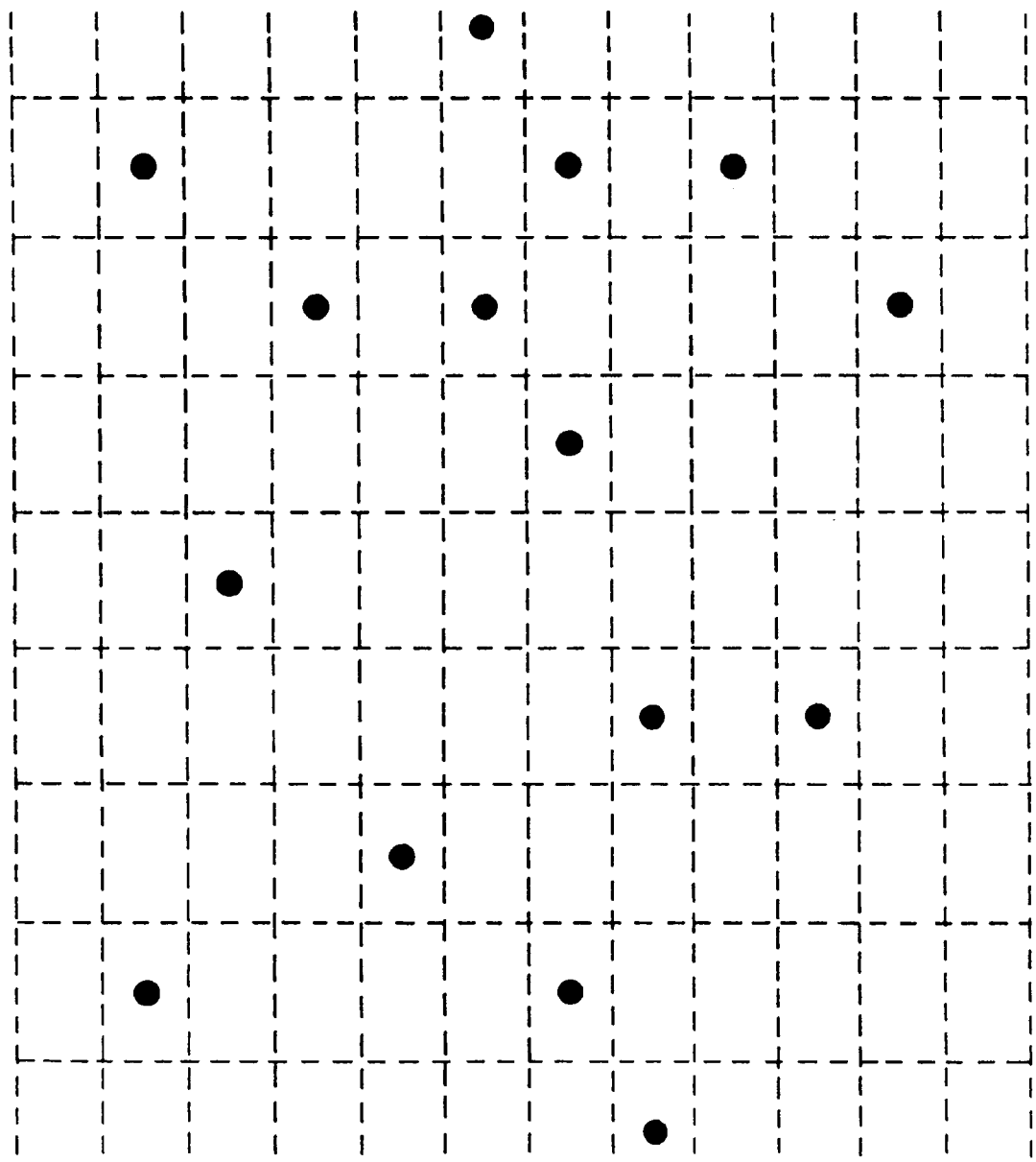
FIG. 36 is an explanatory view for explaining data thinning with respect to FIG. 35.

FIG. 34 shows certain print data. Referring to FIG. 34, each rectangular area surrounded by a dotted line corresponds to one pixel, and has an area of about 63.5 $\mu m^2$ in the case of 400 DPI. In FIG. 34, positions printed with black dots represent pixels for recording an image. A recording head h is moved in a direction of an arrow in FIG. 34, and discharges an ink from ink discharge openings at predetermined timings, thus performing a print operation shown in FIG. 34.

Note that a sequential multiscan method is a technique for printing a single line in the head moving direction using a plurality of discharge openings so as to correct a variation in density among the discharge openings caused by a variation in ink droplet size discharged from each discharge opening, and a variation in ink discharge direction. When a single line is formed by a plurality of discharge openings, an unevenness can be eliminated by utilizing random discharge characteristics. When the sequential multiscan method is executed by scanning the heads twice, the above-mentioned operation is achieved by the heads in the lower first print unit 11 in FIG. 28, and the heads in the upper second print unit 11' in FIG. 28. In addition, the above-mentioned operation can also be achieved as follows. That is, in one head, the upper half discharge openings are used in the first scan, and the lower half discharge openings are used in the second scan, so that odd print data (FIG. 35) in the head moving direction can be recorded by the upper half discharge opening group, and even print data (FIG. 36) can be recorded by the lower half discharge opening group. This method is a means for preventing a decrease in recording quality due to unevenness of ink discharge in units of discharge operations of the ink-jet head, and can provide an effect approximate to head shading.

FIGS. 37 to 40 show various print methods which can be selected in this embodiment.

Figure 37:
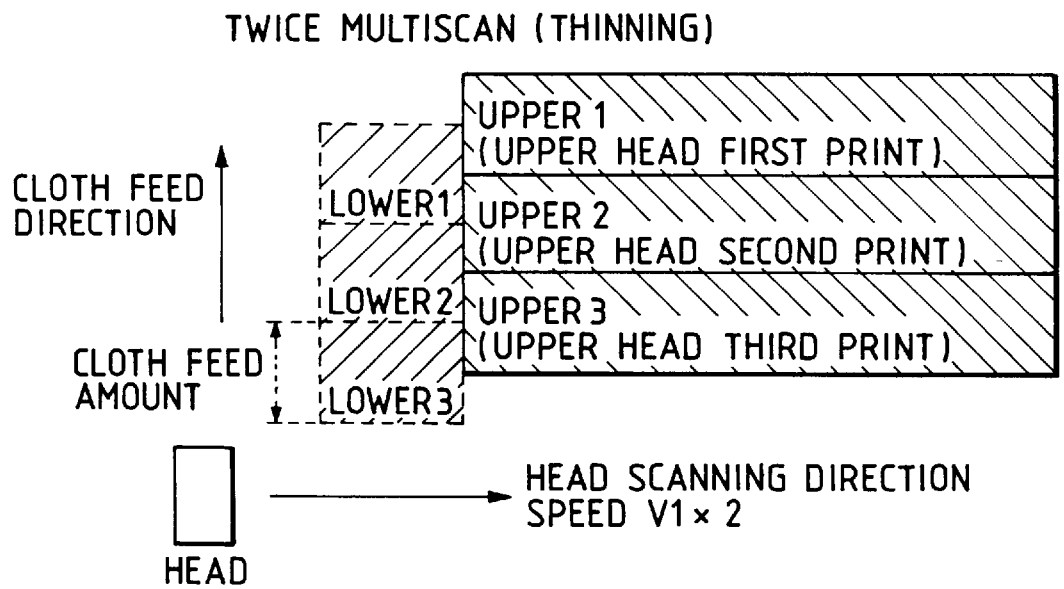

FIG. 37 shows a normal two-multiscan print operation using the heads in the first print unit and the heads in the second print unit shown in FIG. 29. Areas printed by a lower head group in the first print unit 11 side in FIG. 29 are represented by "lower 1", "lower 2", and "lower 3", and areas printed by an upper head group are represented by "upper 1", "upper 2", and "upper 3".

The cloth feed direction is indicated by an arrow in FIG. 37. One step feed amount corresponds to the head width. As can be seen from FIG. 37, all the areas are formed by the upper half of the upper head group and the lower half of the lower head group, or the lower half of the upper head group and the upper half of the lower head group. Data to be printed by each data is thinned out, and a predetermined density is obtained by overlapping data by both the head groups. The head scan speed at this time is V1×2.

Figure 38:
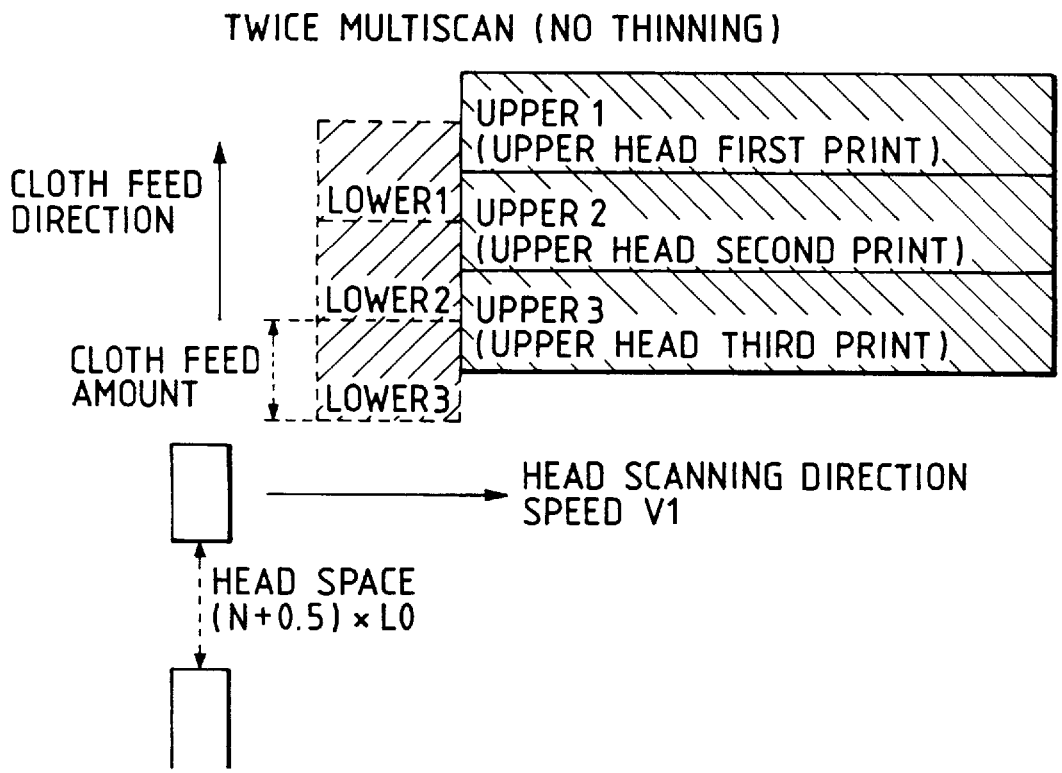

FIG. 38 shows a case wherein the print density is increased to twice that in FIG. 37. A difference between the cases in FIGS. 37 and 38 is that print data is not thinned out, and the carriage speed is decreased to ½ in the case in FIG. 38. The SMS generator 522 in FIG. 33 executes data distribution in the case of FIG. 37, but does not execute it in the case of FIG. 38. The speed is decreased to ½ in FIG. 38 in association with the ink refill frequency of the heads.

Figure 39:
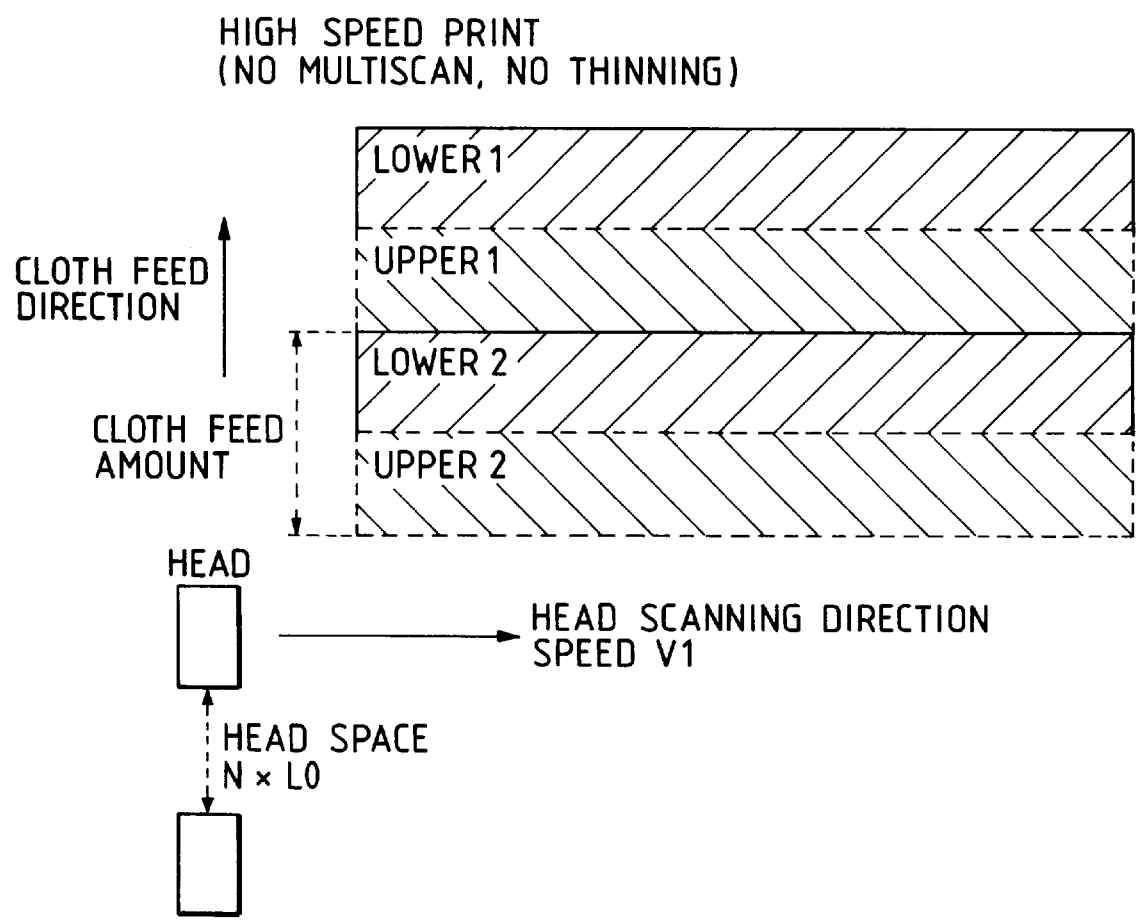

FIG. 39 shows a case wherein a thinning operation is not performed, and the cloth feed amount is doubled as compared to FIG. 37. Also, the space between the upper and lower head groups is changed to an integer multiple of a head width LO. Therefore, a means for variably adjusting the space between the first and second print units 11 and 11' in FIG. 28 may be arranged. However, the print operation illustrated in FIG. 39 can be realized by adjusting the cloth feed amount and the scan timings of the upper and lower head groups even though the head space is "(N+0.5)×LO", as shown in FIGS. 37 and 38.

FIG. 40 shows still another print method. In this method, the upper and lower head groups are scanned a total of four times (i.e., each of the upper and lower head groups is scanned twice), in place of a total of two scans (i.e., one scan for each of the upper and lower head groups) in FIG. 37. In this method, the SMS generator 522 need not generate a mode with/without thinning, and the speed of a scanner need not be switched, thus allowing simplification on design.

(3.4) Head Shading

An image signal read from a test pattern (to be described later) is supplied to an image forming unit, and is used in driving condition correction of the recording heads, as will be described later.

In the present invention, adjustment for preventing a density unevenness in image formation includes at least one of: equalization, by a recording head itself, of an image density defined by ink droplets from a plurality of ink discharge openings of a recording head; equalization of an image density in each of a plurality of heads; or equalization to obtain a desired color or density by mixing a plurality of inks, and preferably includes a plurality of these equalization items.

For this purpose, it is preferable that a density equalization correction means automatically read a reference print which gives a correction condition, and automatically determine the correction condition, and the present invention also incorporates addition of a manual adjustment device for fine adjustment and user adjustment to this means.

A correction object obtained based on the correction condition may be an optimal print condition, adjustment to a predetermined range including an allowable range, and even a reference density which changes according to a desired image, and every targets included in the spirit of correction can be applied.

For example, a case of density unevenness correction of a multihead including N recording elements, which has as its correction object to converge print outputs of the respective elements to an average density value, will be described below.

Assume that a density distribution is formed when elements (1 to N) are driven by a certain even image signal S.

Densities $OD_1$ to $OD_N$ of portions corresponding to the respective recording elements are measured, and an average density as the correction object is calculated as follows:

$$\overline{OD} = \sum_{n=1}^{N} OD_n / N$$

The calculation of the average density may be realized not only by measuring the densities in units of elements, but also by a method of calculating an average value by integrating a reflected light amount or another known method.

Figure 41A:
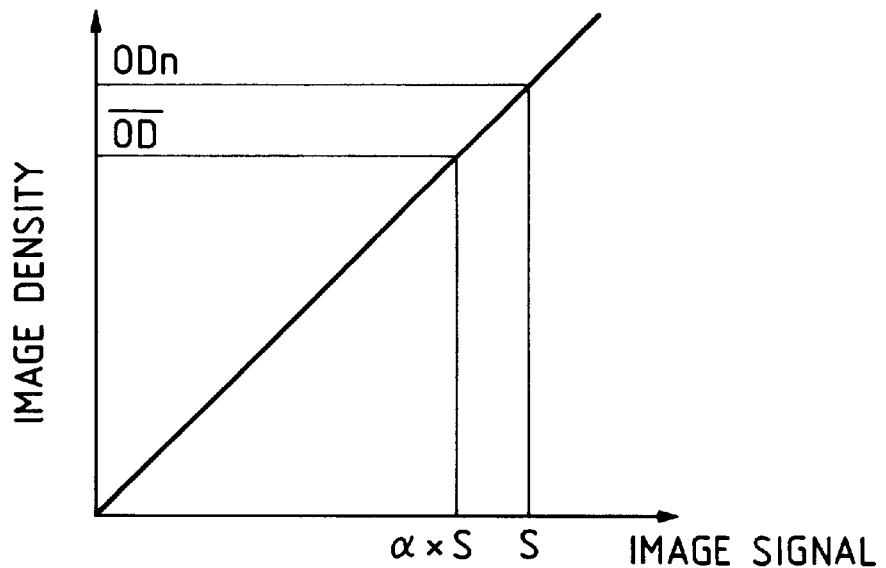
FIGS. 41A and 41B are explanatory views showing an unevenness correction mode for a recording head.

If the relationship between the image signal value and the output density of a certain element or a certain element group is as shown in FIG. 41A, a signal to be actually supplied to the element or the element group can be obtained by determining a correction coefficient a which corrects a signal S to yield a target density $\overline{OD}$. More specifically, S of a corrected signal obtained by correcting a signal S to $\alpha \times S = (\overline{OD}/OD_n) \times S$ can be supplied to the element or the element group in accordance with the input signal S. More specifically, this correction can be executed by performing table conversion shown in FIG. 41B for an input image signal.

Figure 41B:
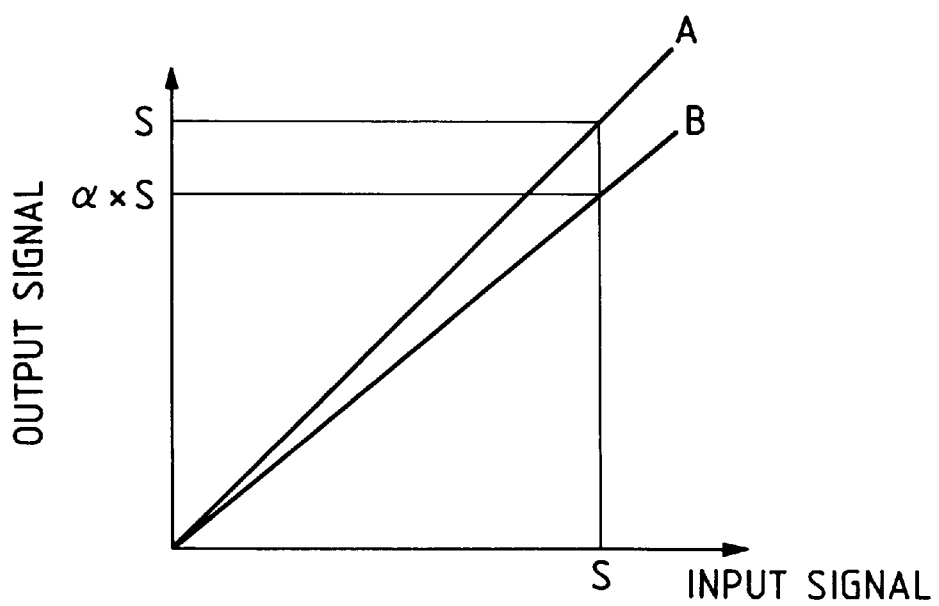

Referring to FIG. 41B, a line A is a line having an inclination of 1.0, and represents a table for outputting an input signal without any conversion. A line B is a line having an inclination of $a = \overline{OD}/OD_n$, and represents a table for converting an input signal S into an output signal $\alpha \cdot S$. Therefore, when an image signal corresponding to an n-th recording element is subjected to table conversion determined with a correction coefficient $\alpha_n$ in units of tables like the line B in FIG. 41B before driving the head, each of the densities of portions recorded by the N recording elements equals $\overline{OD}$. When such processing is performed for all the recording elements, a density unevenness is corrected, and an even image can be obtained. More specifically, when table conversion data for image signals corresponding to the respective recording elements are obtained in advance, correction of unevenness can be realized.

This object correction may be realized by approximate equalization processing by executing the correction by comparing the densities of nozzle groups (three to five nozzles).

Density unevenness can be corrected by the abovementioned method. However, density unevenness may occur again due to the use state or a change in environment of the apparatus, or a change in density unevenness itself before correction or an aging of a correction circuit. Therefore, in order to cope with such a situation, the correction amount of an input signal must be changed. As a cause of such a change, in an ink-jet recording head, the density distribution may change due to attachment of precipitates from an ink or foreign matter to portions near ink discharge openings during a use of the head. This cause is also predictable from the fact that heaters in a thermal head are degraded or their characteristics change sometimes over time, and the density distribution changes. In such case, a density unevenness cannot be sufficiently corrected by an input correction amount, which is set initially in, e.g., the manufacture of the head. For this reason, a problem that the density unevenness gradually becomes conspicuous during a use of the head must be solved in a long-term use.

Figure 42:
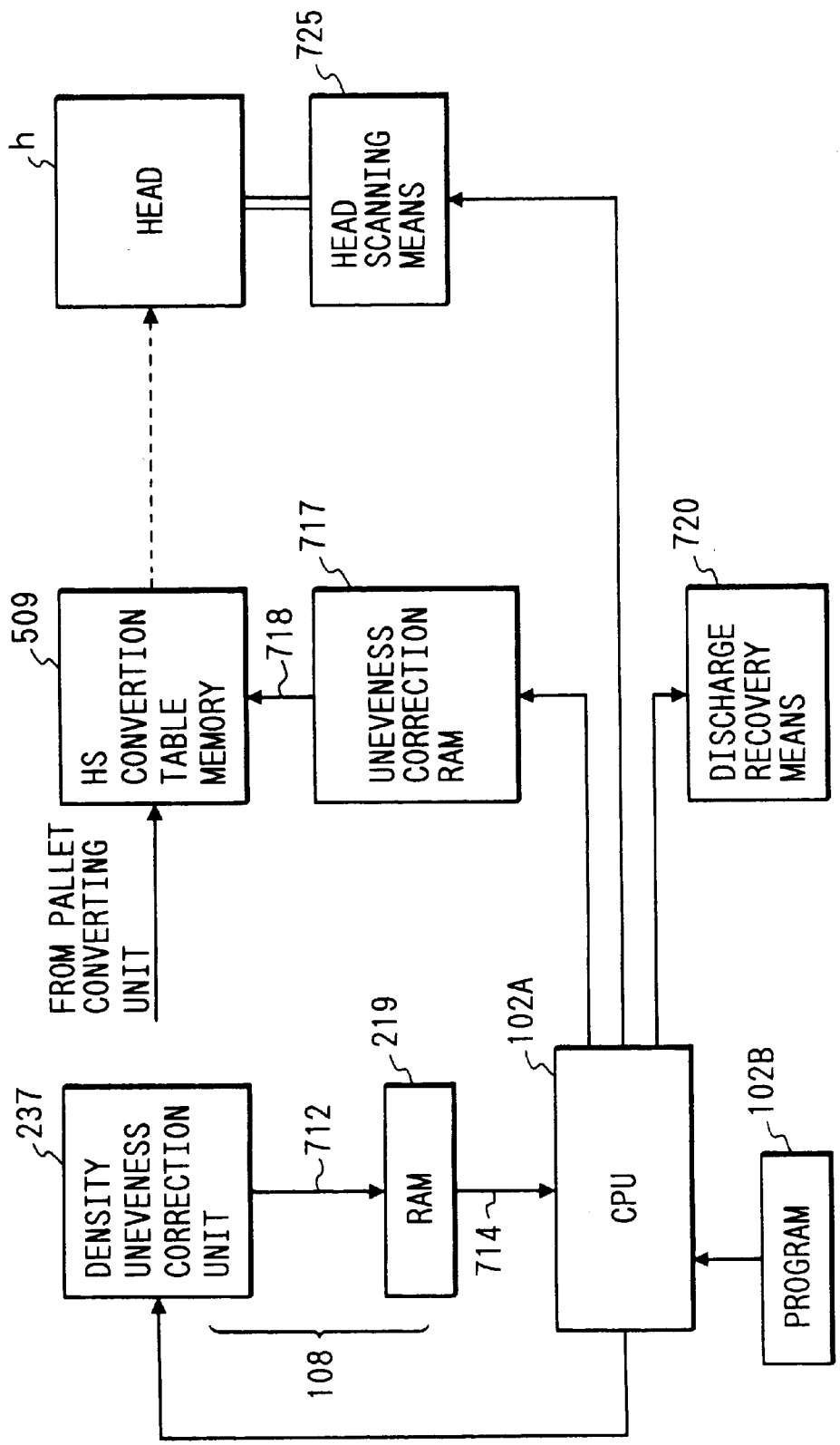
FIG. 42 is a block diagram showing the arrangement of a control system according to the second embodiment.

FIG. 42 shows the arrangement of a control system of the apparatus of this embodiment and mainly illustrates a head shading (HS) system. Referring to FIG. 42, a recording head h represents the heads in the first and second print units in FIG. 29.

An unevenness correction signal 718 is output from an unevenness correction RAM 717. A discharge recovery means 720 recovers the discharge state of the recording head h by, e.g., suction. A head scanning means 725 scans the recording head with respect to a recording medium or a test pattern recording medium.

As has been described above with reference to FIG. 17 of the first embodiment, each pallet-converted signal 704 is converted by a corresponding HS conversion table memory 509 to correct an unevenness of the recording head. The unevenness correction table has 64 correction lines, and selects a correction line (or a nonlinear curve) in accordance with the unevenness correction signal 718.

Figure 43:
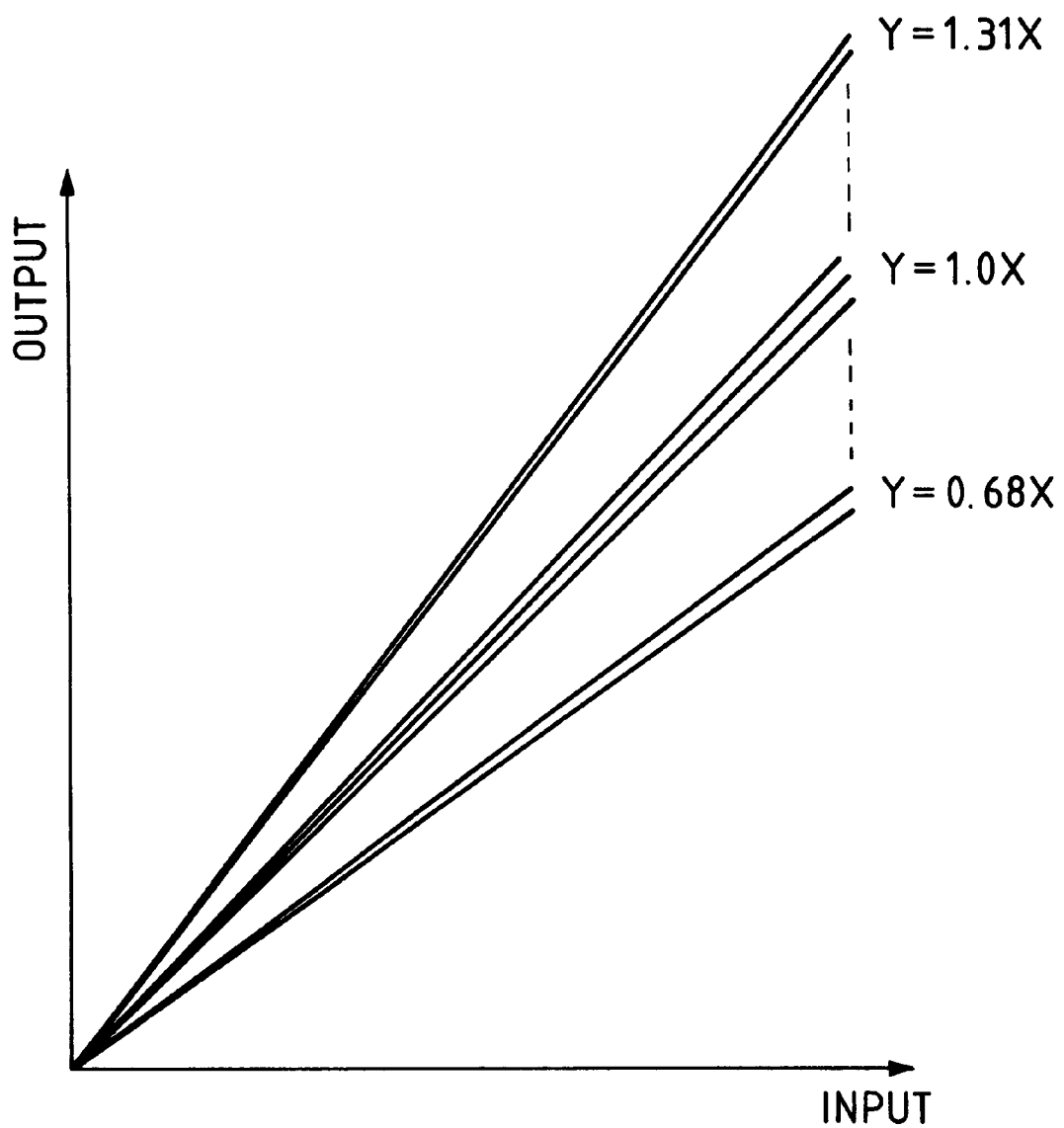
FIG. 43 is an explanatory view for explaining an unevenness correction table used in the second embodiment.

FIG. 43 shows an example of the unevenness correction table, which has 64 correction lines having different inclinations Y=0.68X to Y=1.31X at 0.01 intervals, and selects a correction line in accordance with the unevenness correction signal 718. When a signal corresponding to a pixel to be recorded by a discharge opening having a relatively large dot size is input, a correction line having a small inclination is selected; conversely, when a signal corresponding to a pixel to be recorded by a discharge opening having a relatively small dot size is input, a correction line having a large inclination is selected, thereby correcting an image signal.

The unevenness correction RAM 717 stores selection signals of the correction lines necessary for correcting the unevenness of each head. More specifically, the RAM 717 stores unevenness correction signals having 64 different values "0" to "63" in correspondence with the number of discharge openings, and outputs the unevenness correction signal 718 in synchronism with an input image signal. A signal 706 from which an unevenness is corrected by the line selected by the unevenness correction signal is γ-converted, as has been described above with reference to FIG. 17.

With the above-mentioned unevenness correction processing, a discharge energy generating element corresponding to a discharge opening in a high-density portion of the head decreases its driving energy (e.g., driving duty); conversely, a discharge energy generating element corresponding to a discharge opening of a low-density portion increases its driving energy. As a result, the unevenness of the recording head is corrected, and an even image can be obtained. However, when the density unevenness pattern of the head changes during use, the unevenness correction signals used so far become improper, and an unevenness occurs on an image. In this case, unevenness correction data are rewritten.

A correspondence between FIG. 42 and the HS conversion controller 510 and the conversion table memory 511 in FIG. 17 will be described below. In this embodiment, the HS conversion table memory 509 may comprise a ROM which stores the correction curves shown in FIG. 43 in the form of a table, and the unevenness correction RAM 717 may be used as a constituting element of each HS conversion controller 510.

Note that the HS conversion table memory 509 may comprise a rewritable memory such as a RAM, and a table stored in, e.g., a separate ROM may be properly read out and developed on the HS conversion table memory 509 in accordance with HS data (density unevenness correction data) calculation processing. In this case, as will be described later, when independent density unevenness correction data are used for the upper and lower head groups, the capacity of each memory 509 is determined in correspondence with HS correction for each of the upper and lower head groups, and a correction table may be rewritten to a corresponding one prior to HS correction for the upper and lower head groups.

Figure 44:
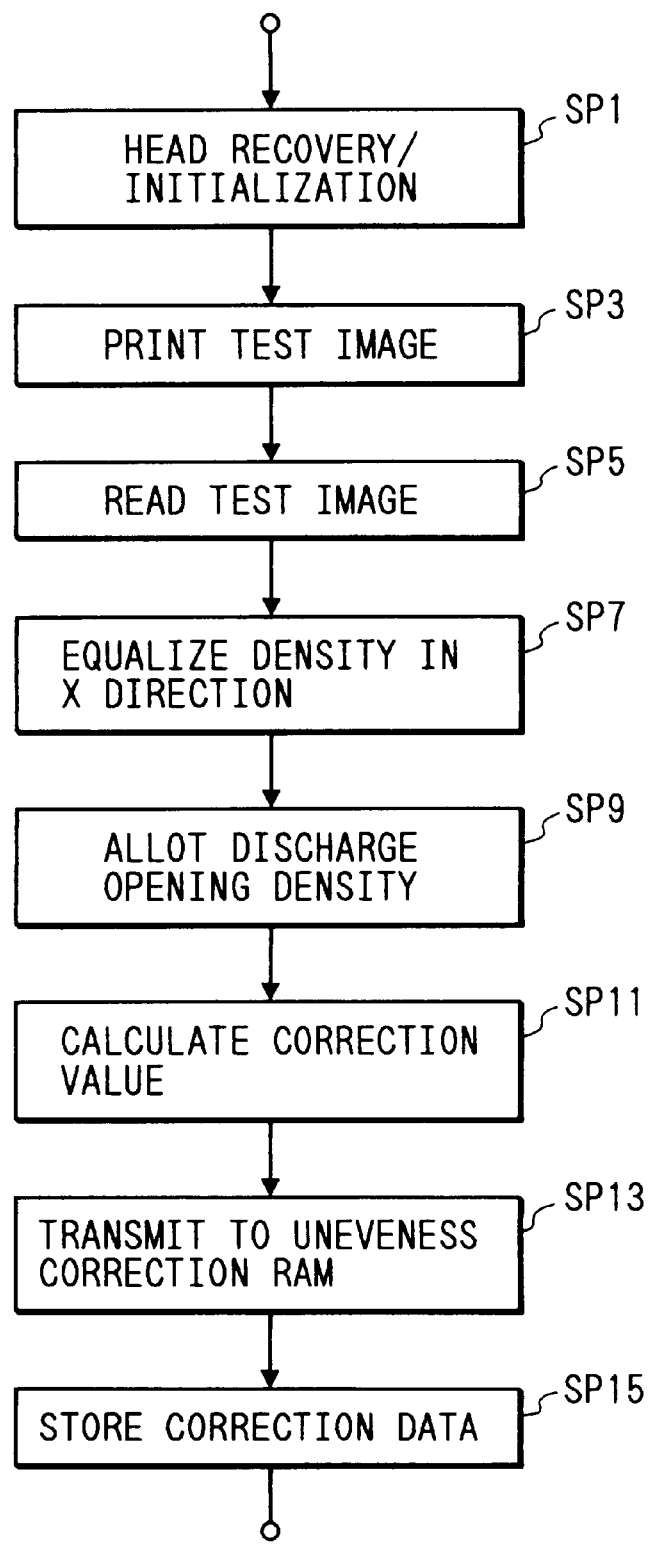
FIG. 44 is a flow chart showing an example of an unevenness correction processing sequence according to the second embodiment.

FIG. 44 shows an example of an unevenness correction processing sequence according to this embodiment.

When this sequence is started, a discharge stabilization operation by head recovery/initialization is executed in step SP1. This is because if density evenness correction processing is performed in a state wherein the recording head does not have normal discharge characteristics due to an increase in viscosity of an ink, mixing of dust or bubble, or the like, the head characteristics (density unevenness) cannot often be faithfully recognized.

In the discharge stabilization processing, the recording head h and a cap as a component of the discharge recovery means 720 are Joined to each other at opposing positions, and suction is performed via the cap, thereby forcibly discharging an ink from discharge openings. Also, the discharge opening forming surface of the head may be cleaned by bringing an ink absorbing member, which can be arranged in a cap unit, into contact with the discharge opening forming surface, by blowing air, by wiping, or the like. Furthermore, the recording head may be driven in the same manner as in normal recording to perform preliminary discharge. In this case, the driving energy in preliminary discharge need not always be equal to that in normal recording. More specifically, the same processing as a so-called discharge recovery operation performed in an ink-jet recording apparatus can be performed.

In place of or after the above-mentioned processing, a pattern for discharge stabilization may be recorded on a test pattern recording medium 213. Thereafter, for example, a test pattern for density unevenness correction may be recorded.

In steps SP3 and SP5, a test pattern is printed and read. The print and reading operations performed in this embodiment will be described below.

Figure 45:
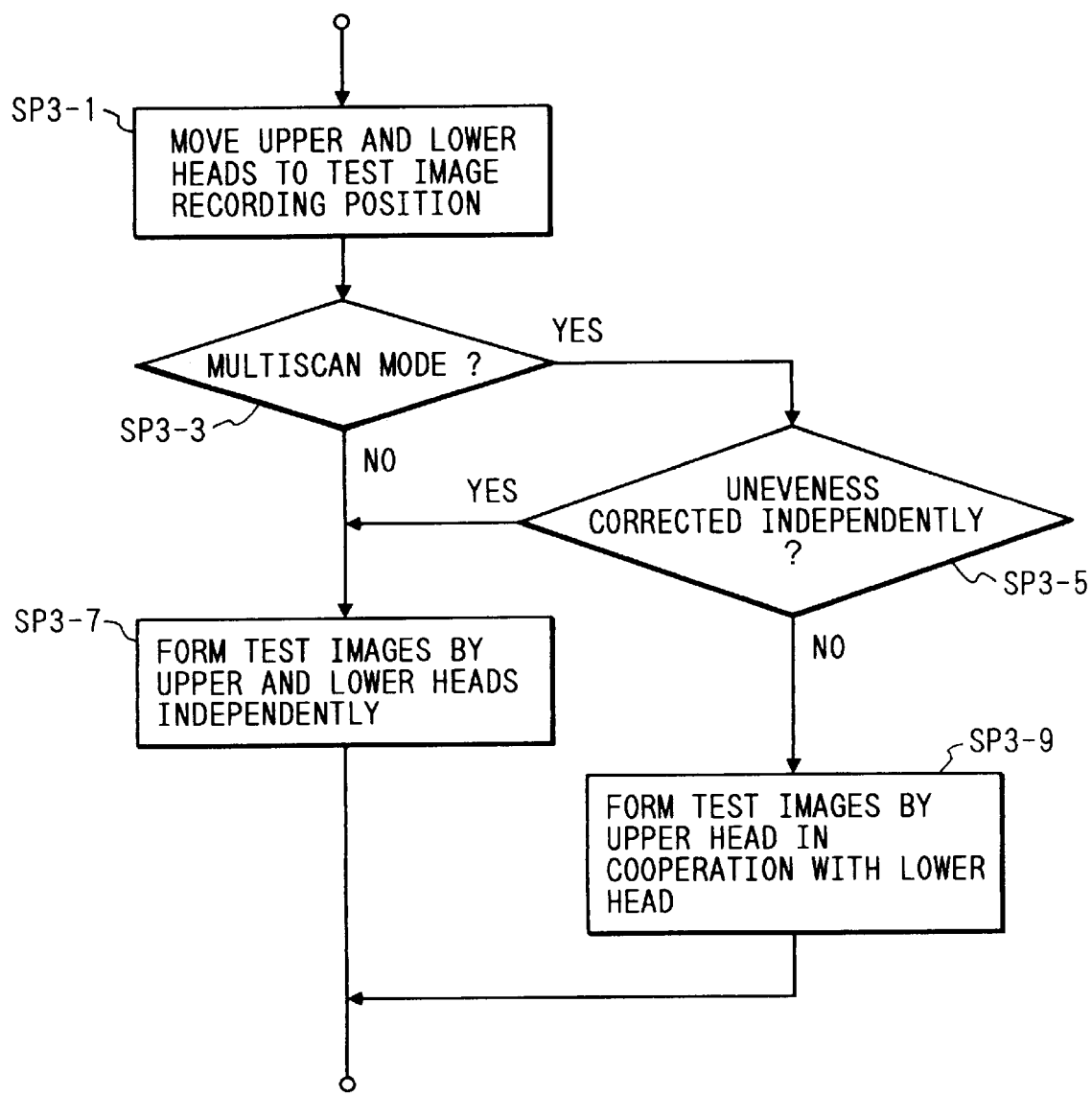
FIG. 45 is a flow chart showing the details of test image formation processing.

FIG. 45 shows an example of a test image recording sequence (step SP3). In this sequence, in step SP3-1, the carriages of the first and second print units 11 and 11' are moved to a test pattern (test image) recording position shown in FIG. 31. In step SP3-3, it is checked if a multiscan mode shown in FIG. 37, 38, or 40 is set or a high-speed recording mode shown in FIG. 39 is set. If the multiscan mode is set, it is checked in step SP3-5 if unevenness correction data is independently determined in units of upper and lower heads in FIG. 29.

Figure 46:
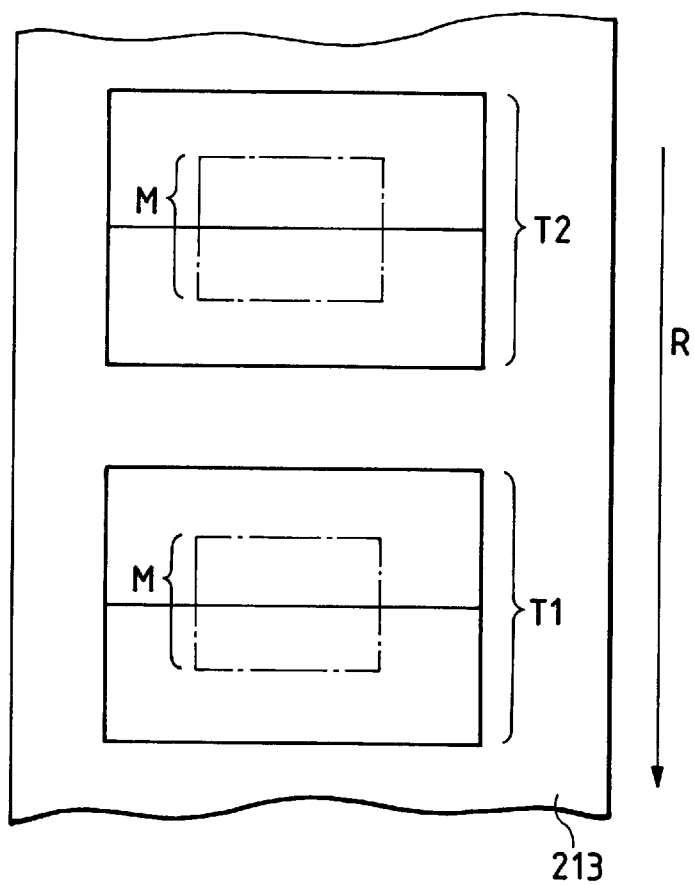
FIG. 46 is an explanatory view showing an example of a test image which is used for independently performing HS conversion of two heads.

If it is determined in step SP3-3 that the high-speed mode is set, or if YES in step SP3-5, test patterns T1 and T2 shown in, e.g., FIG. 46 are respectively formed by scanning the upper and lower heads twice, and are read in a direction of an arrow R in FIG. 46 in step SP3-7. In this case, a predetermined region M between the centers of two scans in each of the test patterns can be used as a correction calculation object. Thus, processing can cover all discharge openings of the upper and lower heads, and instability of the read density at an image end portion, which may occur upon reading of an image recorded by only one scan, can be eliminated. For this purpose, a so-called irregular 3-line print operation which includes scans for driving several discharge openings of upper and lower heads before and after a scan for driving all the discharge openings may be performed, as disclosed in Japanese Patent Application No. 2-329746.

Figure 47:
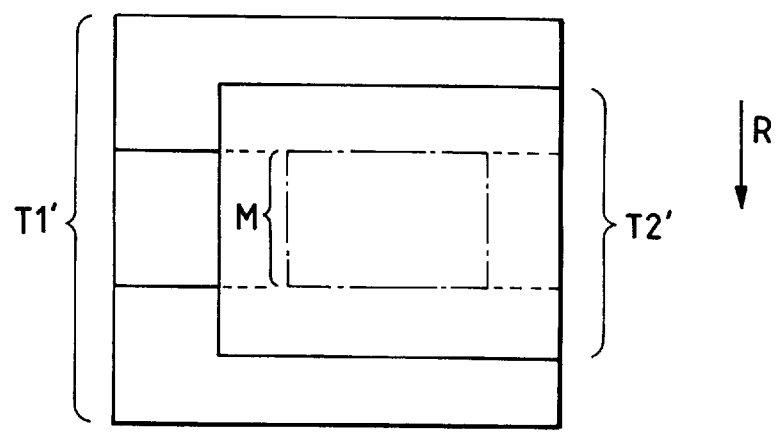
FIG. 47 is an explanatory view showing an example of a test image which is used for commonly performing HS conversion of two heads.
Figure 48A:
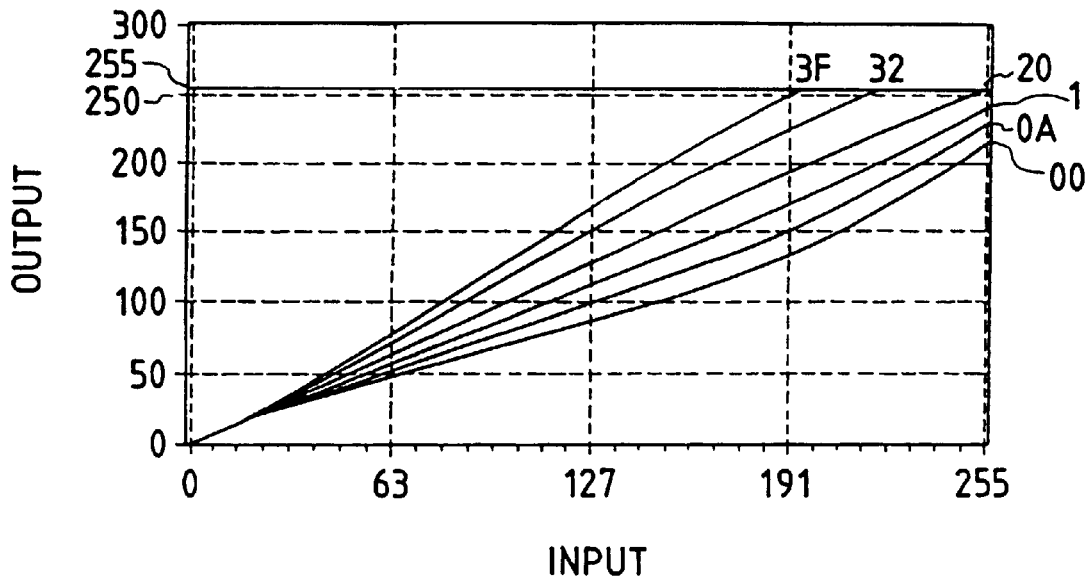
FIGS. 48A and 48B are explanatory views showing two examples of correction curves used in HS-$\gamma$ conversion.
Figure 48B:
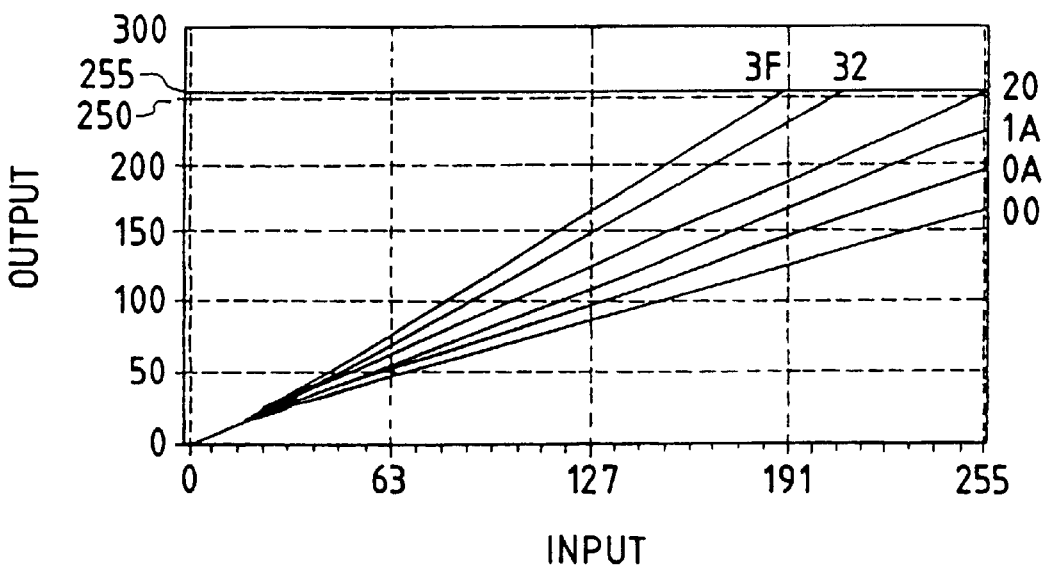

On the other hand, if NO in step SP3-5, the flow advances to step SP3-9, and a test pattern shown in, e.g., FIG. 47 is recorded by upper and lower heads. The pattern shown in FIG. 47 includes a region T1 for three scans recorded by the lower head, a region T2' for two scans overlaid by the upper head, and a region M' serving as an unevenness correction calculation object.

Referring back to FIG. 44, in steps SP7 and SP9, equalization of densities in the X direction, and allotment of densities in correspondence with the discharge openings are performed. As a method of allotting density data obtained by the above method to the discharge openings of the head, the following method can be adopted. A threshold value, which can clearly discriminate a print portion from a blank portion, is determined for the entire density distribution. The central value of coordinates having densities equal to or larger than the threshold value is calculated. Then, data for 64 discharge openings before and after the central value are obtained as data of an unevenness correction calculation object. In FIG. 46, the former half portion can be used as density data for the lower discharge opening group (65th to 128th discharge openings), and the latter half portion can be used as density data for the upper discharge opening group (first to 64th discharge openings). In FIG. 47, the former half portion can be used as density data for the upper discharge opening group of the lower head and density data for the lower discharge opening group of the upper head, and the latter portion can be used as density data for the lower discharge opening portion of the lower head and density data for the upper discharge opening group of the upper head.

Based on the above data, an unevenness correction calculation is performed in step SP11 in FIG. 44. More specifically, signals corresponding in number to the discharge openings are sampled from a signal obtained by reading a density unevenness, and are used as data corresponding to the discharge openings, as described above. If these signals are represented by $R_1, R_2, \ldots R_N$ (N=128), the signals are temporarily stored in a RAM 219, and a CPU 102A then performs the following calculation.

These data are converted into density signals by executing:

$$C_n = -\log(R_n/R_0)$$

($R_0$ is a constant satisfying $R_0 \geq r_n$; $1 \leq n \leq N$)
Then, an average density is calculated by:

$$\overline{C} = \sum_{n=1}^{N} C_n / N$$

Thereafter, deviations between the densities corresponding to the discharge openings and the average density are calculated as follows:

$$\Delta C_n = \overline{C}/C_n$$

A signal correction amount $(\Delta S)_n$ corresponding to each $(\Delta C)_n$ is calculated as follows:

$$\Delta S_n = A \times \Delta C_n$$

where A is a coefficient determined by the gradation characteristics of the head.

Selection signals for the correction lines to be selected are obtained in accordance with $\Delta S_n$, and unevenness correction signal having 64 different values "0" to "63" are stored in the unevenness correction RAM 717 in correspondence with the number of discharge openings (steps SP13 and SP15). Different γ correction curves (nonlinear curves in FIG. 48A; linear curves in FIG. 48B) shown in FIG. 48A or 48B in units of discharge openings are selected in accordance with the produced unevenness correction data, thereby correcting density unevenness.

In the case shown in FIG. 46, HS conversion data are independently obtained for the upper and lower heads. In this case, the RAM 717 or the HS conversion memory 509 for each color may have a capacity for two heads, and if the processing speed of the apparatus such as the CPU 102A is high, the storage content may be rewritten in correspondence with the upper and lower heads.

In the case shown in FIG. 47, mixed density data obtained upon execution of overlaying recording of the upper discharge opening group of the lower head and the lower discharge opening group of the upper head, and mixed density data obtained upon execution of overlaying recording of the lower discharge opening group of the lower head and the upper discharge opening group of the upper head are obtained. In this case, in order to determine density unevenness correction data of the discharge openings of the upper and lower heads on the basis of the obtained density data, since overlaying recording by the upper and lower heads is performed in an actual print operation, a half (average value) of the mixed density data may be calculated, and the density unevenness correction data corresponding to the discharge openings may be obtained from the average value. When the test patterns shown in FIG. 46 are used, density data obtained from the two patterns may be added to each other, and the sum data may be averaged. When the upper and lower heads have different characteristics, the average value of the mixed density data may be weighted or may be distributed at a proper ratio, thus distributing densities to the upper and lower heads, if necessary.

The above-mentioned processing can be performed for each color recording head once or a plurality of number of times until desired correction is attained. The above-mentioned processing can be performed not only for each color, but also for a test pattern in a mixed color.

Furthermore, correction data may be changed in correspondence with the print duty of a test pattern. More specifically, when proper correction is to be performed in various density regions, test patterns may be printed at print duties which can provide desired densities, and reading results of the test patterns may be utilized (for example, after test patterns are printed at duties of, e.g., 20%, 40%, 60%, and 80%, an average value of the densities obtained from these patterns may be calculated).

Also, only when a predetermined recording medium is used, formation and correction of a test pattern may be performed, or they may be performed regardless of the types of media. In this case, formation, reading, and correction of a test pattern at a proper duty according to the type of recording medium may be performed, and a threshold value may be changed in correspondence with the type of recording medium.

Furthermore, the timing for executing this sequence may be determined in accordance with various print conditions in, e.g., step MS23 in FIG. 2.

In the second embodiment described above, upon execution of at least a print operation for density inspection of, e.g., a test pattern, when one pixel is formed by a plurality of dots, the print duty, i.e., the print ratio, can be set by modulating the number of recording dots of the number of constituting dots.

However, the print ratio can also be set by modulating the driving voltage and/or the driving pulse width, or by modulating the number of ink drive operations per dot, and the same applies to a case wherein one pixel is formed by one dot. More specifically, the present invention can be applied even when the print ratio is set by modulating any parameters.

The above-mentioned embodiment of the present invention is an optimal embodiment wherein the obtained correction processing is performed in units of discharge energy generating elements. However, in practice, it is preferable in consideration of the convergence state and processing time of density equalization processing that common correction be performed for a plurality of predetermined neighboring discharge energy generating elements. In an optimal arrangement from this viewpoint, it is preferable that a large number of discharge energy generating elements of the recording head be subjected to common correction in units of block driving groups each including a plurality of elements. Although the block driving method itself may be realized by either a known or specific block driving method, a driving condition capable of executing density equalization correction must be determined after a density unevenness is discriminated according to the present invention, as a matter of course.

(4) Embodiment of Cost Calculation

Figure 49:
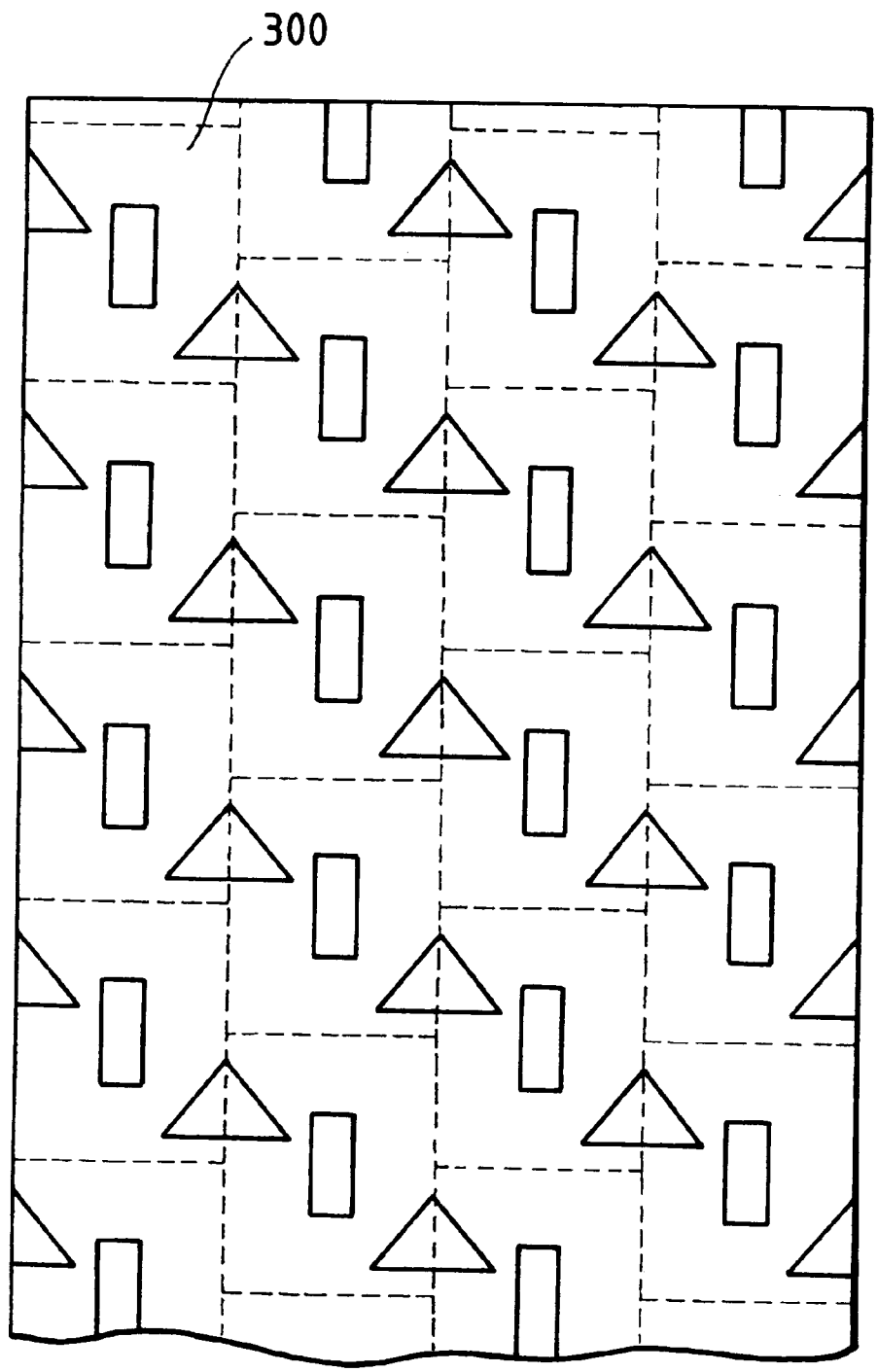
FIG. 49 is an explanatory view for explaining repetitive print of a basic image.

This embodiment pays attention to the feature of printing, i.e., basic image patterns (basic patterns) 300 repetitively printed on a piece of cloth, as shown in, e.g., FIG. 49, calculates the number of dots per color ink from data constituting the basic pattern, and calculates cost of the heads and inks on the basis of the calculated number of dots.

Figure 50:
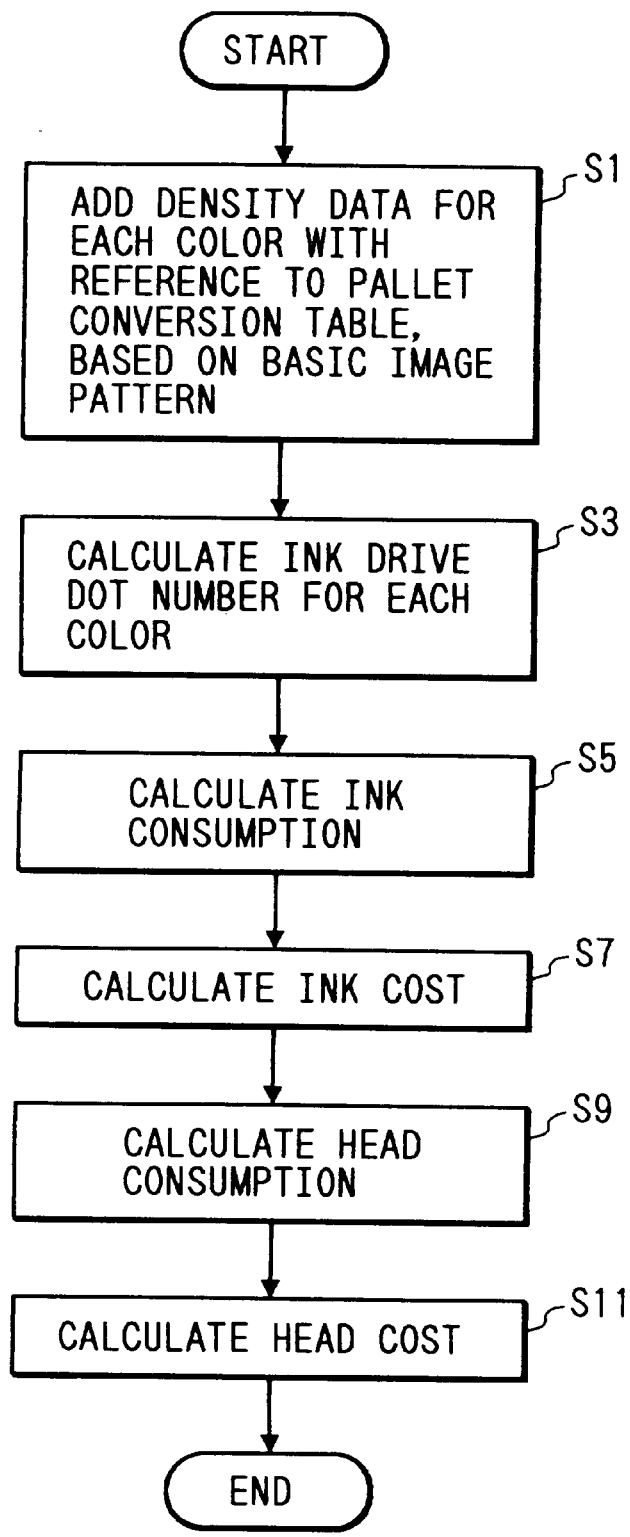
FIG. 50 is a flow chart showing an example of cost calculation processing means.

FIG. 50 shows an example of a processing sequence for realizing this embodiment, and this processing sequence may be executed by the CPU 1011 in the host computer H shown in FIG. 3 or by the CPU 102A in the printer P shown in FIG. 32. As a basic image pattern used as a basis of a calculation, one stored in the storage unit in the host computer H, or one developed on the image memory 505 in the printer P may be used. Furthermore, as a means for accessing an operator and information during a calculation process, the display 1026 and the keyboard 1023 provided to the host computer H, or the operation/display unit 103 of the printer P may be used.

Figures 51, 52:
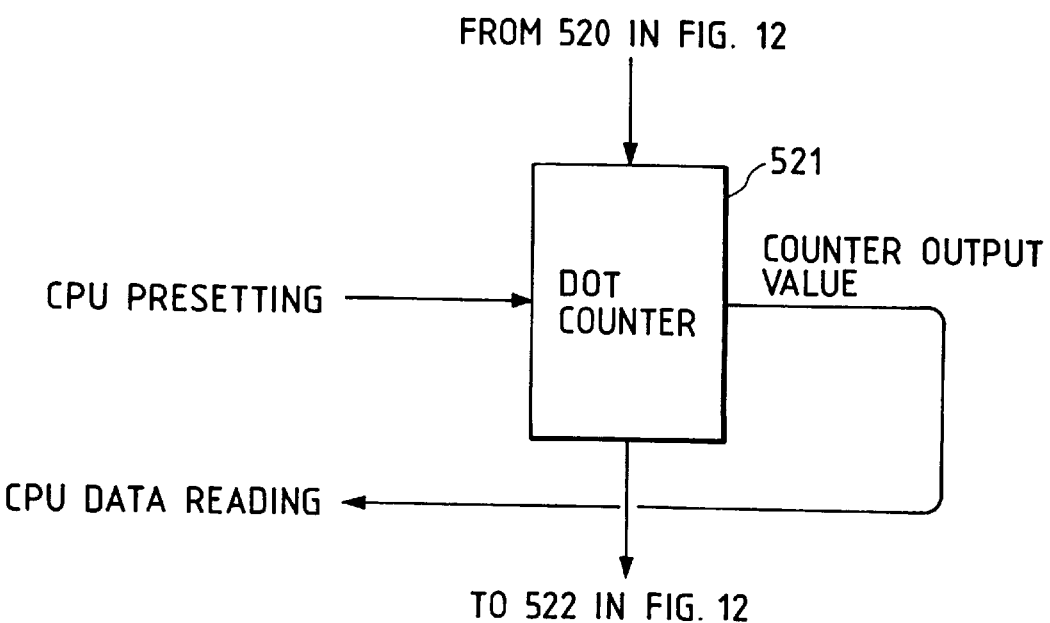
FIG. 51 is an explanatory view of the data format of a basic image.
FIG. 52 is a block diagram showing a circuit arrangement used in another embodiment of a cost calculation.

When this sequence is started, image data (density data) of all pixels are added to each other in units of colors on the basis of basic image data 301' which is stored together with pallet numbers written in units of pixels, as shown in, e.g., FIG. 51, with reference to pallet conversion tables shown in FIGS. 5 to 8 (step S1). If a total of image data of a certain color is K1, since image data for each pixel has an 8-bit format and is expressed by density data ranging from 0 to 255, and an image processing method for preserving or reproducing an image density by the entire basic image data is adopted in the system of this embodiment, an ink drive dot number N1 of the corresponding color in the entire basic image is calculated by K1/255. Similarly, if eight ink colors are used, N2 (=K2/255), N3 (=K3/255), . . . , N8 (=K8/255) are calculated from totals T2, T3, . . . , T3 obtained in step S1 for other colors (step S3).

An ink consumption amount per desired unit cloth area for which a cost calculation is to be performed is calculated (step S5). Ink consumption amounts L1, L2, . . . , L3 of eight color inks are calculated as follows:

$$Li = 40 \text{ pl} \times Ni \times (\text{unit cloth area}) / (\text{basic image area})$$
$$\text{for } i=1, \ldots, 8$$

40 pl picoliters are an ink discharge amount per dot. If prices per unit amount of color inks are respectively represented by Q1, Q2, . . . , Q8, ink consumption cost Q per unit area can be calculated (step S7):

$$Q = Q1 \times L1 + Q2 \times L2 + \ldots + Q8 \times L8$$

Furthermore, the head consumption number per unit cloth area is calculated from the number of times of drive operations in units of discharge openings of each head for the basic image (step S9). More specifically, if the number of recording elements (the heat generating elements or discharge openings in this embodiment) of each color head is P, an average number of times of drive operations of a single recording element in a print operation of the basic image is one of N1/P, N2/P, . . . , N8/P. For this reason, if the service life of the head is $10^6$ operations per recording element, the head consumption number for printing the basic image is given by:

$$T = (N1/P + N2/P + \ldots + N8/P)/10^6$$

Therefore, the head consumption number per unit cloth area is given by:

$$T' = T \times (\text{unit cloth area}) / (\text{basic image area})$$

In addition, if cost per head is represented by C, cost of the heads required in a print operation per unit cloth area is calculated as follows (step S11):

$$TC = C \times T'$$

In this case, the driving ratio of the respective recording elements in each head may change depending on image data. However, if a print operation is performed on a roll of cloth having a length of 50 m using a head in which 256 recording elements are aligned at a density of 400 DPI (dots/inch), the head scans 50 m/16.256 mm 615 times, and it can be stochastically considered that the respective recording elements be driven by substantially the same number of times. However, a recording element which is most frequently driven in a unit lot may be detected, and a calculation may be made based on this element.

Print cost per unit cloth area can be calculated based on the above-mentioned data by (Q1 for ink)+(T3 for head)+ (cloth cost)+(design cost)+(miscellaneous cost).

In the above embodiment, a calculation is performed on the basis of basic image data. For example, dot counters in units of ink colors may be arranged, and a CPU may calculate cost based on count results read from the counters.

FIG. 52 shows this example. A counter 521 is inserted between the units 520 and 522, and the CPU 102A calculates cost based on a count value read from the counter. The number of dots may be counted over the entire print range. Note that the CPU may supply preset data "0" to the dot counter before the beginning of a print operation, and may read a counter output value after the end of the print operation.

In the above embodiment, an apparatus for counting the number of dots forming a basic image, and calculating cost is integrally arranged in the host computer H or the printer P. However, this apparatus may be separately arranged from the host computer H or the printer P.

Furthermore, the above embodiment performs a cost calculation based on information of the number of dots.

However, if the consumption amount of expendables is detected in advance, since it can be used in a production plan or preparation of production, information associated with the consumption amount may be displayed.

As described above, according to this embodiment, in an image forming system for repetitively printing a basic image, the number of dots forming the basic image is calculated, and the consumption amount of expendables such as recording agents (inks), recording heads, and the like is calculated based on the number of dots. Therefore, a production plan or a calculation of production cost can be easily attained.

[Third Embodiment]

The third embodiment of the present invention will be described hereinafter with reference to the accompanying drawings.

Note that a printing system as a preferred embodiment of the present invention will be described in the following order.

Figure 53:
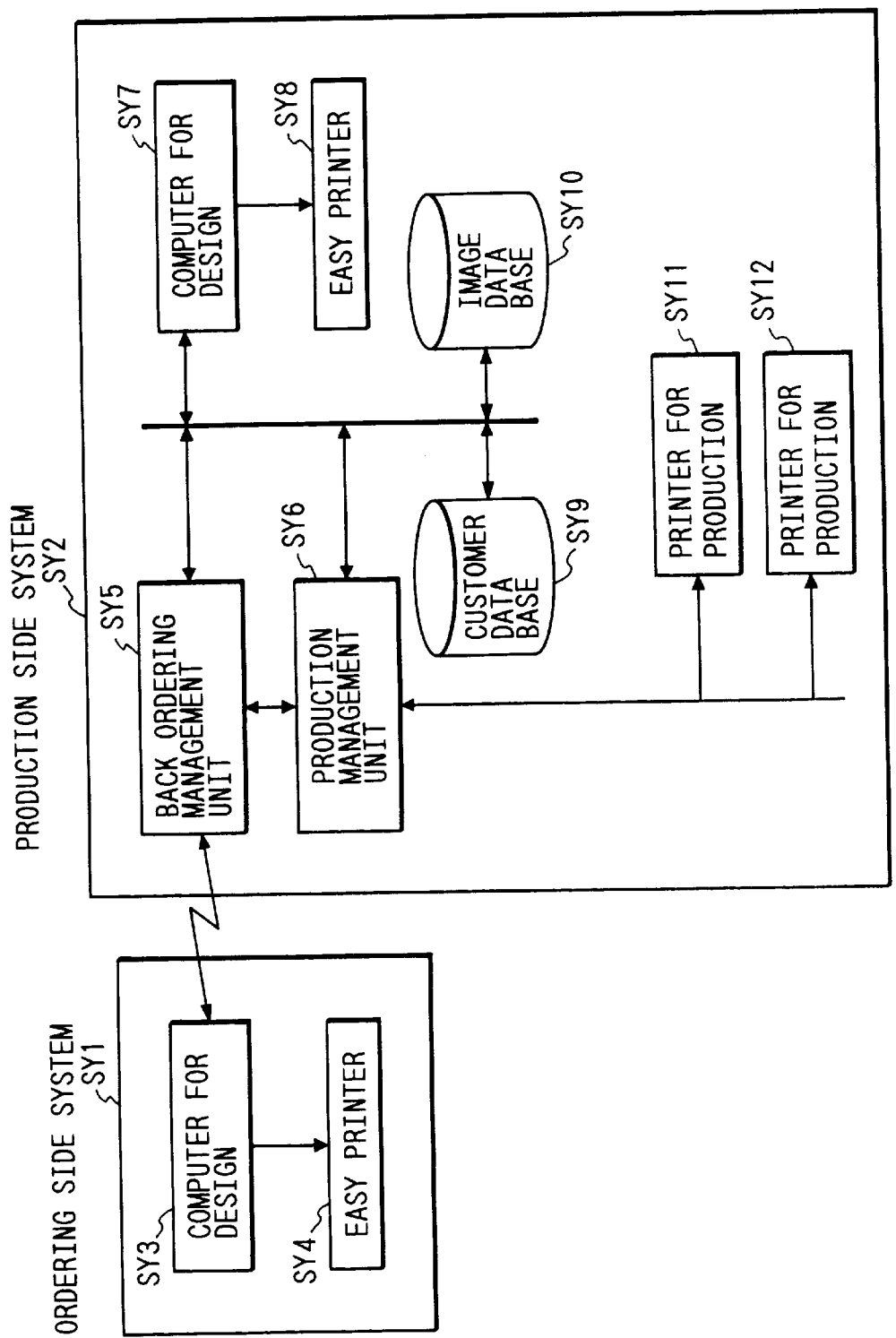
FIG. 53 is a block diagram showing the overall arrangement of a printing system according to the third embodiment of the present invention.

(1) Overall System (FIGS. 53 to 60)
(2) Printer for Production
(3) Modification (1) Overall System FIG. 53 shows the overall arrangement of a printing system according to the third embodiment of the present invention.

A printing system of this embodiment comprises an ordering side system SY1 associated with ordering of printing products, and a back ordering (production) side system SY2 associated with back ordering/production of printing products. The ordering side system SY1 comprises a computer SY3 for design for producing original image data for printing, and transmitting the image data to the production side system SY2 in association with management data, and peripheral devices such as an easy printer SY4 for outputting an image (in addition, an image input device such as an image scanner, a storage device such as a hard disk, and the like may be arranged). The production side system SY2 comprises a back ordering management unit SY5 for performing back ordering management according to orders from the ordering side system SY1, a production management unit SY6 for examining a production plan from an ordering condition, and performing production management on the basis of the accepted production plan, a computer SY7 for design for performing processing such as modification of ordered image data, and the like, an easy printer SY8 as a peripheral device of the computer SY7 for design, a plurality of printers SY11 and SY12 for production (in this case, two printers are arranged, but the number of printers may be appropriately determined) for forming an image on a piece of cloth as a recording medium, a customer data base SY9 for storing ordered information, and an image data base SY10.

Note that the back ordering management unit SY5 and the production management unit SY6 are mainly constituted by a single or separate host computers, and the like. When these units are constituted by microcomputers, they may be incorporated in the printers SY11 and SY12 for production. The easy printers SY4 and SY5 comprise color printers, and the like which use a paper sheet as a recording medium.

Figure 54B:
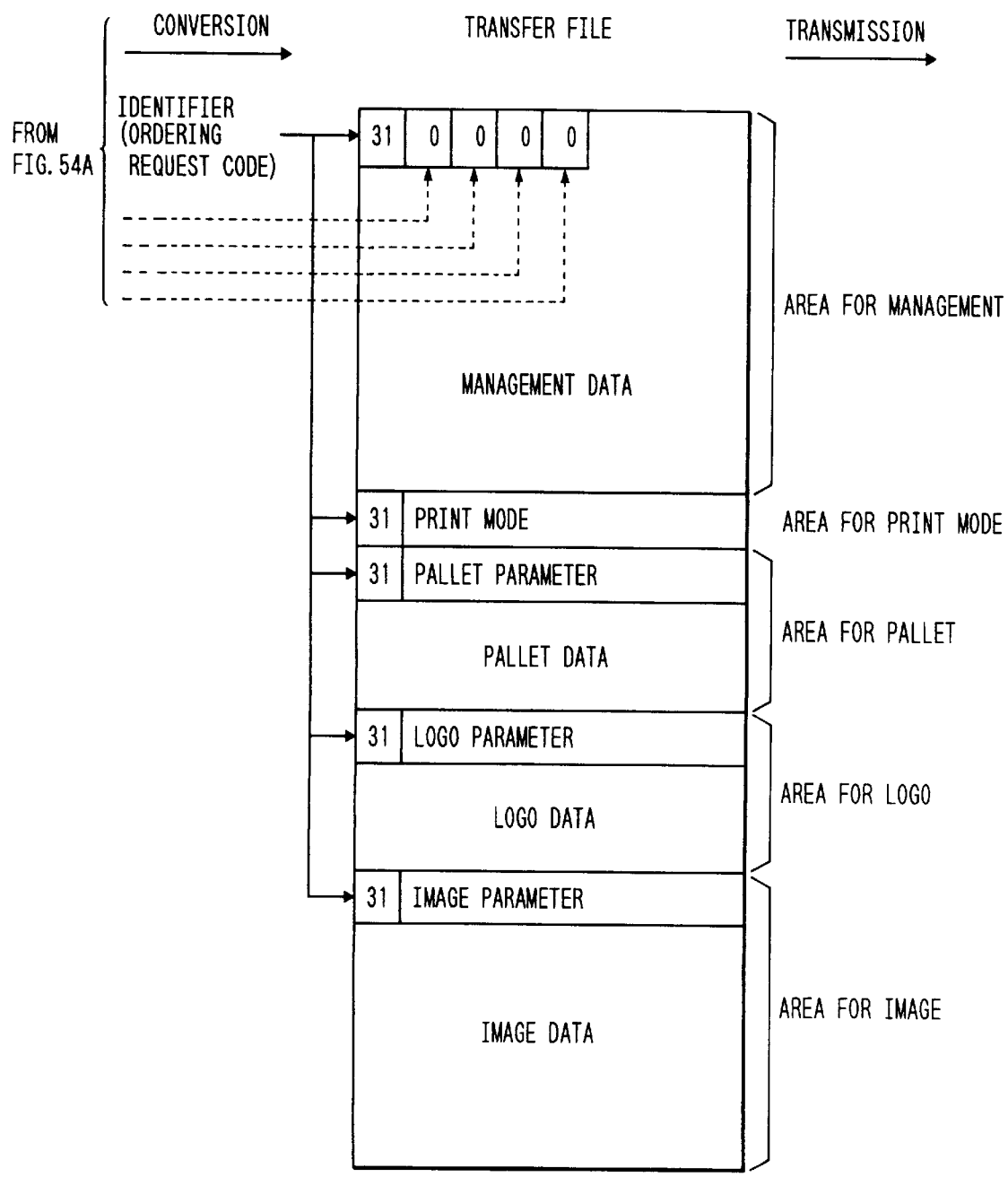
FIG. 54 is comprised of FIGS. 54A and 54B showing explanatory views for an example of an ordering format used in the printing system according to the third embodiment of the present invention.

FIGS. 54A and 54B shows an example of the ordering format of image data to be ordered, management data, and the like used in the system of this embodiment. The ordering format of this embodiment is formed on the computer SY3 for design in the ordering side system SY1, and is transmitted to the production side system SY2.

Figure 55:
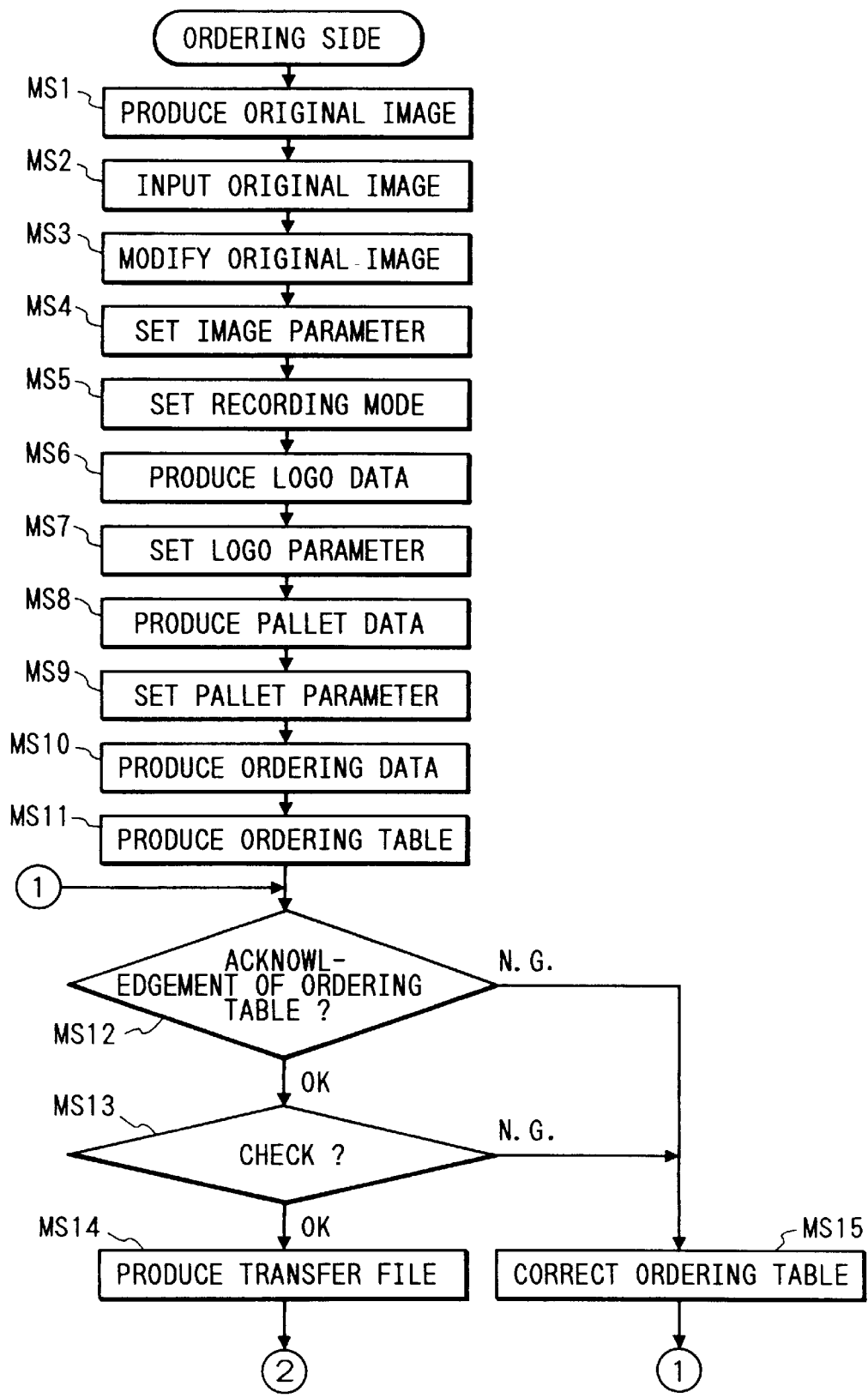
FIGS. 55 and 56 are schematic flow charts showing a processing sequence of the printing system according to the third embodiment of the present invention.
Figure 56:
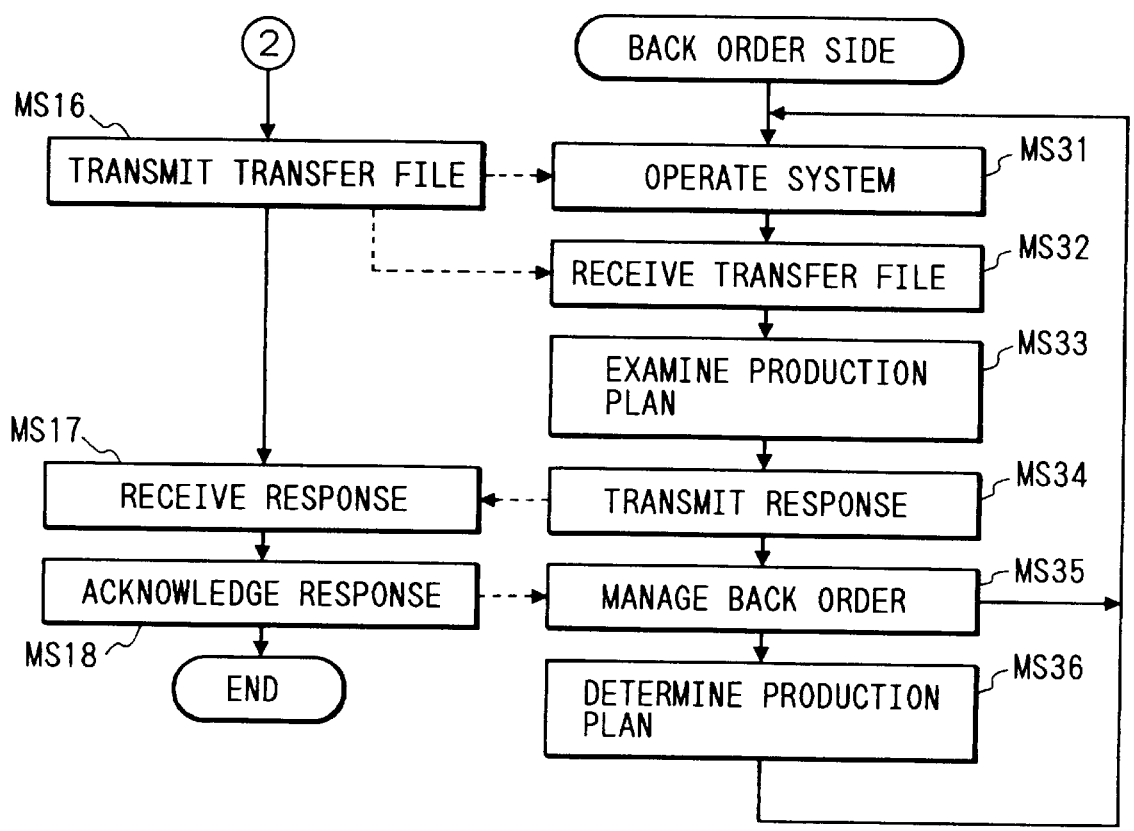

FIGS. 55 and 56 show an example of the processing sequence of this system. The processing contents to be executed in the respective steps, for example, are as follows.

Ordering Side System

The ordering side system SY1 executes processing in the following steps MS1 to MS17.

Original Image Production Step MS1

In this step, a designer produces an original image, i.e., a basic image serving as a basic unit of a repetitive image on a piece of cloth as a recording medium using proper means. Upon production, a designer can use an input means (not shown), a display device such as a color display, and the like of the computer SY3 for design.

Original Image Input Step MS2

In this step, an original image produced in original image production step MS1 is read into the computer SY3 for design using, e.g., scanner as a peripheral device connected to the computer SY3 for design, original image data stored in an external storage device (not shown) of the computer SY3 for design is read, or original image data is received from another system via a communication means (not shown) such as a LAN. As another system, the production side system SY2 may be used.

Original Image Modification Step MS3

The printing system of this embodiments allows selection of various repetitive patterns (types 1 to 5) for a basic image, as shown in FIGS. 57A to 57E. In this case, an unexpected image position shift or discontinuity of color tones may occur at a boundary portion depending on a selected repetitive pattern.

In this step, selection of a repetitive pattern is accepted, and discontinuity at a boundary portion of the repetitive pattern is modified in accordance with the selection.

The modification may be performed by a designer or an operator using an input means such as a mouse with reference to the screen of a display device such as a color display of the computer SY3 for design, or may be automatically performed by image processing of the computer SY3 for design itself.

Figure 57A:
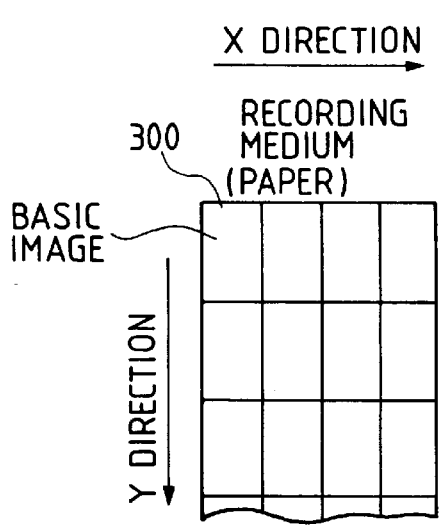
FIGS. 57A to 57E are explanatory views showing examples of the formation pattern of a basic image with respect to a recording medium.
Figure 57B:
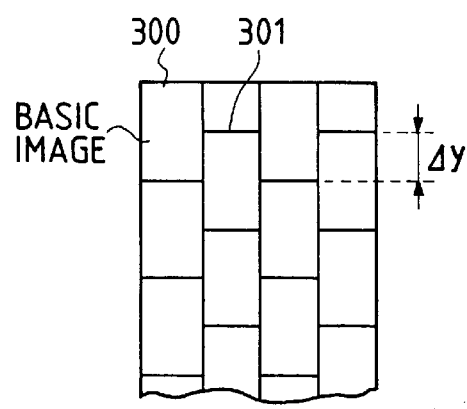
Figure 57C:
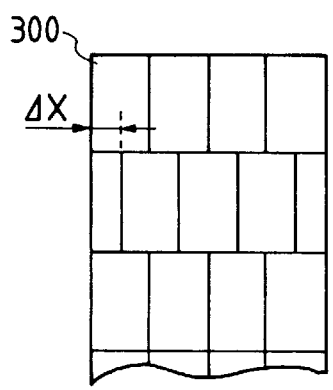
Figure 57D:
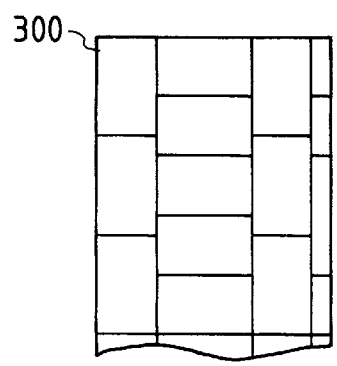
Figure 57E:
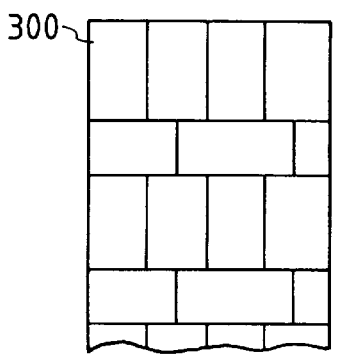

Examples of the repetitive patterns will be described below with reference to FIGS. 57A to 57E. FIG. 57A shows a format (type 1) for periodically repetitively printing out a basic image 300 in the main scanning direction (X direction) and the subscanning direction (Y direction). FIG. 57B shows a format (type 2) for printing out the basic image 300 while shifting the basic image 300 by a predetermined offset amount (shift amount) Δy in the Y direction in every other columns in the X direction upon execution of repetitive print operations of the basic image 300. FIG. 57C shows a format (type 3) for printing the basic image 300 while shifting the basic image 300 by a predetermined offset amount Δx in the X direction in every other rows in the Y directions in substantially the same manner as in type 2 described above. FIG. 57D shows a format (type 4) for rotating the basic image 300 (through 90° in FIG. 57D), and printing out the rotated image while shifting the image by a predetermined offset amount ("0" in FIG. 57D) in the Y direction as in type 2. Finally, FIG. 57E shows a format (type 5) for rotating the basic image 300 (through 90° in FIG. 57E), and printing out the rotated image while shifting the image by a predetermined offset amount ("0" in FIG. 57E) in the X direction as in type 3.

Image Parameter Setting Step MS4

Image parameters are data belonging to the basic image produced in step MS1. In this embodiment, an image size (X pixels×Y pixels) and an image name of the basic image are used as image parameters. In the example shown in Fig.

FIG. 54A, an image size X=1,024 pixels, an image size Y=1,024 pixels, and an image name="flower pattern" are set.

Recording Mode Setting Step MS5

In this step, parameters for determining an image forming mode in each of the printers SY11 and SY12 for production are set. The parameters include a recording speed (designation of high-speed recording/normal recording), a recording time (an ink drive number per dot), an ink number (the number of inks used in recording), an ink type (colors and compositions of inks are designated), a print arrangement (a repetitive pattern, an offset amount, and rotation angle of a basic image shown in FIGS. 57A to 57E are designated), a magnification (a magnification in a print operation with respect to a basic image; e.g., 100%, 200%, 400%, or the like), the presence/absence of a logo (the presence/absence of a logo mark of, e.g., a designer, manufacturer's brand, or the like to be printed on a side edge portion of a roll of cloth is designated), and the like, and are set, as shown in the example in FIGS. 54A and 54B.

Logo Data Production Step MS6

A designed logo mark is converted into a format (e.g., dot data corresponding to the resolution) and a size matching with the printers SY11 and SY12 for production.

Logo Parameter Setting Step MS7

Logo parameters are data belonging to the logo data, and the name, position (L0, L1), size (X0, Y0), color, and the like of the logo data are designated.

Figure 58:
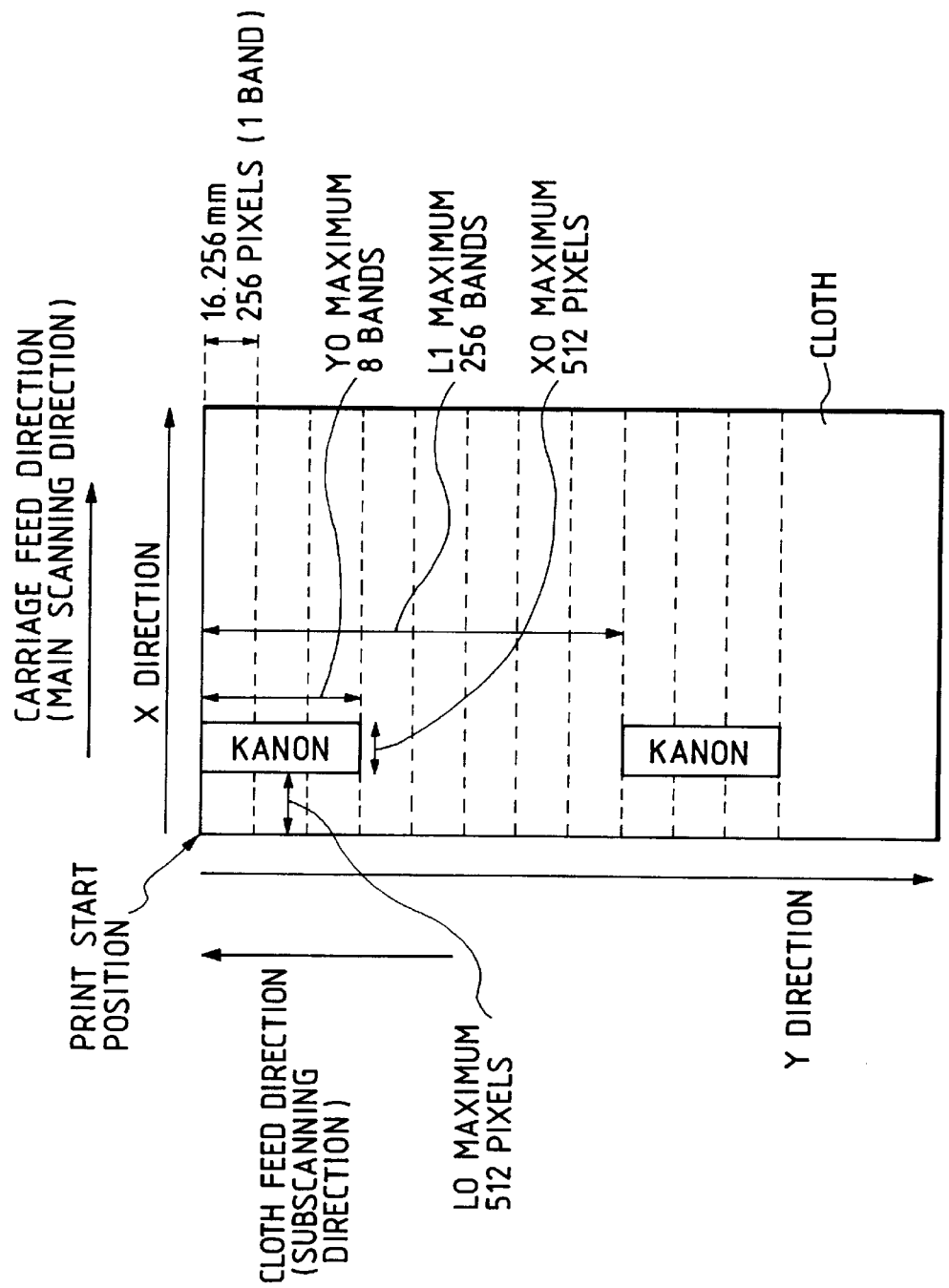
FIG. 58 is an explanatory view showing a correspondence between data associated with a logo and a logo print format.

FIG. 58 shows the relationship between the position (L0, L1) and the size (X0, Y0). In this embodiment, as for the size, the size X0 in the main scanning direction (X direction) of a print operation can be designated up to a maximum of 512 pixels in units of pixels, and the size Y0 in the subscanning direction (Y direction) can be designated up to a maximum of eight bands in units of main scanning recording widths (to be referred to as bands hereinafter) of the recording head. As for the position, the position L0 in the X direction can be designated up to a maximum of 512 pixels in units of pixels, and the position L1 in the Y direction can be designated up to a maximum of 256 bands in units of bands. Note that L1 represents the repetition interval between logos in the Y direction.

Pallet Data Production Step MS8

In design, a designer produces an original image while selecting colors from a standard color patch. Reproducibility of colors upon print with respect to the selected colors largely influences productivity of the printing system. Thus, in this step, data for determining a mix ratio of the respective colors is produced so as to satisfactorily reproduce selected standard colors. Pallet data is data obtained by converting the above-mentioned selected standard color into a code, and the relationship between the above-mentioned selected pallet data and the mix ratio can be expressed in the form of tables shown in FIGS. 5 to 8, which have been described in the first embodiment. Note that ink colors basically include yellow (Y), magenta (M), cyan (C), and black (BK). In addition to these colors, special colors (to be referred to as characteristics hereinafter) including metallic colors such as gold, silver, and the like; clear red (R), green (G), and blue (B); and the like are often used. The characteristics are represented by S1 to S4 in FIGS. 5 to 8.

The production sequence of pallet data will be described in detail later.

Pallet Parameter Setting Step MS9

Pallet parameters are information belonging to pallet data, and include a name of pallet data ("flower pattern 1" in FIG. 54A), type ("0F" in FIG. 54A), and the like. The type indicates which ink system colors of cyan (C), magenta (M), yellow (Y), black (BK), and characteristics S1 to S4 are used in pallet data, and 8-bit (the least significant bit to the most significant bit correspond to above-mentioned order of colors) data (in FIGS. 54A and 54B, "00001111" from the most significant bit since C, M, Y, and BK are used) is expressed in hexadecimal notation ("0F").

Ordering Data Setting Step MS10

Ordering data are information representing, e.g., a condition necessary for a business transaction upon request of production from the ordering side to the production side, and items of ordering data include a purchaser, date of order, desired delivery date, output (the number of rolls of cloth), unit length (the length per roll), cloth width, cloth type (cotton, nylon, or the like), and the like. In particular, information required in a production plan in the production side system SY2 is important.

Ordering Table Production Step MS11

The above-mentioned steps can be divided into a plurality of processing groups (for example, steps MS1 to MS4 as group 1, step MS5 as group 2, steps MS6 and MS7 as group 3, steps MS8 and MS9 as group 4, and step MS10 as group 5). Processing operations in each group have a strong relationship, but processing operations of the groups are often independently and parallelly executed. For this reason, in this step, a table (ordering table) with which an operator or the like can visually recognize linkage of processing operations among the groups is produced. In the production method of the ordering table, an ordering table format is displayed on a display (e.g., a CRT; not shown) of the computer SY3 for design, and an operator or the like inputs the above-mentioned items using an input device such as a keyboard or a mouse (neither are shown).

Of these items, logo data, pallet data, and the file name of image data are items to be managed on the ordering side, and are not transmitted to the production side. However, names of the respective data often normally coincide with file names.

Ordering Table Acknowledgement Step MS12 and Ordering Table Correction Step MS15

After all the items of the ordering table are input, an operator or the like acknowledges the input items on the display. If OK is determined in step MS12, the flow advances to step MS13; if N.G. is determined in step MS12, the flow advances to step MS15, and an operator or the like corrects the items of the ordering table.

Ordering Table Automatic Check Step MS13

It is checked if the input contents of the ordering table include contradictions. If a contradiction is found (if N.G. in step MS13), a contradictory item is displayed in a form which can be readily recognized by an operator, and the flow returns to step SM12. If OK in step MS13, the flow advances to step MS14.

Transfer File Production Step MS14

In this step, information to be transmitted to the production side system SY2 is converted into a transfer file on the basis of information in the ordering table. In particular, it is important that the transfer file be divided into a plurality of areas (in FIG. 54B, an area for management, an area for print mode, an area for pallet, an area for logo, and an area for image), and an identifier is added to specific positions (at the head of each area in FIG. 54B) of the respective areas to relate the respective areas with each other. This identifier (reference numeral "31" in FIG. 54B) is used in both the ordering and production sides to identify this ordering request (the identifier will be referred to as an ordering request code hereinafter). The identifier of the area for management includes identifiers representing ordering codes of a print mode, logo, pallet, and image in addition to the identifier representing the ordering request code, and the values of these identifiers are set to be the same value "0" since a management NO. is "0" which indicates a new order.

The content of the transfer file includes a coded portion obtained by coding display data of the respective items of the ordering table, so that the production side system SY2 can automatically recognize the data. For example, a purchaser: "KANON" is used as a purchaser code, and the production side system SY2 performs customer management using the purchaser code and the order request code (it is used as an ordering code after a request is settled). Since there are a large number of types of inks, inks are managed by coding them using ink colors, compositions, and the like.

The transfer file shown in FIG. 54B includes data in the entire area. However, the present invention is not limited to this. Since pallet data, logo data, and image data have large data volumes, it is inefficient to include these data in both an original file and a transfer file. For this reason, only file names may be stored in the transfer file, and upon transmission of the transfer file (step MS16), data may be read out from the original file with reference to the file names stored in the transfer file.

When the previous order is requested again (repeated) to the production side system SY2 (when the ordering codes of a print mode, logo, pallet, and image in the items of the ordering table have the same value (previous ordering code) other than "0" (new)), only information in the area for management is converted into a transfer file. In this case, an identifier representing the ordering request code in the identifiers of the area for management has a new value (obtained by incrementing the value of the immediately preceding ordering code by "1"), and the identifiers representing the ordering codes of a print mode, logo, pallet, and image have the values of the previous ordering codes.

A print mode, logo, pallet, and image, which were previously ordered to the production side system SY2, may be used in combination, or new data may be partially used.

Transfer File Transmission Step MS16

When the transfer file is produced, the ordering side system SY1 takes an action of an ordering request. When the production side system SY2 accepts the action of the ordering request, the ordering side system SY1 sequentially transmits the transfer file to the production side system SY2. A transmission path in this case may comprise an arbitrary one. For example, a LAN (local area network), an Ethernet (XEROX Corp.), a public telephone network, an ISDN, and the like may be used, and a communication protocol can be selected in correspondence with the transmission path to be used.

Response Reception Step MS17

In this step, a response from the production side system SY2 to the ordering request from the ordering side system SY1 is received. The response is transmitted while being added with the ordering request code for each ordering request, and its particularly important contents are cost, desired delivery date, and the like.

Response Acknowledgement Step MS18

It is checked if the response from the production side system SY2 satisfies the ordering side. If the response is satisfactory, a formal order is made to the production side system SY2. However, if the response is not satisfactory, a response for canceling the ordering request or an ordering change request of the ordering request content is issued to the production side system SY2.

It is important that the response for canceling the ordering request be issued while being added with an ordering request code for each ordering request.

When the ordering content is to be changed, the flow returns to step MS14 to correct the content, and an ordering request is issued with the same ordering request code. Also, after the ordering request is canceled, a new order may be made.

Production Side System

The production side system SY2 executes processing in the following steps MS31 to MS37.

System Operation Step MS31

In the production side system SY2, the printers SY11 and SY12 for production are executing a print operation according to an instruction from the production management unit SY6, and the back ordering management unit SYS is in a reception standby state of various communications (an ordering request, a formal ordering request/request for canceling an ordering request, an ordering change request, and the like) from the ordering side system SY1, and various communications (a test print request, an image design end message, and the like) from the computer SY7 for design in the production side system SY2.

When the ordering side system SY1 takes an action of an ordering request, the control of the back ordering management unit SY5 advances to transfer file reception step MS32, and the control of the production management unit SY6 and the printers SY11 and SY12 for production remains the same since they are in operation (e.g., a print operation).

Transfer File Reception Step MS32

In this step, the back ordering management unit SY5 sequentially receives the transfer file of the ordering request, and temporarily registers the content of the received transfer file in the customer data base SY9 and the image data base SY10. Of the transfer file, data in the area for management and data in the area for print mode are registered in the customer data base SY9 using the purchaser code and the ordering request code as search keys of the data base, and data in the areas for logo, pallet, and image are registered in the image data base SY10 using the purchaser code and the ordering request code as search keys of the data base.

Production Plan Examination Step MS33

The back ordering management unit SY5 calculates a time required for a print operation of the ordering request on the basis of management data and print mode data in the received transfer file, inquires a schedule such as a startable date and time of the print operation of the ordering request, an idle time, and the like to the production management unit SY6, and calculates a delivery date. On the other hand, the production management unit SY6 periodically acquires, from the printers SY11 and SY12 for production, the progress states of a plurality of settled schedules from the back ordering management unit SY5, and changes a production schedule.

The back ordering management unit SY5 calculates material cost from the amounts and types of inks to be used, the quantity and type of cloth, packing members, and the like, and estimates cost added with miscellaneous cost and benefits.

In this step, when data in the previous order are to be used, required data are searched from the customer data base SY9 and the image data base SY10 on the basis of the purchaser code and the ordering codes of the respective data (using them as data base search keys).

Response Transmission Step MS34

In this step, response data (in this case, particularly, a delivery data and estimated cost) calculated by the back ordering management unit SY5 are sequentially transmitted to the ordering side system SY1.

Back Ordering Management Step MS35

In this step, upon reception of response acknowledgement (formal order/request for cancelling an ordering request/request for changing an ordering request, and the like) from the ordering side system SY1 with respect to the response from the back ordering management unit SY5, the back ordering management unit SY5 takes an action.

When a formal order is received, the back ordering management unit SY5 searches a corresponding ordering request from ordering requests, temporarily registered in the customer data base SY9 in step MS32, on the basis of the purchaser code and the ordering request code of the response acknowledgement, changes the content of the customer data base SY9 to set the ordering request in an acceptance state, and informs a production schedule of this ordering request to the production management unit SY6.

When a request for cancelling the ordering request is received, the back ordering management unit SY5 deletes the corresponding ordering request from ordering requests, temporarily registered in the customer data base SY9 in step MS32, on the basis of the purchaser code and the ordering request code of the response acknowledgement, and also deletes data temporarily registered In the image data base SY10. Then, the flow returns to step MS31.

When a request for changing the ordering request is received, the flow returns to step MS32, and the back ordering management unit SY5 similarly receives a new transfer file. Then, the unit SY5 updates the ordering request temporarily registered in the customer data base SY9 and the image data base SY10, and executes the same steps as described above.

Production Plan Determination Step MS36

This step is executed when a formal order is received. A production plan is determined by the production management unit SY6 by adding a production request (order) informed from the back ordering management unit SY5. The flow returns to step MS31, and a print operation is executed according to the production plan.

More specifically, upon reception of a print end message from the printer SY11 or SY12 for production, the production management unit SY6 discriminates the next order (in particular, a purchaser code and ordering codes) to be printed from the production plan, searches management data, print mode data, logo data, pallet data, and image data corresponding to the order (in particular, a purchaser code and ordering codes) from the customer data base SY9 and the image data base SY10, and transfers these data to the printer (SY11, SY12) for production, which has completed the print operation. The printer (SY11, SY12) for production, which received a new print request, sets the apparatus state in accordance with the print mode, i.e., sets inks, cloth, and the like, and forms an image (the details will be described in the paragraph of "(2) Printer for Production" later). During this print operation, the printer SY11 or SY12 for production sends back information associated with the progress state of the print operation in response to a state acquisition command from the production management unit SY6. The printer SY11 or SY12 for production prints management data, in particular, a purchaser code and ordering codes for each certain print unit (e.g., a roll of cloth).

Figure 59:
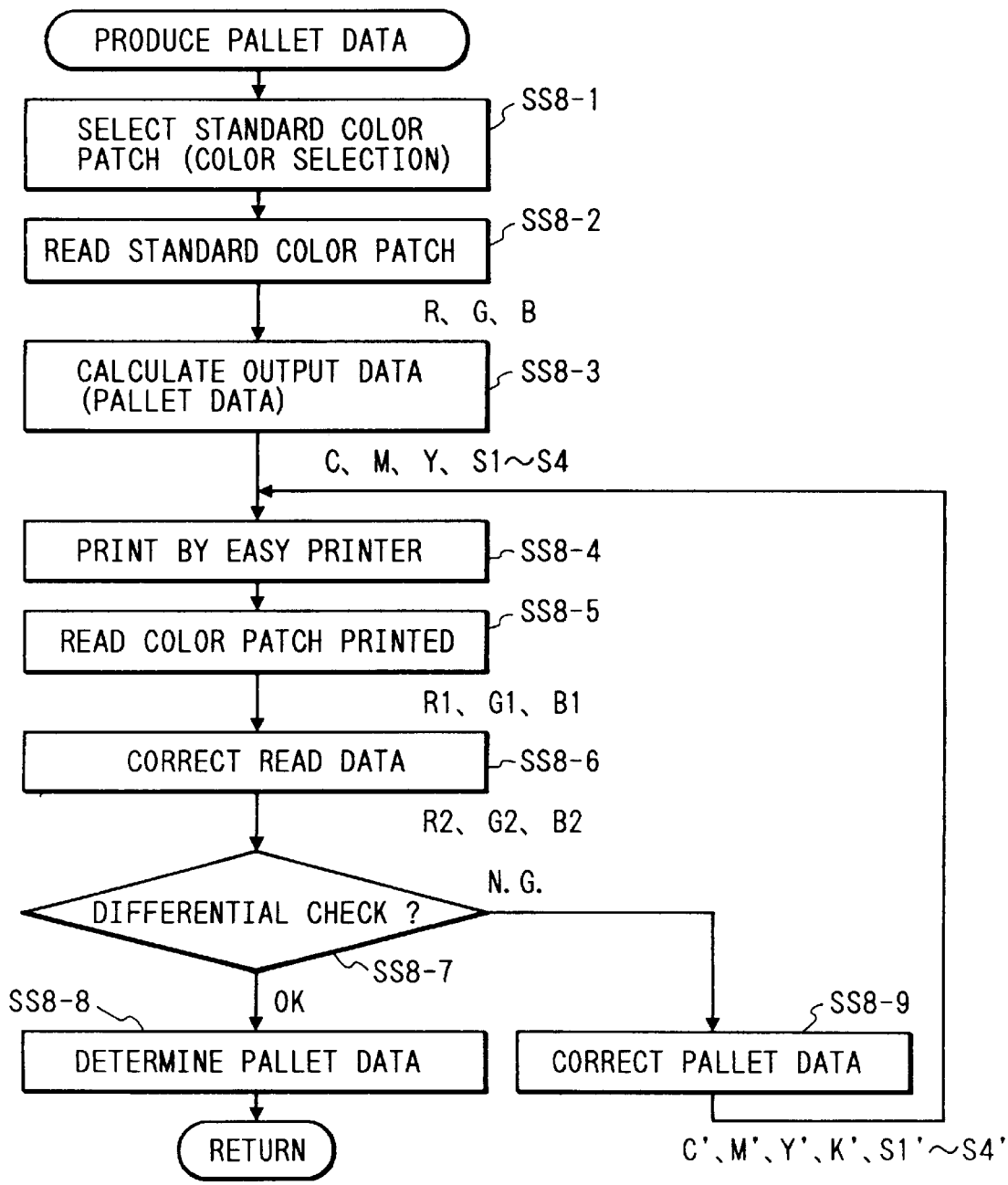
FIGS. 59 and 60 are flow charts showing examples of a color pallet data production sequence.

FIG. 59 shows an example of the detailed processing sequence in color pallet data production step MS8 in FIG. 55.

In this sequence, in step SS8-1, a designer selects a standard color patch of a color, and in step SS8-2, color data (R, G, B) are read from the standard color patch using a scanner (not shown). In step SS8-3, pallet data, which is set to match with the printer SY11 or SY12 for production, is calculated on the basis of a code corresponding to the standard color patch. In step SS8-4, the calculated pallet data is printed by the easy printer SY4 in the form of a plurality of color patches.

In step SS8-5, the printed color patches are read by a scanner. In step SS8-6, the read color data (R1, G1, B1) are corrected and converted into color data (R2, G2, B2) to be obtained when the pallet data is printed by the printer SY11 or SY12 for production. If it is determined in step SS8-7 that the difference between the two sets of color data (R, G, B) and (R2, G2, B2) is smaller than a predetermined value, OK is determined, and the flow advances to step SS8-8 to adopt the calculated pallet data for the code of the selected color. However, if the difference is equal to or larger than the predetermined value, N.G. is determined, and the flow advances to step SS8-9 to correct the pallet data based on the difference. The flow then returns to step SS8-4, and the above-mentioned sequence is repeated.

In the above description, the number of selected color patches is 1 for the sake of simplicity. However, when the print positions are determined in correspondence with color patches, the above-mentioned processing can be simultaneously performed for a plurality of selected color patches.

According to this embodiment, even if the ordering side system does not include the printers SY11 and SY12 for production, a combination of a plurality of inks corresponding to a code of a color selected by a designer can be properly selected from the code of the color using the easy printer SY4.

Figure 60:
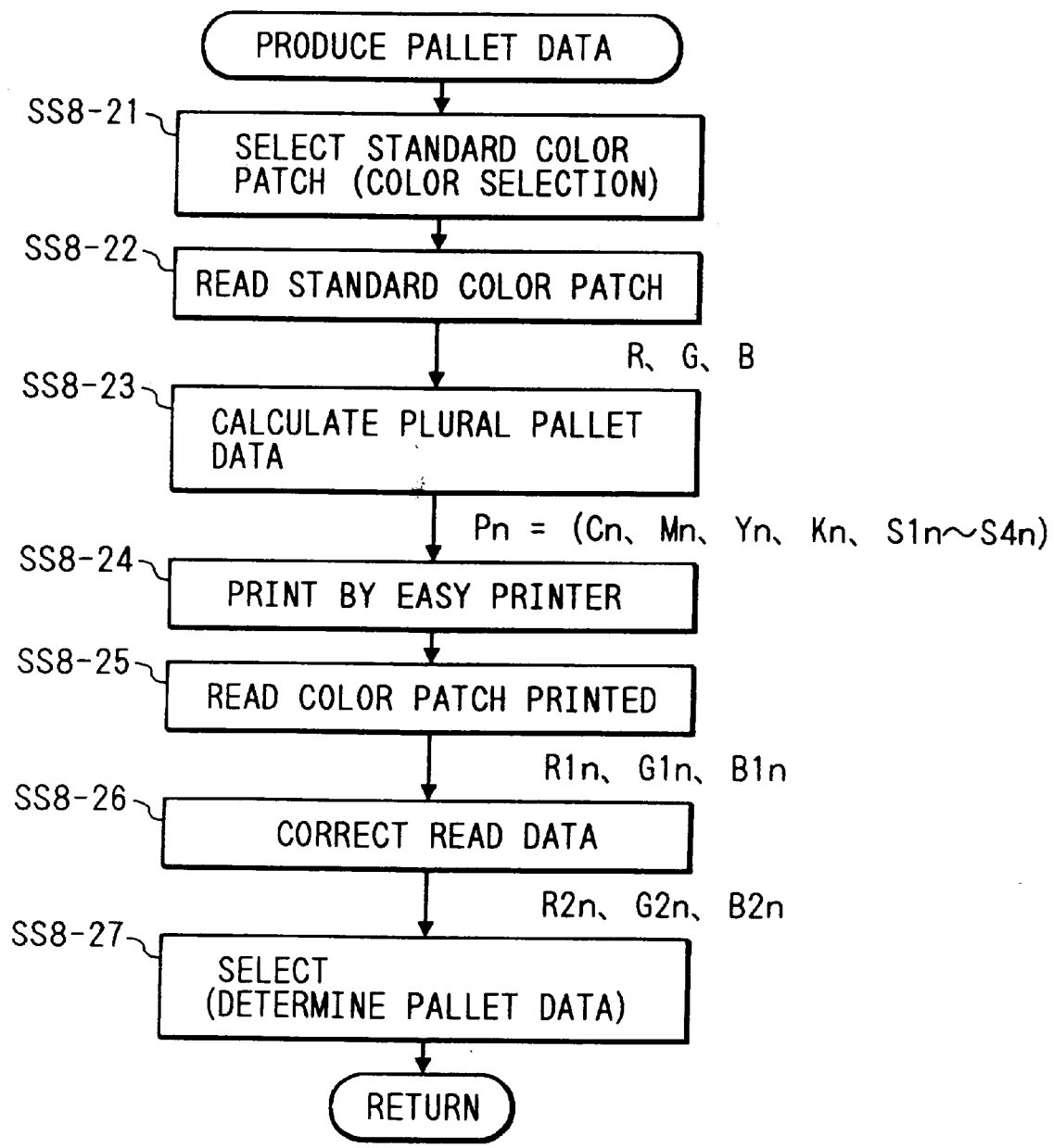

FIG. 60 shows another example of the detailed processing sequence of the color pallet data production step.

In this sequence as well, in steps SS8-21 and SS8-22 which are the same as steps SS8-1 and SS8-2, a designer selects a standard color patch of a color, and the selected standard color patch is read by a scanner to obtain color data (R, G, B). Then, in this sequence, a plurality of different color pallet data $Pn = (Cn, Mn, Yn, Kn, S1n$ to $S4n)$ are prepared in steps SS8-23, and are printed by the easy printer SY4 in step SS8-24. In step SS8-25, color data (R1n, G1n, B1n) are read using a scanner from the plurality of printed color patches. In step SS8-26, the read color data (R1n, G1n, B1n) are corrected and converted into color data (R2n, G2n, B2n) to be obtained when the corresponding pallet data are printed by the printer SY11 or SY12 for production. In step SS8-27, color data closest to (R, G, B) (i.e., having the highest color reproducibility) are selected from the color data (R2n, G2n, B2n), and pallet data which outputs the selected color patch is determined to be one for the selected color.

Note that a plurality of color pallet data prepared in step SS8-23 may consist of data obtained by changing the ink mix amount by a predetermined amount for all color recording heads, or may consist of data obtained by slightly changing the ink mix amount in a predetermined range centering around the data obtained in step SS8-22. In this sequence, since the processing steps of performing correction and re-print can be omitted, color pallet conversion data production processing can be executed at higher speed than in the sequence shown in FIG. 59.

A method of correcting the difference between the output characteristics of the easy printer SY4 and the printer SY11 or SY12 for production is not limited to a method of correcting color data obtained by reading output color patches, and other methods are available. For example, the output characteristics of the easy printer SY4 may be set in advance to be close to those of the printer SY11 or SY12 for production. In this case, it is strongly preferable that the easy printer SY4 comprise a high-quality correction mechanism. In another method, when pallet data calculated in step SS8-3 or SS8-23 is input to the easy printer, the pallet data may be corrected in a software manner.

The difference between the output characteristics of the easy printer SY4 and the printer SY11 or SY12 for production includes a difference in recording medium, a difference in ink, and the like. It is strongly preferable that correction contents be prepared in correspondence with such a difference in recording medium, a difference in ink, and the like. Therefore, since the printer SY11 or SY12 for production has a considerable degree of freedom upon selection of the type of cloth as a recording medium and colors/ compositions of inks, correction is facilitated when a paper sheet as a recording medium of the easy printer SY4, and inks are limited to some extent.

(2) Printer for Production

As the printer SY11 or SY12 for production of this embodiment, either of a printer described as the first embodiment, a printer described as the second embodiment, or a printer as a combination of these printers can be used. Therefore, a difference from the descriptions of the first and second embodiments will be described below.

The printer of the first or second embodiment is connected to the host computer H (FIG. 1). However, the printer SY11 or SY12 of this embodiment is connected to the production management unit SY6 described above with reference to FIG. 53. Therefore, the printer SY11 or SY12 receives information, which is received by the printer from the host computer in the first or second embodiment, from the production management unit SY6.

As described above, the printer SY11 or SY12 for production performs image formation on the basis of a content set by the production management unit SY6. In this case, the production management unit SY6 may supply required data to the printer SY11 or SY12 for production, so that a purchaser code and ordering codes are printed on a proper portion, which can be readily visually observed on a production line, e.g., on the trailing end portion of a roll of cloth. Thus, these printed data can be conveniently used in management of products.

(3) Modification

In the embodiment described above, the ordering side system SY1 performs modification and coding of an image, and production of pallet data. However, this embodiment is not limited to this.

For example, the ordering side system SY1 may perform only an input operation of an original image, and an ordering table and a transfer file added with an operation state such as a processing level of an image may be transmitted to the production side system SY2. Thus, the operation performed by the ordering side system SY1 in the above-mentioned embodiment may be performed by the computer SY7 for design and the easy printer SY8 in the production side system SY2. In this case, this operation can be taken into consideration in a calculation of a delivery date and estimation of cost.

As described above, according to this embodiment, image data from an image supply apparatus can be received even when an image output apparatus is executing a print operation.

Since image data and management data are transmitted, received, stored, and printed in association with each other, a person who requested a printed image can be easily identified.

Since the schedule of the image output apparatus is managed by easily calculating a required time from management data (including a print mode), end time of the requested print operation can be estimated.

Since image data and management data are transmitted, received, stored, and printed in association with each other, customer management and image management are facilitated, and a re-output request and a change request of an image can be easily issued. In particular, when the same image is used, since transmission of image data can be omitted, the transfer time, communication cost, and the like can be reduced.

Since data supplied from the image supply apparatus are coded, processes in the image supply apparatus and the image output apparatus can be integrally managed. In particular, when inks and a recording medium (cloth) are coded in units of types, a cost calculation and management of print processes are facilitated.

Since the easy printer is corrected in correspondence with the printer for production, even when the image supply apparatus is located in a remote place far from the printer for production, colors and the like can be confirmed by connecting the easy printer to the image supply apparatus.

Modifications for First to Third Embodiments

Note that the image output apparatus (printer) according to each of the first to third embodiments can adopt not only ink-jet recording systems but also various other recording systems. When the ink-jet recording systems are adopted, the image output apparatus according to each of the first to third embodiments brings about excellent effects particularly in a recording head and a recording device of a system, which comprises means (e.g., an electrothermal converting element, laser light, and the like) for generating heat energy as energy utilized upon execution of ink discharge, and causes a change in state of an ink by the heat energy, among the ink-jet recording systems. According to this system, a high-density and high-definition recording operation can be attained.

As to its representative construction and principle, for example, one practiced by use of the basic principle disclosed in, for instance, U.S. Pat. Nos. 4,723,129 and 4,740, 796 is preferred. The above system is applicable to either one of the so-called on-demand type and the continuous type. Particularly, the case of the on-demand type is effective because, by applying at least one driving signal which gives rapid temperature elevation exceeding nucleus boiling corresponding to the recording information on electrothermal converting elements arranged in correspondence with the sheet or liquid channels holding liquid (ink), heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge opening by growth and shrinkage of the bubble, at least one droplet is formed. By making the driving signals into pulse shapes, growth and shrinkage of the bubble can be effected instantly and adequately to more preferably accomplish discharge of the liquid (ink) particularly excellent in response characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharge opening, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in Japanese Laid-Open Patent Application No. 59-123670 which discloses the construction using a slit common to a plurality of electrothermal converting elements as a discharge portion of the electrothermal converting element or Japanese Laid-Open Patent Application No. 59-138461 which discloses the construction having the opening for absorbing a pressure wave of heat energy in correspondence with the discharge portion. More specifically, according to the present invention, recording can be reliably performed with high efficiency regardless of constructions of recording heads.

Furthermore, the present invention can be effectively applied to a full-line type recording head having a length corresponding to the maximum width of a recording medium, which can be used in recording of a recording apparatus. Such a recording head may have an arrangement which satisfies the length by combining a plurality of recording heads, or an arrangement as a single recording head which is formed integrally.

The types and number of recording heads to be mounted are not particularly limited. For example, a plurality of heads may be arranged in correspondence with single-color inks or in correspondence with a plurality of inks which have different recording colors and densities. More specifically, the present invention is very effective for an apparatus which has, as a recording mode, not only a recording mode of primary colors such as black but also at least one of a multi-color recording mode using different colors and a full-color recording mode by mixing colors although a recording head may be constituted either by integrally or by combining a plurality of heads.

In addition, of the above serial type recording heads, the present invention is effective for a recording head fixed to an apparatus main body, a recording head of the freely exchangeable chip type which enables electrical connection to the apparatus main body or supply of ink from the apparatus main body by being mounted onto the apparatus main body, or for the case by use of a recording head of the cartridge type, which has an ink tank provided integratedly on the recording head itself.

It is also preferable to add a discharge recovery means for the recording head, preliminary auxiliary means, and the like provided as a construction of the recording apparatus of the invention because the effect of the present invention can be further stabilized. Specific examples of them may include, for the recording head, capping means, cleaning means, pressurization or suction means, preliminary heating means for performing heating using electrothermal converting elements, another heating element, or a combination thereof, and a preliminary discharge means which executes discharge separately from recording.

Moreover, in the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range from 30° C. to 70° C. in an ink-jet system so that the ink viscosity can fall within a stable discharge range. In addition, in order to positively prevent a temperature rise caused by heat energy by utilizing it as energy for a change in state from a solid state to a liquid state of the ink, or to prevent evaporation of the ink, an ink which is solidified in a non-use state and is liquefied by heating may be used. In any case, the present invention can be applied to a case wherein an ink which can be liquefied only by applying heat energy, such as an ink which is liquefied upon application of heat energy according to a recording signal and is discharged in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

In addition, the ink-jet recording apparatus of the present invention may be used as an image output terminal of an information processing equipment such as a computer, or a copying machine combined with a reader, or the like, or a facsimile apparatus having transmission/reception functions.

A piece of cloth for ink-jet printing is required to satisfy the following performance requirements:

(1) it can develop an ink to a sufficient density;

(2) it has a high degree of exhaustion of an ink;

(3) it allows quick drying of an ink;

(4) it suffers less generation of irregular ink blurring thereon; and (5) it has good portability in an apparatus.

In order to satisfy these performance requirements, according to the present invention, a pre-treatment may be performed for a piece of cloth, as needed. For example, Japanese Laid-Open Patent Application No. 62-53492 discloses various types of cloth which have an ink reception layer, and Japanese Patent Publication No. 3-46589 discloses a type of cloth which contains an anti-reduction agent or an alkaline material. An example of such a pre-treatment includes a treatment for adding, in a piece of cloth, a material selected from the group consisting of alkaline materials, water-soluble polymers, synthetic polymers, water-soluble metal salts, urea, and thiourea.

Examples of the alkaline materials include alkali metal hydroxides such as sodium hydroxide, potassium hydroxide, and the like; amines such as monoethanolamine, diethanolamine, triethanolamine, and the like; carbonic acids or bicarbonic acid alkali metal salts such as sodium carbonate, potassium carbonate, sodium bicarbonate, and the like; and the like. Other examples include organic acid metal salts such as calcium acetate, barium acetate, and the like, ammonia, ammonium compounds, and the like. Furthermore, trichloro sodium acetate, or the like, which is converted into an alkaline material under steaming or drying heat, can be used. Examples of a particularly preferable alkaline material include sodium carbonate and sodium bicarbonate which are used in dyeing of reactive dyestuffs.

Examples of the water-soluble polymers include natural water-soluble polymers including: starch material such as corn, wheat, and the like; cellulose-based materials such as carboxymethylcellulose, methylcellulose, hydroxyethylcellulose, and the like; polysaccharides such as sodium alginate, gum arabic, locust bean gum, tragacanth gum, guar gum, tamarind seed, and the like; protein materials such as gelatine, casein, and the like; tannin-based materials; lignin-based materials; and the like.

Examples of the synthetic polymers include polyvinyl alcohol-based compounds, polyethylene oxide-based compounds, acrylic acid-based water-soluble polymers, maleic anhydride-based polymers, and the like. Of these materials, polysaccharide-based polymers and cellulose-based polymers are preferable.

Examples of the water-soluble metal salts include compounds such as halides of alkali metals, alkali-earth metals, and the like, which form typical ionic crystals, and have a pH of 4 to 10. Typical examples of such compounds include NaCl, $Na_2SO_4$, KCl, $CH_3COONa$, and the like for the alkali metals, and $CaCl_2$, $MgCl_2$, and the like for the alkali-earth metals. Of these materials, salts of Na, K, and Ca are preferable.

A method of adding the above-mentioned materials in a piece of cloth is not particularly limited, and may be realized by a dip method, a vat method, a coating method, a spray method, and the like, which are normally adopted.

Furthermore, since a printing ink applied to a piece of cloth for ink-jet printing merely becomes attached to the surface of a piece of cloth immediately after the ink is applied to the cloth, it is preferable to subsequently execute a reactive fixing process (exhaustion process) of a dyestuff to fibers. Such a reactive fixing process can be realized by conventional methods including: a steaming method, an HT steaming method, a thermofix method, and the like, and if a piece of cloth, which is subjected to an alkali treatment in advance, is not used, an alkali vat steam method, an alkali blotch steam method, an alkali shock method, an alkali cold method, and the like.

Furthermore, removal of non-reacting dyestuffs and removal of materials used in the pre-treatment can be attained by washing according to a conventional method after the reactive fixing process. In this case, it is preferable that a conventional fixing treatment be performed simultaneously with the washing.

The present invention is not limited to the above-mentioned embodiments, and various changes and modifications may be made within the scope of claims.

What is claimed is:

1. An information processing apparatus applied to an image forming system utilizing an expendable in recording, said apparatus comprising:

means for receiving image data corresponding to a predetermined image, the predetermined image being an image to be repeatedly recorded in a recording process on a single recording medium to form an image;

means for obtaining a number of dots forming the predetermined image on the basis of the received image data;

recording control means for repeatedly recording the predetermined image on the single recording medium based on the received image data, the expendable being consumed in the recording process; and means for estimating a consumption amount of the expendable to be consumed during recording of the image by said recording control means in the recording process, wherein said estimating means (1) estimates a partial consumption amount of the expendable corresponding to the predetermined image by multiplying the obtained number of dots for forming the predetermined image by an ink amount per dot and (2) estimates the consumption amount of the expendable by multiplying the estimated partial consumption amount by a number of repetitions of said recording control means to form the image on the single recording medium.

2. An apparatus according to claim 1, further comprising means for performing a cost calculation of image recording on the basis of the consumption amount.

3. An apparatus according to claim 1, wherein the expendable is a recording agent and/or a recording head.

4. An apparatus according to claim 1, further comprising an image output apparatus, having a recording head, for recording an image on a recording medium using a recording agent.

5. An apparatus according to claim 4, further comprising at least one additional recording head, each of said recording heads being arranged in correspondence with recording agents having different color tones.

6. An apparatus according to claim 4, wherein said recording head comprises an ink-jet recording head which uses an ink as the recording agent, and discharges the ink.

7. An apparatus according to claim 6, wherein said ink-jet recording head comprises an element for generating heat energy for causing film boiling in an ink as energy utilized for discharging the ink.

8. An apparatus according to claim 1, further comprising an image supply apparatus for supplying predetermined data associated with a relation between the image data and the image to be recorded.

9. An apparatus according to claim 8, further comprising means for generating the image data representing the image to be recorded on the basis of the predetermined data and the image data corresponding to the predetermined image.

10. An apparatus according to claim 1, wherein a piece of cloth is used as the recording medium.

11. An apparatus according to claim 1, wherein an image output apparatus has a plurality of recording modes, and said calculation means performs different calculations depending on the recording modes.

12. An apparatus according to claim 1, wherein the predetermined image is repeatedly recorded along a plurality of directions by said recording control means.

13. An information processing method applied to an image forming system utilizing an expendable in recording, said method comprising the steps of:

receiving image data corresponding to a predetermined image, the predetermined image being an image to be repeatedly recorded in a recording process on a single recording medium to form an image;

obtaining a number of dots forming the predetermined image on the basis of the received image data;

estimating a partial consumption amount of the expendable corresponding to the predetermined image by multiplying the number of dots forming the predetermined image by an ink amount per dot;

estimating a number of repetitive recordings of the predetermined image within a predetermined region of the single recording medium by dividing a size of the predetermined region of the recording medium by a size of a region where the predetermined image is recorded; and estimating a consumption amount of the expendable corresponding to the predetermined region of the recording medium by multiplying the partial consumption amount of the expendable corresponding to the predetermined image by the estimated number of repetitive recordings.

14. A method according to claim 13, further comprising the step of performing a cost calculation of image recording on the basis of the consumption amount.

15. A method according to claim 1, wherein the expendable is a recording agent and/or a recording head.

16. A method according to claim 13, further comprising the step of supplying image data representing the image to be recorded to an image output apparatus, having a recording head, for recording an image on a recording medium using a recording agent.

17. An apparatus according to claim 16, further comprising at least one additional recording head, each of said recording heads being arranged in correspondence with recording agents having different color tones.

18. A method according to claim 16, wherein said recording head comprises an ink-jet recording head which uses an ink as the recording agent, and discharges the ink.

19. A method according to claim 18, wherein said ink-jet recording head comprises an element for generating heat energy for causing film boiling in an ink as energy utilized for discharging the ink.

20. A method according to claim 18, further comprising the step of fixing the ink to the recording medium after recording is performed by attaching the ink to the recording medium.

21. A method according to claim 20, further comprising the step of washing the recorded recording medium after the step of fixing the ink.

22. A method according to claim 20, further comprising the step of performing a pre-treatment for adding a pre-treatment agent in the recording medium before recording by discharging the ink from said recording head.

23. A method according to claim 20, wherein said recording head comprises an ink-jet recording head which discharges the ink by utilizing heat energy, and comprises a heat energy converting element for generating heat energy to be applied to the ink.

24. A method according to claim 23, wherein said recording head causes a change in state in the ink by the heat energy applied from said heat energy converting element, and discharges the ink from discharge openings on the basis of the change in state.

25. A method according to claim 16, further comprising the step of:

obtaining predetermined data associated with a relation between the image data and the image to be recorded; and generating the image data representing the image to be recorded in accordance with the predetermined data and the image data corresponding to the predetermined image.

26. A method according to claim 13, wherein said method is executed in an image output apparatus or an image supply apparatus.

27. A method according to claim 13, wherein a piece of cloth is used as the recording medium.

28. A method according to claim 13, wherein an image output apparatus has a plurality of recording modes, and different calculations are performed depending on the recording modes.

29. An information processing method according to claim 13, wherein the predetermined image is repeatedly recorded along a plurality of directions.

* * * * *

UNITED STATES PATENT AND TRADEMARK OFFICE
CERTIFICATE OF CORRECTION

PATENT NO. : 6,027,200

DATED : February 22, 2000

INVENTOR(S) : TAKAHASHI ET AL.

Page 1 of 5

It is certified that error appears in the above-identified patent and that said Letters Patent is hereby corrected as shown below:

On the title page, item
[56] References Cited:
 Foreign Patent Documents,
"0561700" should read --0 561 700--,
"0 574 372" should read --0 574 182--,
"362092850" should read --62-92850--,
"0158049" should read --62-158409--,
"2277806" should read --2-277806--,
"346589" should read --3-46589--,
"3090607" should read --3-90607--,
"3167303" should read --3-167303--,
"418358" should read --4-18358--,
"479858" should read --4-79858--.
"4201349" should read --4-201349--,
"404316856" should read --4-316856--, Other Publications,
"Vo.1. 15," should read --Vol. 15,--,
"Vo.1. 15," should read --Vol. 15,--, In the Drawings:
 Sheet 10, Figure 11, in step SS11-5, "OHTERS" should read --OTHERS--.
 Sheet 40, Figure 42, at 237 and 717, "UNEVENESS" (both occurrences) should read --UNEVENNESS--.
 Sheet 42, Figure 44, in step SP13, "UNEVENESS" should read --UNEVENNESS--.
 Sheet 43, Figure 45, in step SP3-5, "UNEVENESS" should read --UNEVENNESS--.

UNITED STATES PATENT AND TRADEMARK OFFICE
CERTIFICATE OF CORRECTION

PATENT NO. : 6,027,200

DATED : February 22, 2000

INVENTOR(S) : TAKAHASHI ET AL.

It is certified that error appears in the above-identified patent and that said Letters Patent is hereby corrected as shown below:

COLUMN 1:
  Line 62, "timeconsuming" should read --time-consuming--.

COLUMN 2:
  Line 58, "ink-Jet" should read --ink-jet--.

COLUMN 3:
  Line 36, "Also," should begin a new paragraph.

COLUMN 6:
  Line 1, "FIG. 24 is" should read --FIGS. 24A-24N comprise--.
  Line 10, "main" should read --a main--.

COLUMN 7:
  Line 51, "printers" should read --printer's--.

COLUMN 10:
  Line 15, "main" should read --the main--.
  Line 41, "CPU loll" should read --CPU 1011--.

COLUMN 11:
  Line 67, "pattern;" should read --pattern,--.

COLUMN 12:
  Line 25, "ink-Jet" should read --ink-jet--.
  Line 35, "carriage;" should read --carriage 1--.

UNITED STATES PATENT AND TRADEMARK OFFICE
CERTIFICATE OF CORRECTION

PATENT NO. : 6,027,200

DATED : February 22, 2000

INVENTOR(S) : TAKAHASHI ET AL.

It is certified that error appears in the above-identified patent and that said Letters Patent is hereby corrected as shown below:

<u>COLUMN 13</u>:
  Line 37, "are not" should read --is not--.

<u>COLUMN 14</u>:
  Line 31, "magnetic" should read --a magnetic tape.--.
  Line 41, " "MT" " should read --"M"--.

<u>COLUMN 15</u>:
  Line 16, "8-bit" should begin a new paragraph.

<u>COLUMN 17</u>:
  Line 50, "SI" should read --S1--.

<u>COLUMN 23</u>:
  Line 11, "$X_{r=XOUT-Nx} \times X_b$" should read --$X_r = X_{OUT} - N_x \times X_b$--.

<u>COLUMN 25</u>:
  Line 26, "Desiqnation" should read --Designation--.

<u>COLUMN 30</u>:
  Line 24, "coefficient a" should read --coefficient $\alpha$--.
  Line 64, "case," should read --a case,--, and "a density" should read --density--.

<u>COLUMN 32</u>:
  Line 20, "Joined" should read --joined--.

UNITED STATES PATENT AND TRADEMARK OFFICE
CERTIFICATE OF CORRECTION

PATENT NO. : 6,027,200

DATED : February 22, 2000

INVENTOR(S) : TAKAHASHI ET AL.

It is certified that error appears in the above-identified patent and that said Letters Patent is hereby corrected as shown below:

<u>COLUMN 33</u>:
  Line 45, "$R_o \geq r_n$;" should read --$R_o \geq R_n$;--.

<u>COLUMN 34</u>:
  Line 1, "signal" should read --signals--.

<u>COLUMN 35</u>:
  Line 59, "T3" (second occurrence) should read --T8--.
  Line 63, "L3" should read --L8--.

<u>COLUMN 36</u>:
  Line 1, "picoliters" should read --(picoliters)--.

<u>COLUMN 37</u>:
  Line 62, "shows" should read --show--.

<u>COLUMN 38</u>:
  Line 48, "columns" should read --column--.
  Line 52, "rows" should read --row--, and "directions" should read --direction--.
  Line 67, "Fig." should be deleted.

<u>COLUMN 39</u>:
  Line 2, "name="flower" should read --name= "flower--.

<u>COLUMN 40</u>:
  Line 4, "correspond" should read --corresponding--.

UNITED STATES PATENT AND TRADEMARK OFFICE
CERTIFICATE OF CORRECTION

PATENT NO. : 6,027,200

DATED : February 22, 2000

INVENTOR(S) : TAKAHASHI ET AL.

It is certified that error appears in the above-identified patent and that said Letters Patent is hereby corrected as shown below:

COLUMN 43:
  Line 23, "In the" should read --in the--.

COLUMN 47:
  Line 34, "by integrally" should read --integrally--.

COLUMN 50:
  Line 64, "claim 1," should read --claim 13,--.

Signed and Sealed this

Third Day of April, 2001

Attest:

NICHOLAS P. GODICI

Attesting Officer    Acting Director of the United States Patent and Trademark Office